US012659133B2

(12) United States Patent
Zhu

(10) Patent No.: US 12,659,133 B2
(45) Date of Patent: Jun. 16, 2026

(54) ASSET TRANSFERRING METHOD AND APPARATUS BASED ON MULTIPLE BLOCKCHAINS, DEVICE, MEDIUM, AND PRODUCT

(71) Applicant: Tencent Technology (Shenzhen) Company Limited, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 305 days.

(21) Appl. No.: 18/387,336

(22) Filed: Nov. 6, 2023

(65) Prior Publication Data

US 2024/0137208 A1 Apr. 25, 2024
US 2024/0235817 A9 Jul. 11, 2024

Related U.S. Application Data

(63) Continuation of application No. PCT/CN2023/114368, filed on Aug. 23, 2023.

(30) Foreign Application Priority Data

Oct. 20, 2022 (CN) .......................... 202211291310.4

(51) Int. Cl.
*G06Q 20/40* (2012.01)
*G06Q 20/38* (2012.01)
*H04L 9/00* (2022.01)
*H04L 9/08* (2006.01)

(52) U.S. Cl.
CPC .......... *H04L 9/0819* (2013.01); *G06Q 20/38* (2013.01); *G06Q 20/40* (2013.01); *H04L 9/50* (2022.05)

(58) Field of Classification Search
CPC ....... H04L 9/0819; H04L 9/50; H04L 9/3247; G06F 16/27; G06Q 20/08; G06Q 20/38;
(Continued)

(56) References Cited

U.S. PATENT DOCUMENTS 11,347,726 B2 * 5/2022 Jiang ..................... G06Q 20/389
11,985,262 B2 * 5/2024 Kaplan ...................... H04L 9/14
(Continued)

FOREIGN PATENT DOCUMENTS

CN 111311209 A 6/2020
CN 112837048 A 5/2021
(Continued)

OTHER PUBLICATIONS

Li Zhiping, A cross-chain technology based on a licensed public chain, Feb. 2022, IEEE, https://ieeexplore.ieee.org/stamp/stamp.jsp?tp=&arnumber=9744804 (Year: 2022).*
(Continued)

*Primary Examiner* — Chunling Ding
(74) *Attorney, Agent, or Firm* — Morgan, Lewis & Bockius LLP

(57) ABSTRACT

This application provides an asset transferring method and apparatus based on multiple blockchains, a device, a medium, and a product. The method includes: obtaining a first cross-chain asset transfer-out request transmitted by a service object for a first cross-chain transfer-out transaction; writing transaction data of the first cross-chain transfer-out transaction carried in the first cross-chain asset transfer-out request into a first cross-chain bridge contract on a first chain; and invoking, when determining that the service object has a cross-chain asset transfer-out permission based on the first cross-chain bridge contract and service data information, a first asset contract on the first chain to lock a first asset, and generating a first cross-chain event corre-
(Continued)

sponding to the first cross-chain transfer-out transaction. According to this application, the service stability of a service executed on a chain may be ensured based on a multi-blockchain architecture.

16 Claims, 14 Drawing Sheets

(58) Field of Classification Search
CPC ...... G06Q 20/40; G06Q 40/04; G06Q 20/382; G06Q 20/401
See application file for complete search history.

(56) References Cited

U.S. PATENT DOCUMENTS

2019/0340267 A1* 11/2019 Vo ...................... G06F 16/2365

2020/0349564 A1* 11/2020 Padmanabhan ..... G06F 16/1824
2021/0150515 A1* 5/2021 Lu ........................ G06Q 20/389
2023/0289791 A1* 9/2023 Zarick ................. G06Q 20/381

FOREIGN PATENT DOCUMENTS

| | | | | |
|---|---|---|---|---|
| CN | 112948153 B | * | 8/2021 | ........... G06F 21/602 |
| CN | 113407977 A | | 9/2021 | |
| CN | 113572825 A | * | 10/2021 | ............. H04L 63/10 |
| CN | 108876370 B | * | 12/2021 | ........ G06Q 20/3829 |
| CN | 114154996 A | | 3/2022 | |
| CN | 114386954 A | * | 4/2022 | ........ G06Q 20/3825 |
| CN | 114615095 A | | 6/2022 | |
| CN | 114615095 B | * | 9/2022 | ........... H04L 9/3247 |
| WO | WO-2018232494 A1 | * | 12/2018 | ............... H04L 9/50 |

OTHER PUBLICATIONS

Tencent Technology, ISR, PCT/CN2023/114368, Oct. 20, 2023, 2 pgs.

* cited by examiner

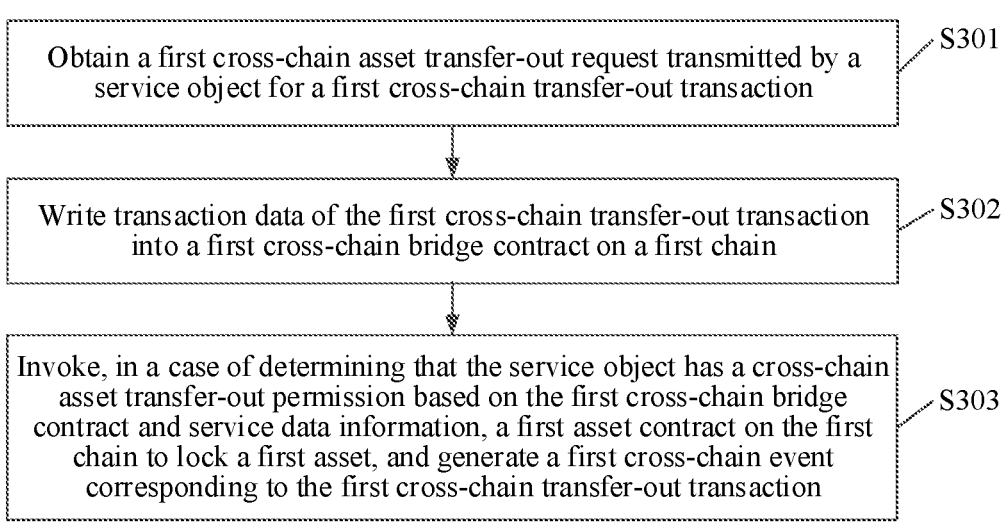

Obtain a first cross-chain asset transfer-out request transmitted by a service object for a first cross-chain transfer-out transaction — S301

Write transaction data of the first cross-chain transfer-out transaction into a first cross-chain bridge contract on a first chain — S302

Invoke, in a case of determining that the service object has a cross-chain asset transfer-out permission based on the first cross-chain bridge contract and service data information, a first asset contract on the first chain to lock a first asset, and generate a first cross-chain event corresponding to the first cross-chain transfer-out transaction — S303

FIG. 3

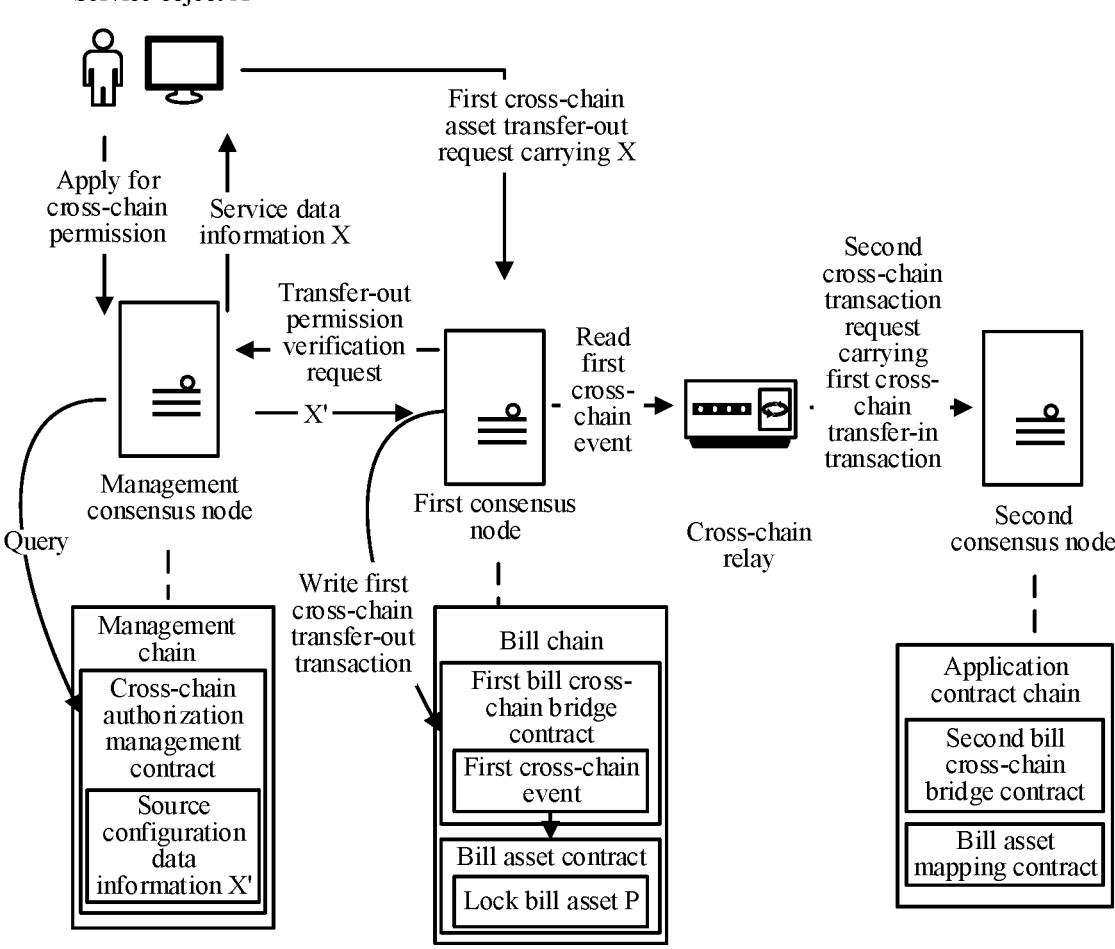

FIG. 4

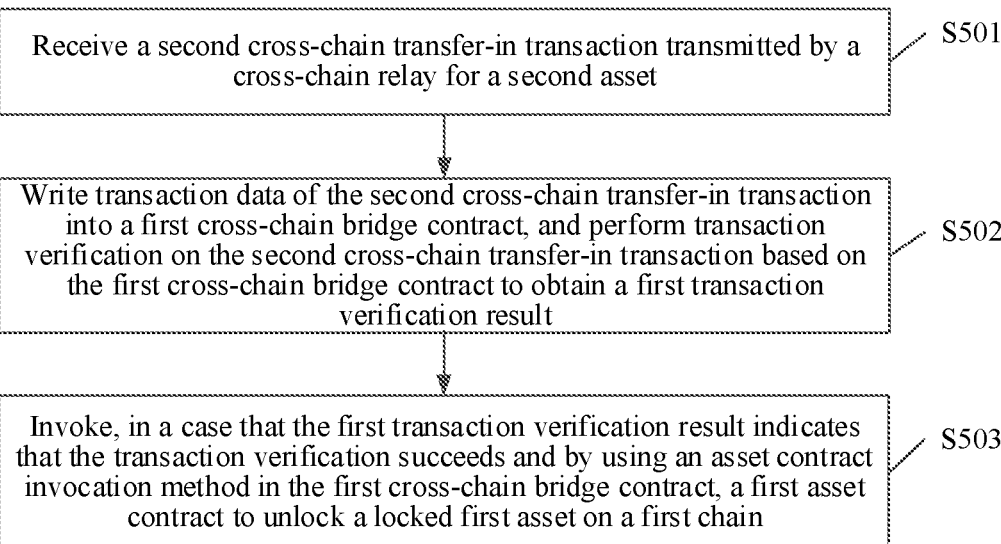

Receive a second cross-chain transfer-in transaction transmitted by a
cross-chain relay for a second asset          S501

Write transaction data of the second cross-chain transfer-in transaction
into a first cross-chain bridge contract, and perform transaction
verification on the second cross-chain transfer-in transaction based on
the first cross-chain bridge contract to obtain a first transaction
verification result          S502

Invoke, in a case that the first transaction verification result indicates
that the transaction verification succeeds and by using an asset contract
invocation method in the first cross-chain bridge contract, a first asset
contract to unlock a locked first asset on a first chain          S503

FIG. 5

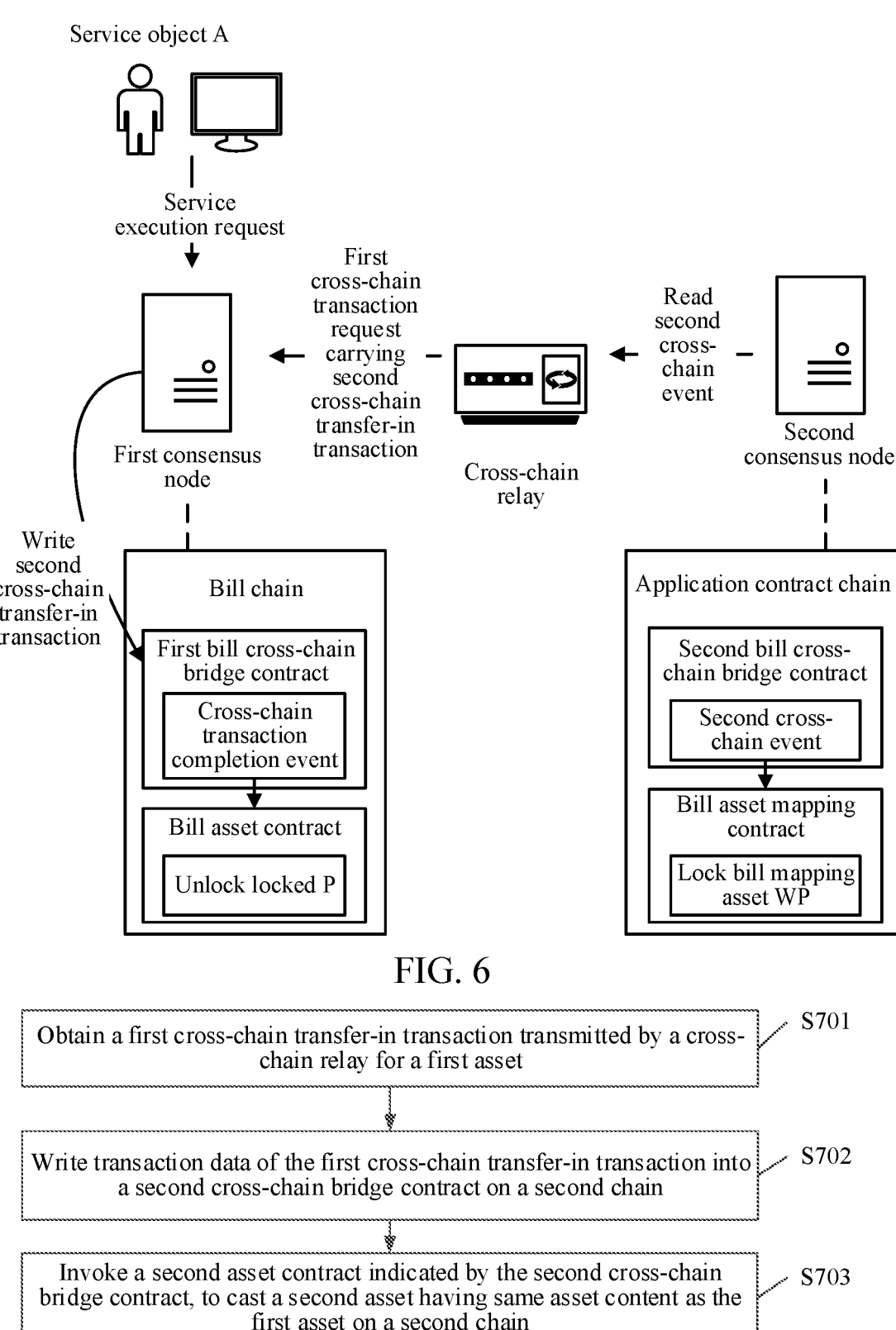

FIG. 6

| | |
|---|---|
| Obtain a first cross-chain transfer-in transaction transmitted by a cross-chain relay for a first asset | S701 |

| | |
|---|---|
| Write transaction data of the first cross-chain transfer-in transaction into a second cross-chain bridge contract on a second chain | S702 |

| | |
|---|---|
| Invoke a second asset contract indicated by the second cross-chain bridge contract, to cast a second asset having same asset content as the first asset on a second chain | S703 |

FIG. 7

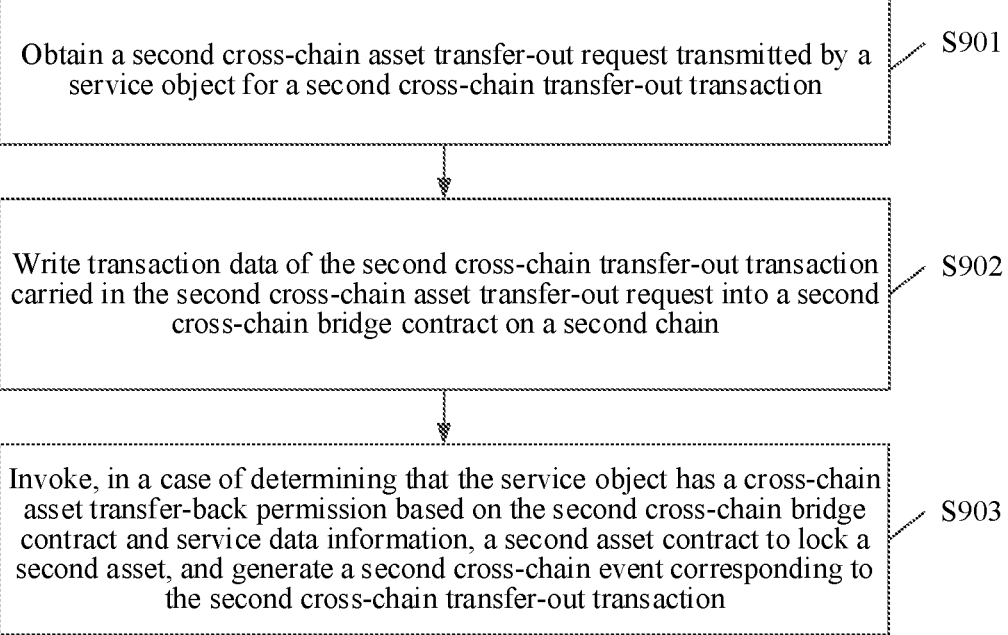

Obtain a second cross-chain asset transfer-out request transmitted by a service object for a second cross-chain transfer-out transaction ⟋ S901

Write transaction data of the second cross-chain transfer-out transaction carried in the second cross-chain asset transfer-out request into a second cross-chain bridge contract on a second chain ⟋ S902

Invoke, in a case of determining that the service object has a cross-chain asset transfer-back permission based on the second cross-chain bridge contract and service data information, a second asset contract to lock a second asset, and generate a second cross-chain event corresponding to the second cross-chain transfer-out transaction ⟋ S903

ASSET TRANSFERRING METHOD AND APPARATUS BASED ON MULTIPLE BLOCKCHAINS, DEVICE, MEDIUM, AND PRODUCT

CROSS-REFERENCE TO RELATED APPLICATIONS

This application is a continuation application of PCT Patent Application No. PCT/CN2023/114368, entitled "ASSET TRANSFERRING METHOD AND APPARATUS BASED ON MULTIPLE BLOCKCHAINS, DEVICE, MEDIUM, AND PRODUCT" filed on Aug. 23, 2023, which claims priority to Chinese Patent Application No. 202211291310.4, entitled "ASSET TRANSFERRING METHOD AND APPARATUS BASED ON MULTIPLE BLOCKCHAINS, DEVICE, MEDIUM, AND PRODUCT" filed on Oct. 20, 2022, all of which is incorporated herein by reference in its entirety.

FIELD OF THE TECHNOLOGY

This application relates to the field of blockchain technologies, and in particular, to an asset transferring method and apparatus based on multiple blockchains, a device, a medium, and a product.

BACKGROUND OF THE DISCLOSURE

Currently, a blockchain electronic bill system is generally constructed based on a single chain structure, that is, the blockchain electronic bill system executes different services by using a same blockchain. As a result, different assets corresponding to different transaction services may be stored in blocks on the single chain. For example, a bill asset associated with a bill service and a service asset of another service irrelevant to the bill service (for example, a digital asset related to a transfer service) may be stored on the single chain, and consequently, data stored on the entire chain may be seriously mixed.

Based on this, when a user initiates a transfer service for the bill asset on the blockchain, the transfer service is to be executed on the same chain as the foregoing transfer service. In this case, when a large quantity of other services requested by other users exist in a service processing queue corresponding to the single chain, before executing the transfer service in the service processing queue, the blockchain electronic bill system needs to execute the large quantity of other services in advance, which necessarily consumes a specific service waiting time and further affects the transferring efficiency of transferring the bill asset on the blockchain. In addition, when the blockchain electronic bill system is configured to process the large quantity of different services, a large quantity of computing resources and storage resources on the single chain may be consumed. As a result, the service stability of a service (for example, the transfer service) that needs to be executed on the single chain can be hardly ensured.

SUMMARY

Embodiments of this application provide an asset transferring method and apparatus based on multiple blockchains, a device, a medium, and a product.

According to an aspect of the embodiments of this application, an asset transferring method based on multiple blockchains is provided, the multiple blockchains including a first chain, a second chain, and a target chain, the method being performed by a first consensus node in a first chain network corresponding to the first chain, and the method including:

obtaining a first cross-chain asset transfer-out request transmitted by a service object for a first cross-chain transfer-out transaction, the first cross-chain asset transfer-out request carrying service data information configured for the service object, and the service data information being configured by a target consensus node in a target chain network; the first cross-chain asset transfer-out request being used for indicating the first consensus node to transfer, through a cross-chain relay, a first asset belonging to the service object from the first chain to the second chain associated with a second consensus node; the second consensus node being a consensus node in a second chain network corresponding to the second chain; and the cross-chain relay being configured to isolate the second chain network and the first chain network, and the second chain network being independent of the target chain network and the first chain network;

writing transaction data of the first cross-chain transfer-out transaction into a first cross-chain bridge contract on the first chain; and invoking, when determining that the service object has a cross-chain asset transfer-out permission based on the first cross-chain bridge contract and the service data information, a first asset contract on the first chain to lock the first asset, and generating a first cross-chain event corresponding to the first cross-chain transfer-out transaction, the first cross-chain event being used for indicating the cross-chain relay to transmit, when obtaining a first cross-chain transfer-in transaction corresponding to the first cross-chain transfer-out transaction through construction, the first cross-chain transfer-in transaction to the second consensus node; and the second consensus node being configured to invoke, when writing transaction data of the first cross-chain transfer-in transaction into a second cross-chain bridge contract on the second chain, a second asset contract indicated by the second cross-chain bridge contract, to cast a second asset having same asset content as the first asset on the second chain.

According to an aspect of the embodiments of this application, an asset transferring method based on multiple blockchains is provided, the multiple blockchains including a first chain, a second chain, and a target chain, the method being performed by a second consensus node in a second chain network corresponding to the second chain, and the method including:

obtaining a first cross-chain transfer-in transaction transmitted by a cross-chain relay for a first asset, the first cross-chain transfer-in transaction being constructed when the cross-chain relay reads a first cross-chain event corresponding to a first cross-chain transfer-out transaction from a first consensus node; the first cross-chain event being generated, when determining that a service object has a cross-chain asset transfer-out permission based on a first cross-chain bridge contract into which the first cross-chain transfer-out transaction is written and service data information, by the first consensus node by invoking a first asset contract on the first chain to lock the first asset; the service data information being configured by a target consensus node in a target chain network for the service object; the first consensus node being a consensus node in a first chain network corresponding to the first chain; and the cross-chain relay being configured to isolate the first chain network and the second chain network, and the first chain network being independent of the target chain network and the second chain network;

writing transaction data of the first cross-chain transfer-in transaction into a second cross-chain bridge contract on the second chain; and invoking a second asset contract indicated by the second cross-chain bridge contract, to cast a second asset having same asset content as the first asset on the second chain.

According to an aspect of the embodiments of this application, an asset transferring apparatus based on multiple blockchains is provided, the multiple blockchains including a first chain, a second chain, and a target chain, the apparatus running on a first consensus node in a first chain network corresponding to the first chain, and the apparatus including:

an obtaining module, configured to obtain a first cross-chain asset transfer-out request transmitted by a service object for a first cross-chain transfer-out transaction, the first cross-chain asset transfer-out request carrying service data information configured for the service object, and the service data information being configured by a target consensus node in a target chain network; the first cross-chain asset transfer-out request being used for indicating the first consensus node to transfer, through a cross-chain relay, a first asset belonging to the service object from the first chain to the second chain associated with a second consensus node; the second consensus node being a consensus node in a second chain network corresponding to the second chain; and the cross-chain relay being configured to isolate the second chain network and the first chain network, and the second chain network being independent of the target chain network and the first chain network;

a writing module, configured to write transaction data of the first cross-chain transfer-out transaction into a first cross-chain bridge contract on the first chain; and an invocation module, configured to: invoke, when determining that the service object has a cross-chain asset transfer-out permission based on the first cross-chain bridge contract and the service data information, a first asset contract on the first chain to lock the first asset, and generate a first cross-chain event corresponding to the first cross-chain transfer-out transaction, the first cross-chain event being used for indicating the cross-chain relay to transmit, when obtaining a first cross-chain transfer-in transaction corresponding to the first cross-chain transfer-out transaction through construction, the first cross-chain transfer-in transaction to the second consensus node; and the second consensus node being configured to invoke, when writing transaction data of the first cross-chain transfer-in transaction into a second cross-chain bridge contract on the second chain, a second asset contract indicated by the second cross-chain bridge contract, to cast a second asset having same asset content as the first asset on the second chain.

According to an aspect of the embodiments of this application, an asset transferring apparatus based on multiple blockchains is provided, the multiple blockchains including a first chain, a second chain, and a target chain, the apparatus running on a second consensus node in a second chain network corresponding to the second chain, and the apparatus including:

a processing module, configured to obtain a first cross-chain transfer-in transaction transmitted by a cross-chain relay for a first asset, the first cross-chain transfer-in transaction being constructed when the cross-chain relay reads a first cross-chain event corresponding to a first cross-chain transfer-out transaction from a first consensus node; the first cross-chain event being generated, when determining that a service object has a cross-chain asset transfer-out permission based on a first cross-chain bridge contract into which the first cross-chain transfer-out transaction is written and service data information, by the first consensus node by invoking a first asset contract on the first chain to lock the first asset; the service data information being configured by a target consensus node in a target chain network for the service object; the first consensus node being a consensus node in a first chain network corresponding to the first chain; and the cross-chain relay being configured to isolate the first chain network and the second chain network, and the first chain network being independent of the target chain network and the second chain network;

the processing module being further configured to write transaction data of the first cross-chain transfer-in transaction into a second cross-chain bridge contract on the second chain; and an asset casting module, configured to invoke a second asset contract indicated by the second cross-chain bridge contract, to cast a second asset having same asset content as the first asset on the second chain.

According to an aspect of the embodiments of this application, a computer device is provided, including a memory and a processor, where the memory is connected to the processor, the memory is configured to store a computer program, and the processor is configured to invoke the computer program, to cause the computer device to perform the method according to the foregoing aspect of the embodiments of this application.

According to an aspect of the embodiments of this application, a computer-readable storage medium is provided, storing a computer program, where the computer program is suitable for being loaded and executed by a processor, to cause a computer device including the processor to implement the method according to the foregoing aspect of the embodiments of this application.

According to an aspect of this application, a computer program product or a computer program is provided, the computer program product or the computer program including computer instructions, and the computer instructions being stored in a computer-readable storage medium. A processor of a computer device reads the computer instructions from the computer-readable storage medium, and executes the computer instructions, to cause the computer device to perform the method according to the foregoing aspect.

In the embodiments of this application, a first cross-chain asset transfer-out request transmitted by a service object for a first cross-chain transfer-out transaction may be obtained. The first cross-chain asset transfer-out request carries service data information configured by a target consensus node associated with a target chain, and in the embodiments of this application, the service data information may be used for performing permission verification on the service object initiating the first cross-chain asset transfer-out request, to ensure the safety of cross-chain asset transferring (that is, the validity of cross-chain transferring may be ensured when asset transferring is performed in a cross-chain manner). The first cross-chain asset transfer-out request involved in the embodiments of this application may be used for transferring a first asset from a first chain associated with a first consensus node to a second chain associated with a second consensus node, the first chain, the second chain, and the target chain that are mentioned above are multiple blockchains constructed based on a multi-chain architecture and used for cross-chain asset transferring, and the three chains are respectively located in consensus networks that are independent of each other. Transaction data of the first cross-chain transfer-out transaction carried in the first cross-chain asset transfer-out request is written into a first cross-chain bridge contract on the first chain; and when determining that the service object has a cross-chain asset transfer-out permission based on the first cross-chain bridge contract and the service data information, a first asset contract on the first chain is invoked to lock the first asset, and a first cross-chain event corresponding to the first cross-chain transfer-out transaction is generated. The first cross-chain event may be used for indicating a cross-chain relay to construct a first cross-chain transfer-in transaction, to cause the second consensus node to cast a second asset having same asset content as the first asset, thereby implementing asset transferring of the first asset. It may be learned that, the embodiments of this application provide an asset transferring mechanism based on multiple blockchains, and the asset transferring mechanism based on multiple blockchains is intended to highlight that cross-chain transferring of the first asset may be implemented through cooperation of the three chains. For example, when the target chain is configured with the service data information under authorization of a user (namely, the service object), the user may be allowed to initiate a transfer service for transferring the first asset from the first chain to the second chain, where the transfer service is the first cross-chain transfer-out transaction. It is to be understood that, the first chain, the second chain, and the target chain involved in the embodiments of this application are independent of each other. Therefore, the three chains may be respectively used for executing different services (for example, a service related to the first asset (for example, a bill service related to a bill asset) may be executed on the first chain, and a derivative service associated with the bill service may be executed on the second chain), thereby reducing a mixture degree of data stored on each chain. In addition, through cooperation of the multiple blockchains, when other services are normally executed on the chains, the transfer service may be executed simultaneously and in a cross-chain manner without affecting requests of the other services, thereby further improving the transferring efficiency of transferring the first asset in a cross-chain manner. It is to be understood that, in the embodiments of this application, in an asset transferring process based on multiple blockchains, the transfer service for the first asset is executed cooperatively through contracts deployed on the chains (for example, the first cross-chain bridge contract and the first asset contract on the first chain), so that the service executed on the chain (that is, the transfer service of transferring the first asset in a cross-chain manner) may be prevented from being affected by other services, thereby ensuring the service stability of the transfer service.

BRIEF DESCRIPTION OF THE DRAWINGS

FIG. 3 is a flowchart of an asset transferring method based on multiple blockchains according to an embodiment of this application.

FIG. 4 is a schematic diagram of a cross-chain asset transfer-out scenario according to an embodiment of this application.

FIG. 5 is a flowchart of an asset transferring method based on multiple blockchains according to an embodiment of this application.

FIG. 6 is a schematic diagram of a cross-chain asset transfer-in scenario according to an embodiment of this application.

FIG. 7 is a flowchart of an asset transferring method based on multiple blockchains according to an embodiment of this application.

FIG. 9 is a flowchart of an asset transferring method based on multiple blockchains according to an embodiment of this application.

DESCRIPTION OF EMBODIMENTS

The technical solutions in the embodiments of this application are clearly and completely described in the following with reference to the accompanying drawings in the embodiments of this application. Apparently, the described embodiments are merely some embodiments of this application rather than all of the embodiments. All other embodiments obtained by a person of ordinary skill in the art based on the embodiments of this application without making creative efforts shall fall within the protection scope of this application.

Figure 1:
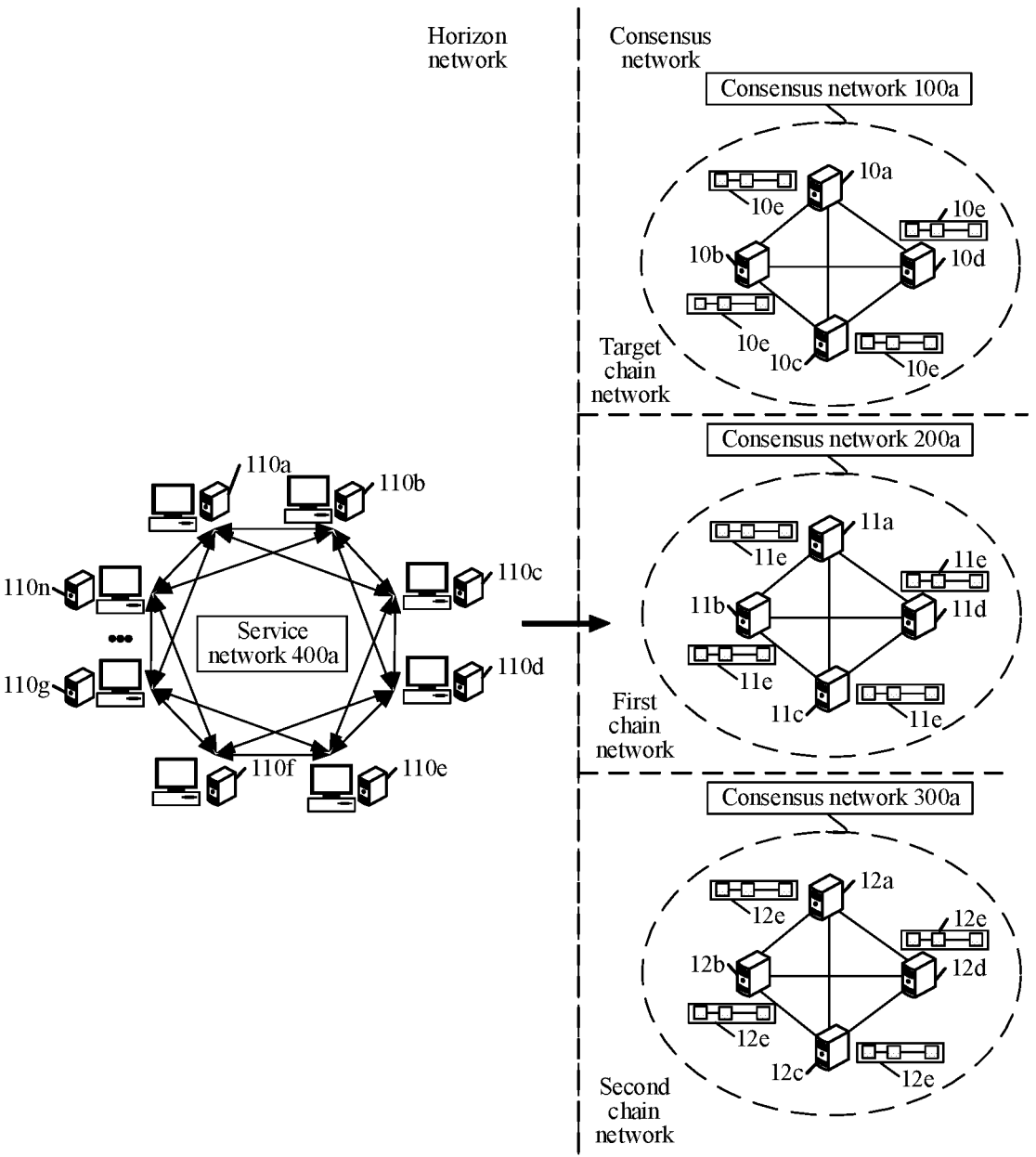
FIG. 1 is a schematic diagram of a layered structure of a blockchain network according to an embodiment of this application.

FIG. 1 is a schematic diagram of a layered structure of a blockchain network according to an embodiment of this application. The layered structure shown in FIG. 1 is applied to a blockchain data system, for example, a blockchain electronic bill system. In addition, a blockchain network corresponding to the blockchain electronic bill system includes a service network and a plurality of consensus networks, where the service network is located in a public network, and the consensus networks are located in a private network (for example, deployed in a private cloud). As shown in FIG. 1, the service network may be represented as a service network 400a shown in FIG. 1, and the plurality of consensus networks may specifically be represented as a consensus network 100a, a consensus network 200a, and a consensus network 300a shown in FIG. 1.

A plurality of service nodes are deployed in the service network 400a shown in FIG. 1, and the plurality of service nodes may specifically include a service node 110a, a service node 110b, . . . , and a service node 110n shown in FIG. 1. It may be understood that, a quantity of service nodes deployed in the service node 400a is not limited herein. As a service requirement changes, the quantity of service nodes may change continuously. It is to be understood that, the service node in the service network 400a does not need to participate in accounting. In addition, as shown in FIG. 1, each service node running in the service network 400a may access one or more of the plurality of consensus networks in a form of network communication, and a quantity of consensus networks accessed by each service object through a corresponding service node is not limited herein. It may be understood that, the consensus networks may also perform data exchange with each other in the form of network communication.

It is to be understood that, a plurality of consensus nodes are deployed in the consensus network 100a shown in FIG. 1, and the plurality of consensus nodes herein may specifically include a consensus node 10a, a consensus node 10b, a consensus node 10c, and a consensus node 10d shown in FIG. 1. A quantity of consensus nodes deployed in the consensus network 100a is not limited herein, and as the service requirement changes, the quantity of consensus nodes may change continuously. In addition, as shown in FIG. 1, a blockchain maintained jointly by the plurality of consensus nodes running in the consensus network 100a is specifically a blockchain 10e shown in FIG. 1.

Similarly, a plurality of consensus nodes are deployed in the consensus network 200a shown in FIG. 1, and the plurality of consensus nodes herein may specifically include a consensus node 11a, a consensus node 11b, a consensus node 11c, and a consensus node 11d shown in FIG. 1. A quantity of consensus nodes deployed in the consensus network 200a is not limited herein, and as the service requirement changes, the quantity of consensus nodes may change continuously. In addition, as shown in FIG. 1, a blockchain maintained jointly by the plurality of consensus nodes running in the consensus network 200a is specifically a blockchain 11e shown in FIG. 1.

Similarly, a plurality of consensus nodes are deployed in the consensus network 300a shown in FIG. 1, and the plurality of consensus nodes herein may specifically include a consensus node 12a, a consensus node 12b, a consensus node 12c, and a consensus node 12d shown in FIG. 1. A quantity of consensus nodes deployed in the consensus network 300a is not limited herein, and as the service requirement changes, the quantity of consensus nodes may change continuously. In addition, as shown in FIG. 1, a blockchain maintained jointly by the plurality of consensus nodes running in the consensus network 300a is specifically a blockchain 12e shown in FIG. 1.

For ease of understanding, in the embodiments of this application, the service nodes and the consensus nodes that are located in the foregoing blockchain electronic bill system may be collectively referred to as blockchain nodes (referred to as nodes for short), the consensus network 100a, the consensus network 200a, and the consensus network 300a that participate in forming the blockchain electronic bill system may be collectively referred to as core consensus networks, and nodes in the core consensus networks may be collectively referred to as core nodes.

It is to be understood that, the blockchain involved in the embodiments of this application is a new application mode of computer technologies such as distributed data storage, peer-to-peer transmission, a consensus mechanism, and an encryption algorithm, and is mainly used for sorting data in chronological order and encrypting the data into a ledger, to prevent the data from being tampered with and forged. In addition, verification, storage, and update of the data may also be performed. The blockchain is essentially a decentralized database, and each node in the database stores the same blockchain.

Based on a specific scenario, the blockchain stored on each node (for example, the core nodes such as the consensus node 10a, the consensus node 10b, the consensus node 10c, and the consensus node 10d) in the consensus network 100a is the blockchain 10e. The blockchain 10e herein may be a target chain (for example, which may be referred to as a management chain) in the blockchain electronic bill system, a core consensus network (that is, the consensus network 100a) corresponding to the management chain may be a target chain network (for example, which may be referred to as a management chain network), and consensus nodes (or core nodes) in the management chain network may be collectively referred to as target consensus nodes (for example, which may be referred to as management consensus nodes). In another example, the blockchain stored on each node (for example, the core nodes such as the consensus node 11a, the consensus node 11b, the consensus node 11c, and the consensus node 11d) in the consensus network 200a is the blockchain 11e. The blockchain 11e herein may be a first chain (for example, which may be referred to as a bill chain) in the blockchain electronic bill system, a core consensus network (that is, the consensus network 200a) corresponding to the bill chain may be a first chain network (for example, which may be referred to as an electronic bill network or a bill chain network), consensus nodes (or core nodes) in the electronic bill network may be collectively referred to as bill consensus nodes, and a consensus mechanism in the electronic bill network may be used to use a bill consensus node selected from the bill consensus nodes as a first consensus node. In another example, the blockchain stored on each node (for example, the core nodes such as the consensus node 12a, the consensus node 12b, the consensus node 12c, and the consensus node 12d) in the consensus network 300a is the blockchain 12e. The blockchain 12e herein may be a second chain (for example, which may be referred to as an application contract chain) in the blockchain electronic bill system, a core consensus network (that is, the consensus network 300a) corresponding to the application contract chain may be a second chain network (for example, which may be referred to as an application contract chain network), consensus nodes (or core nodes) in the application contract chain network may be collectively referred to as application consensus nodes, and a consensus mechanism in the application contract chain network may be used to use an application consensus node selected from the application consensus nodes as a second consensus node.

In the blockchain electronic bill system, the core node may be responsible for consensus in the core consensus network in which the corresponding blockchain is located, that is, the core node may be a consensus node in the core consensus network in which the corresponding blockchain is located. For any core consensus network in the foregoing three core consensus networks, a specific process of writing transaction data in the core consensus network into a corresponding blockchain ledger (for example, a distributed database) may be as follows: A user client transmits the transaction data to a service node, and the transaction data is then transmitted among service nodes in a service network in the blockchain network in a relay baton manner until a consensus node (for example, the consensus node 11b in the consensus network 200a) in a corresponding core consensus network in the blockchain network receives the transaction data. In this case, the consensus node ((for example, the consensus node 11b in the consensus network 200a) packs the transaction data in a block for ease of a subsequent consensus performed with another consensus node. Therefore, after the consensus is reached, the block on which the consensus is reached is written into a distributed database of a core consensus network (for example, the consensus network 200a) in which the block is located.

In some embodiments, it may be understood that, in the embodiments of this application, after the consensus is reached, the block carrying the transaction data may also be written in parallel into the distributed database with a plurality of other blocks associated with the block through a storage layer of the core consensus network (for example, the consensus network 200a) in which the block is located. In this way, the limitation of a blockchain structure of the blockchain may be fundamentally broken through, thereby effectively improving the storage efficiency of data storage.

It may be understood that, in the foregoing blockchain electronic bill system, a smart contract may be deployed on a blockchain of a corresponding core consensus network, the smart contract may be understood as code executed by each blockchain node (that is, each consensus node) in the blockchain electronic bill system, and through the smart contract, any logic may be executed and a result may be obtained. For example, a user may initiate a service request (for example, a first cross-chain asset transfer-out request) through the user client, to invoke the smart contract (for example, a first cross-chain bridge contract) that has been deployed on the blockchain (for example, the blockchain lie) of the corresponding core consensus network (for example, the consensus network 200a), to implement cross-chain transferring of a bill asset.

Specifically, the service node in the service network may transmit the first cross-chain asset transfer-out request to a consensus node (for example, the consensus node 11a shown in FIG. 1) in the corresponding core consensus network, to perform identity authentication on the user of the first cross-chain asset transfer-out request through a chain entry of the corresponding core consensus network, and allow, when the identity authentication succeeds, to transmit the first cross-chain asset transfer-out request transmitted by the user to another consensus node (for example, the consensus node 11b shown in FIG. 1) in the corresponding core consensus network, to invoke the smart contract running in the consensus nodes (for example, the consensus node 11a and the consensus node 11b shown in FIG. 1) to execute a transaction service (for example, an asset transfer service indicated by the first cross-chain asset transfer-out request) requested by the user.

It is to be understood that, one or more smart contracts may be deployed on the blockchain (for example, the blockchain 11e) of the core consensus network (for example, the consensus network 200a), and the smart contracts may be distinguished through contract invocation addresses, contract identity documents (IDs), or contract names. In the first cross-chain asset transfer-out request initiated by the user client, a contract invocation address, a contract ID, or a contract name of a smart contract may also be carried, to specify a smart contract that needs to run. In the foregoing blockchain electronic bill system, when the smart contract specified by the user client is a smart contract (for example, the first cross-chain bridge contract) that needs to read related data in a cross-chain manner, each consensus node may request to read the related data (for example, source configuration data information) from a corresponding blockchain (for example, the management chain) based on a chain identifier specified by the first cross-chain bridge contract. Finally, each consensus node may verify whether each obtained service execution result is consistent (that is, reach a consensus), and if the obtained service execution result is consistent, each consensus node may store the service execution result into a local cache and local storage of the consensus node. The local cache herein is a system memory created in the storage layer, and the local storage herein is hard disc space created in the storage layer and used for data storage. In this way, when a consensus node in the core consensus network is down or has a system failure, a phenomenon that data cannot be read since data in the system memory disappears is avoided. That is, the consensus node may further read the data through the local storage created in the storage layer.

It is to be understood that, in the foregoing blockchain electronic bill system, a peer-to-peer (P2P) network may be formed between any two blockchain nodes in any consensus network (for example, the consensus network 100a, the consensus network 200a, or the consensus network 300a), and the peer-to-peer network may use a P2P protocol, where the P2P protocol is an application-layer protocol running over the transmission control protocol (TCP). In a distributed system, any device such as a server or a terminal may be added to the distributed system to become a blockchain node, where each blockchain node may include a hardware layer, an intermediate layer, an operating system layer, and an application layer.

It may be understood that, when the consensus network 100a is used as the management chain network, a consensus node (for example, the management consensus node, where the management consensus node may be the consensus node 10a shown in FIG. 1) in the management chain network may provide, through a management chain network entry, a registration service and an authorization service for a corresponding service object accessing the management chain network, and may further perform, in the management chain network, identity management and permission management on the service object that needs to access the blockchain network (for example, the management chain network, an electronic bill network, or an application contract chain network). For example, the management consensus node configures service data information for the service object through the management chain, where the service data information may be used for performing permission verification on a permission of requesting to transferring a bill asset in a cross-chain manner of the service object.

In addition, the management consensus node located in the management chain network may be further configured to perform data management on related metadata information in the foregoing blockchain electronic bill system, for example, manage and update a contract template on the management chain (it is to be understood that the contract template on the management chain may specifically include a management contract template of a smart contract deployed on the management chain and an application contract template of a smart contract deployed on the application contract chain), manage and update a bill template recorded on the management chain, manage and update a tax assessment rule associated with the bill template, control an access traffic at a chain entry corresponding to the bill chain, and control a quantity of consensus nodes participating in consensus on each chain.

For example, when a developer and a tax service participant need to deploy a smart contract corresponding to a derivative service on the application contract chain, the developer and the tax service participant may further read, when accessing the application contract chain network through a chain entry (that is, an application contract chain entry) corresponding to the application contract chain and by using a contract template reading method in a second cross-chain bridge contract on the application contract chain, an application contract template corresponding to the derivative service from a management chain indicated by the contract template reading method, so as to deploy the smart contract corresponding to the derivative service on the application contract chain based on the read application contract template. In this way, when the tax service participant needs to execute the derivative service on the application contract chain subsequently, the tax service participant may use the deployed smart contract corresponding to the derivative service to execute the corresponding derivative service.

It is to be understood that, when the consensus network 200a is used as the electronic bill network, a consensus node (for example, the first consensus node, where the first consensus node may be the consensus node 11b shown in FIG. 1) located in the electronic bill network may be configured to provide a bill service. The bill service herein may include, but not limited to, a bill asset transfer service, an electronic bill issue service, an electronic bill circulate service, an electronic bill adjust service, an electronic bill archive service, and other electronic bill-related services.

In addition, it may be further understood that, when the consensus network 300a is used as the application contract chain network, a consensus node (for example, the second consensus node, where the second consensus node may be the consensus node 12b shown in FIG. 1) located in the application contract chain network may be configured to provide a derivative service (for example, a credit service, an import and export service, and an enterprise qualification service) associated with the foregoing bill service.

It may be understood that, because each entity object may correspond to one blockchain node, in the embodiments of this application, an example in which the entity object is an enterprise object (that is, an enterprise) is used. In this case, the blockchain node associated with each enterprise object may be the same blockchain node (for example, the service node 110c shown in FIG. 1 may perform data exchange with user terminals corresponding to a plurality of enterprise objects). For example, in the foregoing blockchain electronic bill system, the bill service (for example, the bill asset transfer service, the electronic bill issue service, the electronic bill circulate service, the electronic bill adjust service, the electronic bill archive service, and other electronic bill-related services) requested by each enterprise object may be collectively referred to as a transaction service. When the enterprise object requests to transfer a bill asset from the bill chain to the application contract chain through the electronic bill network (for example, the consensus network 200a), the enterprise object may perform, through the service node 110c shown in FIG. 1, data exchange with the consensus node (for example, the consensus node 10b) in the consensus network 100a, the consensus node (for example, the consensus node 11b) in the consensus network 200a, and the consensus node (for example, the consensus node 12b) in the consensus network 300a, to request to complete a corresponding bill service (for example, the bill asset transfer service).

It may be understood that, in the embodiments of this application, an entity object (for example, an enterprise object A, an enterprise object B, . . . , and an enterprise object C) transmits a first cross-chain asset transfer-out request to the electronic bill network for the bill asset transfer service may be collectively referred to as a service object, each blockchain node (for example, the service node 110c) associated with the service object in each service network (for example, the service network 400a) may be collectively referred to as a service node, and each blockchain node obtaining the bill asset transfer service indicated by the first cross-chain asset transfer-out request in the core consensus network (for example, the consensus network 200a used as the electronic bill network) may be further collectively referred to as the first consensus node.

Figure 2A:
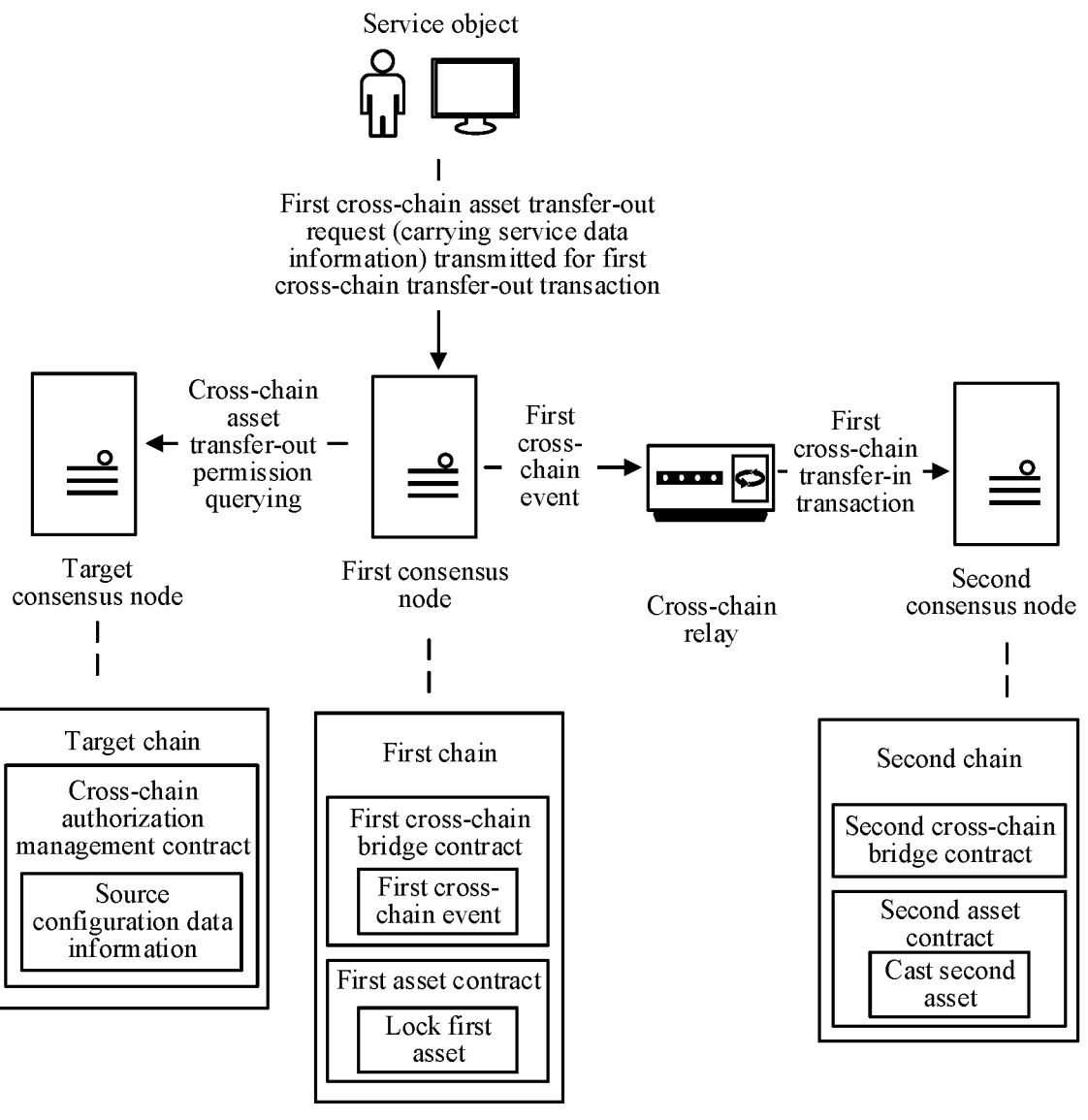
FIG. 2A is a schematic diagram of an application architecture according to an embodiment of this application.

For ease of understanding, further, FIG. 2A is a schematic diagram of an application architecture according to an embodiment of this application, and an asset transferring method based on multiple blockchains provided in this application may be performed by using the application architecture. As shown in FIG. 2A, a first consensus node (that is, a consensus node in the first chain network corresponding to the first chain in FIG. 1), a second consensus node (that is, a consensus node in the second chain network corresponding to the second chain in FIG. 1), a target consensus node (that is, a consensus node in the target chain network corresponding to the target chain in FIG. 1), a cross-chain relay between the first consensus node and the second consensus node, and a service node corresponding to a service object may be included. The service object generates a first cross-chain asset transfer-out request for a first cross-chain transfer-out transaction through the service node. The first cross-chain asset transfer-out request carries service data information configured by the target consensus node for the service object, and the target consensus node stores source configuration data information for the service object. The first consensus node writes transaction data of the first cross-chain transfer-out transaction carried in the first cross-chain asset transfer-out request into a first cross-chain bridge contract (when a first asset is a bill asset, the first cross-chain bridge contract may be referred to as, for example, a first bill cross-chain bridge contract) on the first chain, and determines whether the service object has a cross-chain asset transfer-out permission based on the first cross-chain bridge contract and the service data information, that is, queries the cross-chain asset transfer-out permission through the target consensus node. For example, the first consensus node may specifically obtain the source configuration data information from the target chain based on the first cross-chain bridge contract, the service data information, and a cross-chain authorization management contract on the target chain, to determine the cross-chain asset transfer-out permission of the service object based on the service data information in the first cross-chain asset transfer-out request and the source configuration data information. In a case of determining that the service object has the cross-chain asset transfer-out permission, the first consensus node invokes a first asset contract (when the first asset is a bill asset, the first asset contract may be referred to as, for example, a bill asset contract) on the first chain to lock the first asset (for example, a bill asset), and generates a first cross-chain event corresponding to the first cross-chain transfer-out transaction, to indicate the cross-chain relay (configured to isolate the second chain network and the first chain network) to transmit a constructed first cross-chain transfer-in transaction to the second consensus node. The second consensus node may invoke, when writing transaction data of the first cross-chain transfer-in transaction into a second cross-chain bridge contract (when the first asset is a bill asset, the second cross-chain bridge contract may be referred to as, for example, a second bill cross-chain bridge contract) on the second chain, a second asset contract (when the first asset is a bill asset, the second asset contract may be referred to as, for example, a bill asset mapping contract) to cast a second asset (when the first asset is a bill asset, the second asset may be referred to as, for example, a bill mapping asset) having same asset content as the first asset on the second chain, so that the first consensus node transfers the first asset belonging to the service object from the first chain to the second chain. Therefore, the safety and reliability of transferring on-chain assets in a cross-chain manner may be improved through cooperation of a plurality of blockchains.

It may be understood that, FIG. 2A merely exemplarily represents an application architecture that possibly exists in the technical solutions of this application, and does not constitute any limitation on a specific architecture of the technical solutions of this application. That is, the technical solutions of this application may further provide application architectures in other forms.

In some embodiments, in some embodiments, an electronic device may perform, based on an actual service requirement, the asset transferring method based on multiple blockchains to improve the service stability of a service executed on a chain. The technical solutions of this application may be applied to an on-chain transfer scenario of any on-chain asset, where the on-chain asset may be bill assets of various types, for example, a tax bill such as a common electronic invoice or a value-added tax invoice; or may be a medical bill such as an electronic prescription or an electronic fee note. This is not limited herein.

Figure 2B:
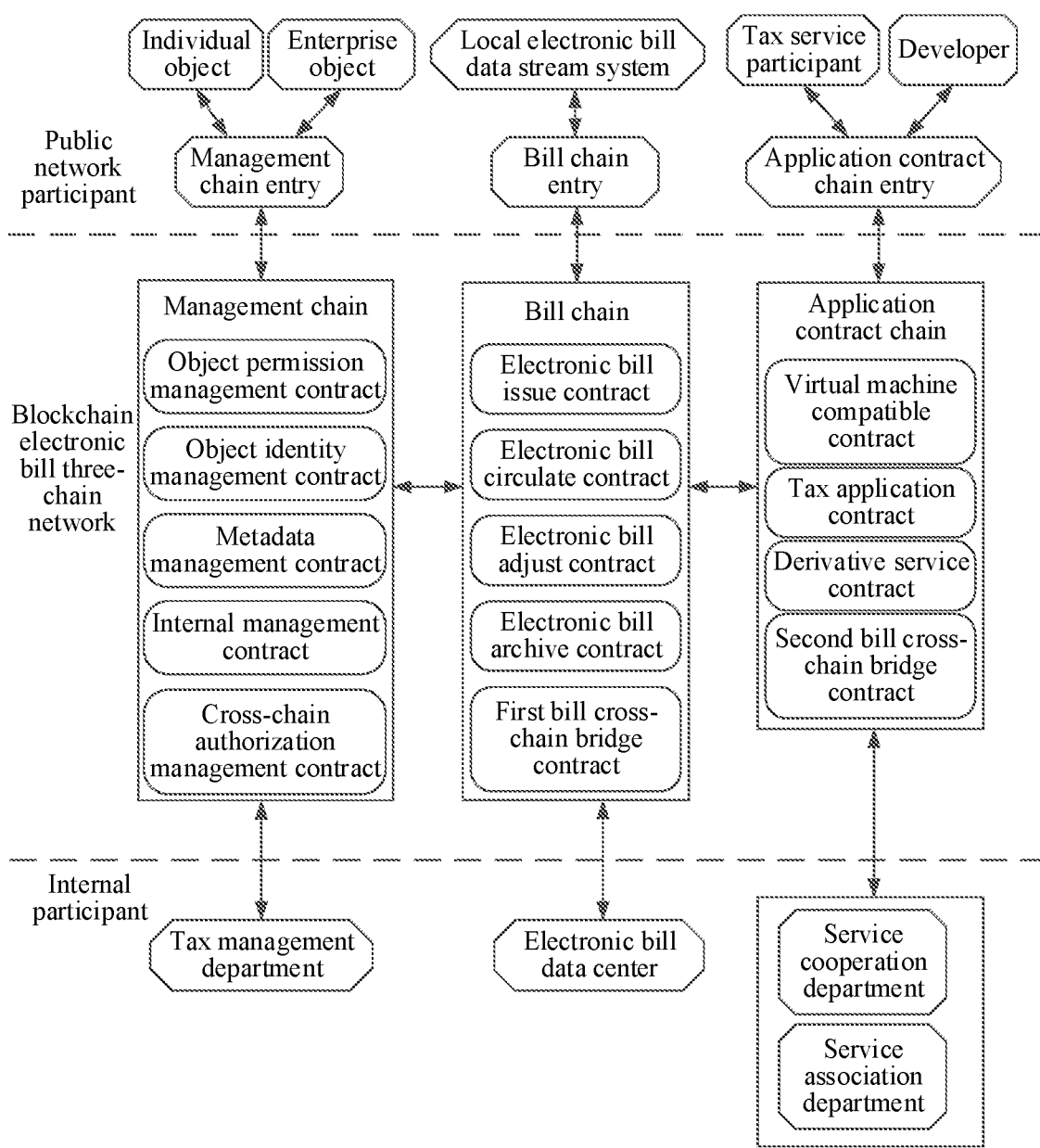
FIG. 2B is a schematic diagram of a scenario of a blockchain electronic bill platform based on multiple blockchains according to an embodiment of this application.

For ease of understanding, further, FIG. 2B is a schematic diagram of a scenario of a blockchain electronic bill platform based on multiple blockchains according to an embodiment of this application. The blockchain electronic bill platform may be a specific service platform in the foregoing blockchain electronic bill system. It is to be understood that, in the blockchain electronic bill platform, to reduce a mixture degree of services executed on chains and on-chain data storage, a new blockchain electronic bill-based multi-chain system is provided, and the multi-chain system mainly involves a blockchain electronic bill three-chain network shown in FIG. 2B. As shown in FIG. 2B, the management chain, the bill chain, and the application contract chain that are mentioned above may be deployed in the blockchain electronic bill three-chain network. It may be understood that, in a service scenario in which a blockchain is used to circulate blockchain electronic bill on-chain data, a function feature of independently executing different services may be provided for the entire blockchain electronic bill platform through cooperation of the management chain, the bill chain, and the application contract chain, where various blockchains respectively execute different services and may cooperate to execute a same service. Therefore, a safe and efficient service stream system may be constructed based on cooperation of the three chains. It is to be understood that, an example in which the multi-chain system is a three-chain system is used herein, and in the three-chain system, the management chain, the bill chain, and the application contract chain are constructed independently. That is, a consensus node configured to maintain the management chain is different from a consensus node configured to maintain the bill chain and is also different from a consensus node configured to maintain the application contract chain.

As shown in FIG. 2B, the management chain deployed in the blockchain electronic bill three-chain network is independent of the bill chain and the application contract chain. That is, the three independently constructed blockchains are independent of each other, but the three independently constructed blockchains may perform data exchange in a cross-chain manner, that is, the three chains may perform cross-chain interaction. For example, when a first bill cross-chain bridge contract (that is, the first cross-chain bridge contract mentioned above) is deployed on the bill chain shown in FIG. 2B, the consensus node (that is, the first consensus node) participating in maintaining the bill chain may read, through the first bill cross-chain bridge contract, service data information on the management chain in a cross-chain manner to confirm a permission (for example, a cross-chain asset transfer-out permission) of a service object. In another example, when a second bill cross-chain bridge contract (that is, the second cross-chain bridge contract mentioned above) is deployed on the application contract chain shown in FIG. 2B, the consensus node (that is, the second consensus node) participating in maintaining the application contract chain may read, through the second bill cross-chain bridge contract, service data information on the management chain in a cross-chain manner to confirm a permission (for example, a cross-chain asset transfer-back permission) of a service object, and may further read, through the second bill cross-chain bridge contract, on-chain data (for example, a bill asset belonging to the service object on the bill chain) on the bill chain in a cross-chain manner to execute a corresponding derivative service (for example, the credit service may be executed through the bill asset transferred from the bill chain, to obtain enterprise credit information of an enterprise).

For example, the management chain herein may be configured to provide a management function feature for the entire blockchain electronic bill platform, and the bill chain herein may provide a function feature of executing bill services of different service permission types for the entire blockchain electronic bill platform. It is to be understood that, in the embodiments of this application, to ensure the safety and independence of the bill asset written into the bill chain, the embodiments of this application provide another blockchain (that is, the application contract chain shown in FIG. 2B) independent of the management chain and the bill chain to provide more standardized and flexible derivative services with complete functions. That is, the application contract chain herein may provide a function feature of carrying out derivative services based on on-chain data in an electronic bill for the entire blockchain electronic bill platform.

For ease of understanding, this is described by using an example in which a core consensus network (that is, the management chain network) in which the management chain is located is the consensus network 100a shown in FIG. 1. In this case, the consensus node participating in maintaining the management chain may be the management consensus node. As shown in FIG. 2B, a plurality of smart contracts are deployed on the management chain, and the smart contracts may run on the management consensus node. It may be understood that, the plurality of smart contracts herein may specifically include an object permission management contract, an object identity management contract, a metadata management contract, an internal management contract, and a cross-chain authorization management contract shown in FIG. 2B. It is to be understood that, the smart contracts deployed on the management chain are respectively determined based on corresponding management contract templates deployed on a chain (that is, the management chain) by an internal participant (that is, a tax management department) shown in FIG. 2B.

It may be understood that, the tax management department may perform a management responsibility through the management consensus node deployed in the management chain network. For example, the management responsibility herein may include managing information inside a service department (for example, information about internal staff of the tax management department), managing a service logic rule of an entire service (for example, a derivative service contract running on the application contract chain and used for executing service logic of a derivative service), managing metadata information of the entire service (for example, access traffic at each chain entry in the three-chain system), and performing identity management and permission management on each participant of the entire service (for example, service objects such as an individual object, an enterprise object, and a tax service participant). It is to be understood that, in a blockchain network corresponding to the entire service, the management chain maintained by the management consensus node is a blockchain that is more stable, has a smallest data scale, and has highest safety.

In addition, for ease of understanding, this is described by using an example in which a core consensus network (that is, the electronic bill network) in which the bill chain shown in FIG. 2B is located is the consensus network 200a shown in FIG. 1. In this case, the consensus node participating in maintaining the bill chain may be the first consensus node. As shown in FIG. 2B, a plurality of smart contracts are deployed on the bill chain, and the smart contracts may run on the first consensus node. Specifically, it may be understood that, the plurality of smart contracts herein may specifically include an electronic bill issue contract, an electronic bill circulate contract, an electronic bill adjust contract, an electronic bill archive contract, and the first bill cross-chain bridge contract (which may be used for executing a bill asset transfer service) shown in FIG. 2B. Similarly, it is to be understood that, the smart contracts deployed on the bill chain are respectively determined based on corresponding bill service contract templates deployed on the management chain by the internal participant (for example, a tax department associated with an electronic bill data center) shown in FIG. 2B.

It may be understood that, the first consensus node deployed in the electronic bill network may maintain service logic of an electronic bill within a full life cycle through the bill chain, for example, may manage full life cycles of all issued electronic bills through the bill chain. For example, the full life cycle of an electronic bill herein includes issuing of the electronic bill, circulation of the electronic bill, and reimbursement of the electronic bill. It is to be understood that, in the blockchain network corresponding to the entire service, the bill chain maintained by the first consensus node has features such as high performance and a low delay.

Similarly, for ease of understanding, this is described by using an example in which a core consensus network (that is, the application contract chain network) in which the application contract chain is located is the consensus network 300a shown in FIG. 1. In this case, the consensus node participating in maintaining the application contract chain may be the second consensus node. As shown in FIG. 2B, a plurality of smart contracts are deployed on the application contract chain, and the smart contracts may specifically run on the second consensus node. It may be understood that, the plurality of smart contracts herein may specifically include a virtual machine compatible contract, an open contract deployment contract, a derivative service contract, and the second bill cross-chain bridge contract (which may be used for executing a bill mapping asset transfer service) shown in FIG. 2B.

It may be understood that, the second consensus node deployed in the application contract chain network may carry a derivative service corresponding to a variable bill service through the application contract chain. For example, the derivative service may include the credit service and a qualification identification service. It is to be understood that, in the blockchain network corresponding to the entire service, the application contract chain maintained by the second consensus node may support a service cooperation department and a consortium chain partner (that is, a service association department shown in FIG. 2B) shown in FIG. 2B in invoking the second bill cross-chain bridge contract indirectly through a tax application contract (the open contract deployment contract) shown in FIG. 2B, to develop a smart contract (for example, the derivative service contract shown in FIG. 2B) related to the derivative service through the application contract template on the management chain read in a cross-chain manner, and deploying the derivative service contract on the application contract chain after being audited by the tax management department. It is to be understood that, the smart contracts deployed on the application contract chain may be flexibly upgraded and changed through the virtual machine compatible contract. It is to be understood that, in the blockchain network corresponding to the entire service, the second consensus node may implement cross-chain interaction through the second bill cross-chain bridge contract on the application contract chain, for example, may read the on-chain data from the bill chain through the second bill cross-chain bridge contract to execute the derivative service. This means that the application contract chain maintained by the second consensus node has a highest openness degree compared with the management chain and the bill chain, supports complex smart contract logic in which there are relatively more participants and the participants change dynamically, and therefore has lower performance than the bill chain.

It may be understood that, in the blockchain electronic bill three-chain network shown in FIG. 2B, a consensus algorithm adopted by the management chain is different from a consensus algorithm adopted by the bill chain, and is also different from a consensus algorithm adopted by the application contract chain.

(1.1) The consensus algorithm associated with the management chain is an instant deterministic consensus algorithm. For example, the instant deterministic consensus algorithm may be a practical Byzantine fault tolerance (PBFT) consensus algorithm, and a state of a to-be-on-chained propose block may be immediately determined through the PBFT consensus algorithm. It is to be understood that, the management chain is a blockchain in the management chain network, and a consensus node (that is, the management consensus node) in the management chain network may be managed by the tax management department shown in FIG. 2B.

It is to be understood that, the internal participant associated with the management chain may be the tax management department shown in FIG. 2B. For example, when serving as the internal participant and accessing the management chain, the tax management department may manage some internal states of the tax management department through the internal management contract on the management chain, for example, may manage staff in the tax management department, or configure specific tax management staff, tax development staff, or tax auditing staff in the staff of the tax management department. In addition, when serving as the internal participant and accessing the management chain, the tax management department may further manage some parameters in the three-chain system through the internal management contract on the management chain, for example, limit an access traffic parameter corresponding to the access traffic at the bill chain entry shown in FIG. 2B through the internal management contract, and specifically, control access traffic within a specific time period at the bill chain entry to be not greater than an access traffic threshold through a time division access mechanism. In another example, when serving as the internal participant and accessing the management chain, the tax management department may further limit a node quantity parameter corresponding to a quantity of consensus nodes on each chain participating in consensus through the internal management contract on the management chain.

(1.2) The consensus algorithm associated with the bill chain is another instant deterministic consensus algorithm. For example, the instant deterministic consensus algorithm may be a tower Byzantine fault tolerance (TBFT) consensus algorithm. The TBFT consensus algorithm is a Byzantine tolerance algorithm, and may ensure safe running of the entire electronic bill network system when a quantity of Byzantine nodes (that is, a quantity of evil nodes in the electronic bill network) is less than $\frac{1}{3}$ of a total quantity of nodes in the electronic bill network. It is to be understood that, consensus nodes in the electronic bill network may be managed by the tax management department. For example, specific tax staff in the tax management department may control a quantity of consensus nodes in the electronic bill network through the internal management contract in the management chain. In another example, a tax terminal corresponding to specific tax staff in the tax management department may participating in forming the electronic bill network.

It is to be understood that, a biggest difference between the TBFT consensus algorithm and the PBFT consensus algorithm lies in that: in the PBFT consensus algorithm, a fixed leader node (that is, a primary node) is configured to pack transactions in a transaction pool, and when the leader node is faulty, a view-change sub-protocol (that is, a primary node switching sub-protocol) is used to replace the leader node; and in the TBFT consensus algorithm, the leader node is alternated based on an alternation mechanism, for example, when a current node is used as the leader node, the leader node is automatically alternated into a next node every time after X blocks (a value of X may be configured) are submitted. This means that the consensus nodes in the electronic bill network corresponding to the bill chain may be configured to generate blocks continuously.

(1.3) The consensus algorithm associated with the application contract chain is still another instant deterministic consensus algorithm. For example, the instant deterministic consensus algorithm herein may be a proof-of-stack (PoS) consensus algorithm, the network safety of an application contract chain network in which the application contract chain is located may be maintained through the proof-of-stack consensus algorithm, and a state of a to-be-on-chained propose block may be immediately determined through the proof-of-stack consensus algorithm. It may be understood that, consensus nodes in the application contract chain network may be managed jointly by the tax management department and the service cooperation department shown in FIG. 2B and a large participating agency (that is, a large enterprise in the foregoing consortium chain, and the large enterprise is the service association department shown in FIG. 2B). For example, tax staff (for example, the tax service participant shown in FIG. 2B) in the tax management department may read bill information of the electronic bill written onto the bill chain through the consensus nodes in the application contract chain network in a cross-chain manner, to execute the derivative service associated with the bill service through the bill information read in a cross-chain manner. For example, qualification identification or credit identification may be performed on an invoice issuing enterprise requesting invoice issuing through the bill information read in a cross-chain manner, to obtain qualification data or credit data of the invoice issuing enterprise. It is to be understood that, as shown in FIG. 2B, when accessing the application contract chain network through the application contract chain entry shown in FIG. 2B, the tax service participant herein may invoke the second bill cross-chain bridge contract on the application contract chain shown in FIG. 2B, to read on-chain data in an electronic bill requested based on the derivative service from the bill chain shown in FIG. 2B, so as to carry out the corresponding derivative service on the application contract chain by using the read on-chain data.

It is to be understood that, in the embodiments of this application, there is no need to directly transfer a large quantity of electronic bills generated on the bill chain to the application contract chain in a cross-chain manner, and some bill information with visible authorization (that is, the on-chain data) in the electronic bills generated on the bill chain is transferred to the application contract chain in a cross-chain manner. In this way, the privacy and safety of the bill assets recorded on the bill chain may be fundamentally ensured.

It may be learned that, the tax service participant requesting to access the application contract chain may read different on-chain data from the bill chain in a cross-chain manner based on different requested derivative services (that is, may obtain bill information with different data content from the foregoing electronic bills).

It is to be understood that, the smart contracts in the blockchain electronic bill three-chain network have the following differences:

(2.1) It is to be understood that, the management chain shown in FIG. 2B may support a specific language smart contract engine, and the management consensus node may deploy a specific language smart contract on the management chain through the specific language smart contract engine, for example, may deploy the object permission management contract, the object identity management contract, the metadata management contract, the internal management contract, and the cross-chain authorization management contract shown in FIG. 2B on the management chain. It is to be understood that, the smart contracts may be developed and managed by specific tax management staff in the tax management department.

(2.2) Smart contracts in specific bill service logic are built in the bill chain shown in FIG. 2B, and the smart contracts (for example, the electronic bill issue contract, the electronic bill circulate contract, the electronic bill adjust contract, the electronic bill archive contract, and the first bill cross-chain bridge contract shown in FIG. 2B) may be upgraded as the bill service is updated. For example, in the embodiments of this application, an electronic bill template in the electronic bill issue contract may be updated by using an electronic bill template of a latest version read from the management chain, and the bill service may be further updated and processed based on the updated electronic bill issue contract. This means that the bill chain does not support an independent smart contract engine, and naturally also does not support deployment of other contracts irrelevant to the bill service on the bill chain. An advantage thereof lies in that the bill chain merely runs service logic related to electronic bills and is not affected by other smart contracts, so that running of bill chain may be more independent, stable, and attack-resistant.

(2.3) The application contract chain supports multi-language, turning-complete, and developer-oriented smart contracts. For example, as shown in FIG. 2B, when a developer accesses the application contract chain through the application contract chain entry, a mainstream EVM virtual machine may be compatible through the virtual machine compatible contract, so that various new service contracts may be deployed and run on a compatible virtual machine. For example, a derivative service contract associated with the derivative service (for example, a prize drawing service) may be deployed on the application contract chain. In another example, a derivative application contract associated with another derivative service (for example, a tax rebate service) may be deployed on the application contract chain.

It is to be understood that, as shown in FIG. 2B, in the blockchain electronic bill three-chain network, no corresponding bill cross-chain bridge contract is deployed on the management chain, so that the management chain does not include a cross-chain capability in this case. Corresponding bill cross-chain bridge contracts are respectively deployed on the bill chain and the application contract chain shown in FIG. 2B, so that the two chains include a cross-chain capability.

In some embodiments, a consensus node associated with the bill chain (for example, the first consensus node) may read some management chain information from the management chain through the first bill cross-chain bridge contract shown in FIG. 2B, for example, may read the source configuration data information used for confirming the service permission (for example, the cross-chain asset transfer-out permission) of the service object from the management chain. For example, the consensus node may further read a latest electronic bill template from the management chain.

In addition, a consensus node associated with the application contract chain (for example, the second consensus node) may read some management chain information from the management chain through the second bill cross-chain bridge contract shown in FIG. 2B, for example, may read the source configuration data information used for confirming the service permission (for example, the cross-chain asset transfer-back permission) of the service object from the management chain. For example, the consensus node may further read a latest application contract template from the management chain. In addition, the second consensus node may further read some bill chain information from the bill chain in a cross-chain manner (for example, read the bill asset used for executing the derivative service from the bill chain).

It is to be understood that, as shown in FIG. 2B, in the blockchain electronic bill three-chain network, a public network participant associated with the management chain may be the individual object and enterprise object shown in FIG. 2B. Similarly, as shown in FIG. 2B, a public network participant associated with the bill chain may be the local electronic bill data stream system shown in FIG. 2B. The local electronic bill data stream system specifically includes each local electronic bill service issue system (for example, each local tax system), an electronic bill invoice issuing service provider, and a large enterprise finance and tax-related system. Similarly, as shown in FIG. 2B, a public network participant associated with the application contract chain may be the tax service participant and the developer shown in FIG. 2B.

(3.1) A chain entry associated with the management chain may be the management chain entry shown in FIG. 2B. When the individual object (for example, a user A) and the enterprise object (for example, an enterprise B) shown in FIG. 2B serve as the public network participant, the individual object and the enterprise object may access the management chain through the management chain entry, and may further perform services such as identity registration and identity authorization through the management chain.

(3.2) A chain entry associated with the bill chain may be the bill chain entry shown in FIG. 2B. When the local electronic bill data stream system (for example, a large enterprise object) shown in FIG. 2B serves as the public network participant, the local electronic bill data stream system may access the bill chain through the bill chain entry, and may further execute the bill asset cross-chain transfer service, the electronic bill issue service, the electronic bill circulate service, the electronic bill adjust service, and the electronic bill archive service through the bill chain.

(3.3) A chain entry associated with the application contract chain may be the application contract chain entry shown in FIG. 2B. When the tax service participant and the developer shown in FIG. 2B serve as the public network participant, the tax service participant and the developer may access the application contract chain through the application contract chain entry, and may further deploy a derivative service contract on the application contract chain, to execute a derivative service related to an electronic bill through the deployed derivative service contract. It is to be understood that, the developer shown in FIG. 2B may further deploy, when accessing the application contract chain, derivative service contracts corresponding to other derivative services (for example, an exploratory service) on the application contract chain, and a contract quantity of derivative service contracts deployed on the application contract chain is not limited herein.

It may be understood that, the management chain entry shown in FIG. 2B may be a tax management department entry, and identity identification and service guidance are performed on an individual, a legal person, and an entity that need to access the management chain through the tax management department entry.

It may be understood that, the bill chain entry shown in FIG. 2B may be an electronic bill service entry, and transaction service data (or may be referred to as transaction data) of an electronic bill that a service object (for example, a service object having an on-chain bill asset, such as the enterprise B) requests to issue may be received through the electronic bill service entry. In this way, when receiving the transaction service data (for example, the first cross-chain transfer-out transaction corresponding to the transfer service) submitted by the enterprise B through the electronic bill service entry, the first consensus node may further verify, through the electronic bill service entry, whether an access identity and an access permission of a data sender (that is, the enterprise B serving as the service object) of the transaction service data meet a state requirement of an identity permission contract in the management chain. For example, the first consensus node may determine, when the verification succeeds, that the enterprise B serving as the service object is an authorized object, and may further read the source configuration data information of the service object from the management chain through the first bill cross-chain bridge contract on the bill chain to determine a service permission (for example, the cross-chain asset transfer-out permission) of the enterprise B serving as the authorized object. It is to be understood that, whether the service permission of the enterprise B serving as the authorized object meets a state requirement of the cross-chain authorization management contract in the management chain may be further determined through the source configuration data information.

For example, the first consensus node may determine, through the electronic bill service entry, whether the access identity and the access permission of the data sender (that is, the enterprise B) meets contract state requirements of the object identity management contract and the internal management contract in the management chain, and may further determine, when determining that the contract state requirements of the object identity management contract and the internal management contract in the management chain are met, that identity authentication on the data sender (that is, the enterprise B) that needs to access the bill chain is completed. It may be learned that, registration data information of each authorized object synchronized from the management chain is stored at the bill chain entry shown in FIG. 2B, and the registration data information herein may include, but not limited to, object access identity registration information and object access permission registration information. For example, the object access identity registration information herein may be used for identifying whether the service object (that is, the enterprise B) that currently requests to access the bill chain is an authorized object. The object access permission registration information herein includes a request accumulation threshold (for example, a maximum concurrent request accumulation amount) configured by the management consensus node for the electronic bill service entry of the bill chain through the internal management contract. In another example, when the identity authentication performed on the data sender succeeds, the first consensus node may read source configuration data of the service object from the management chain, determine whether the authorized object (that is, the enterprise B) meets a contract state requirement of the cross-chain authorization management contract in the management chain, and may further determine, when determining that the contract state requirement of the cross-chain authorization management contract in the management chain is met, that cross-chain permission verification on the data sender (that is, the enterprise B) that needs to perform bill asset cross-chain transferring on the bill chain is completed.

It may be understood that, the application contract chain entry shown in FIG. 2B may be a tax derivative service entry, and a derivative service associated with the bill service and in which a service object (for example, a second service object, where the second service object may be the tax service participant shown in FIG. 2B) requests to participate may be received through the tax derivative service entry. It is to be understood that, after the tax service participant and the developer shown in FIG. 2B obtain a service participation permit issued by the tax management department for an authorized object, verification may be performed on the service participation permit submitted by the second service object (for example, the tax service participant or the developer) through the application contract chain entry, and the second service object may be further allowed to access the application contract chain after the verification succeeds, to execute the derivative service associated with the bill service on the application contract chain.

As shown in FIG. 2B, an internal participant participating in maintaining the management chain may be the tax management department shown in FIG. 2B. The tax management department herein is mainly configured to configure and manage internal state parameters on the management chain, and may be further configured to change and on-chain the metadata information (for example, tax metadata) (for example, update the electronic bill template or update the tax assessment rule), and manage an identity and a permission of each service participant maintained on the management chain (for example, freeze an enterprise invoice issuing qualification, limit an enterprise invoice issuing limit, and a permission of transferring a bill asset in a cross-chain manner).

As shown in FIG. 2B, an internal participant participating in maintaining the bill chain may be the electronic bill data center shown in FIG. 2B. The electronic bill data center herein may specifically be an electronic invoice data center, and the electronic bill data center (for example, the electronic invoice data center) may be configured to perform operations such as off-chain backup, counting, and data analysis and auditing on massive account data (for example, electronic bill streams generated based on real-time bill service streams) recorded on the bill chain. In some embodiments, a time-division invoice issuing quantity may be counted through the electronic bill data center, a risky bill (for example, a risky invoice) or a risky enterprise may be further determined based on the counted time-division invoice issuing quantity, and data analysis may be further performed on related financial and economic data.

As shown in FIG. 2B, an internal participant participating in maintaining the application contract chain may be the service cooperation department and the service association department shown in FIG. 2B. It is to be understood that, in addition to the tax management department serving as the internal participant participating in maintaining the application contract chain, other departments (that is, the service cooperation department) and participants (that is, the service association department) in the system consortium chain may further execute, when accessing the application contract chain, corresponding derivative services through the derivative service contract on the application contract chain. It may be understood that, advantages of the service cooperation department and the service association department shown in FIG. 2B serve as the tax service participant and access the application contract chain lie in that: various types of extensible derivative services may be flexibly run in a complete smart contract claim period, to ensure the flexibility of service changes, and there is no need to be in direct contact with the on-chain data of the electronic bill on the bill chain, thereby ensuring the data privacy and on-chain data safety on the bill chain. For example, a bill asset on which a derivative service needs to be executed may be transferred from the bill chain to the application contract chain. The application contract chain herein may be merely in contact with the transferred bill asset, and cannot be in contact with on-chain data other than the bill asset (for example, other on-chain data on a block in which the bill asset is located). This means that in the embodiments of this application, the transferred bill asset is authorization visible to the application contract chain on the bill chain. In this way, the service object may perform effective extension on the application contract chain based on the derivative service requested by the bill asset.

It is to be understood that, in this case, the second consensus node cannot know other bill information irrelevant to the derivative service in the electronic bill (that is, the bill asset), and cannot be in contact with another electronic bill (for example, an electronic bill issued by an enterprise D) irrelevant to the derivative service on the bill chain. Therefore, the privacy, safety, and reliability of bill data stored on the bill chain may be ensured.

It may be understood that, corresponding smart contracts may be respectively built in the blockchain electronic bill three-chain network shown in FIG. 2B.

(4.1) For the smart contracts built in the management chain, as shown in FIG. 2B, the object identity management contract built in the management chain may specifically be a user management contract, and identities of each accessor (for example, the public network participant) and each participant (for example, the internal participant) in the entire three-chain system may be managed through the user management contract. It is to be understood that, the accessor and the participant herein may specifically include tax management staff (referred to as an administrator), a service cooperation department, a local tax bureau, an invoice issuing service provider, a reimbursement service provider, and a tax auditing department. In addition, the object permission management contract built in the management chain may specifically be an enterprise identity management contract, and service permissions and tax states of some enterprises may be managed through the enterprise identity management contract. Similarly, the metadata management contract built in the management chain may specifically be a tax metadata management contract, and metadata information such as a tax rule may be managed through the tax metadata management contract. For example, a contract module, tax assessment logic, and a latest policy rule in the three-chain system may be managed in a centralized manner. By analogy, the internal management contract built in the management chain may be used for managing some internal states of the tax management department, and managing some internal parameters on each chain in the three-chain system, for example, limiting an access traffic parameter at the bill chain entry (for example, an electronic invoice service entry) through the internal management contract, and limiting a consensus node quantity parameter in the three-chain system.

This application relates to the cross-chain authorization management contract in the management chain. The cross-chain authorization management contract may be used for configuring service data information used for permission verification for a service object requesting to transfer a bill asset in a cross-chain manner. For example, when the management consensus node configures corresponding service data information for the service object, the configured corresponding service data information may be used as source configuration data information and on-chained to the management chain, and the configured corresponding service data information may be further returned to the service object, to further execute a transfer service corresponding to the bill asset on the bill chain requesting to transfer the bill asset in a cross-chain manner. In addition, the service object may store the service data information locally.

(4.2) For the smart contracts built in the bill chain, as shown in FIG. 2B, the smart contracts built in the bill chain may include the first bill cross-chain bridge contract and a bill service contract associated with an electronic bill life cycle. The bill service contract herein may specifically include the electronic bill issue contract used for providing an electronic bill issue service, the electronic bill circulate contract used for providing an electronic bill circulate service, the electronic bill adjust contract used for providing an electronic bill adjust service, and the electronic bill archive contract used for providing an electronic bill archive service shown in FIG. 2B. The first bill cross-chain bridge contract may be used for performing cross-chain transferring of a bill asset (for example, the bill asset may specifically be transferred from the bill chain to the application contract chain), and reading the service data information configured for the service object on the management chain in a cross-chain manner, to perform permission query on the service object that currently requests to transfer the bill asset in a cross-chain manner, for example, query a cross-chain asset transfer-out permission of the service object.

(4.3) For the smart contracts built in the application contract chain, as shown in FIG. 2B, the smart contracts built in the application contract chain may include the second bill cross-chain bridge contract, and may further include various types of contracts (for example, the virtual machine compatible contract, the tax application contract, and the derivative service contract shown in FIG. 2B) deployed by a tax derivative service participant (that is, a derivative service object, for example, the tax service participant shown in FIG. 2B). For example, the derivative service contract herein may specifically be an electronic bill-based credit service contract, and credit data of an enterprise may be obtained through analysis based on the credit service contract. In another example, the derivative service contract herein may alternatively specifically be an on-chain prize drawing service contract, a talent motivation contract, and a tax rebate service contract that are deployed for encouraging invoice issuing. It may be understood that, the second bill cross-chain bridge contract herein may be used for reading the metadata information (for example, the latest policy rule associated with the tax rebate service) on the management chain in a cross-chain manner, to update some service parameters of the application contract chain (for example, update a contract parameter of a tax rebate service contract deployed on the application contract chain). In addition, the second bill cross-chain bridge contract herein may be further used for performing cross-chain transferring of the bill asset (for example, the bill asset may be transferred from the bill chain to the application contract chain, to execute service logic of a derivative service on the application contract chain through the electronic bill transferred in a cross-chain manner, that is, the contract may be used for reading an electronic bill with visible authorization of the requested derivative service on the bill chain in a cross-chain manner), and reading the service data information configured for the service object on the management chain in a cross-chain manner, to perform permission query on the service object that currently requests to transfer a bill mapping asset in a cross-chain manner, for example, query a cross-chain asset transfer-back permission of the service object.

It is to be understood that, the management chain shown in FIG. 2B is mainly used for processing management service streams with a small data amount and a constant state, and the openness of the entire management chain is relatively low, so that the management chain may be used for performing internal management on some tax data. The bill chain shown in FIG. 2B may be used for processing some real-time bill service streams whose data amount is in a high-frequency request state for a long time. The openness of the entire bill chain is relatively high, so that a related authority in the life cycle of the electronic bill may be allowed to participate in a corresponding bill service, for example, a consensus node corresponding to an agent service provider may be allowed to issue an electronic bill for a user that currently requests to issue a bill. In addition, for the application contract chain shown in FIG. 2B, a size of a data amount does not need to be limited, and frequency fluctuation of a service change is relatively great, so that the application contract chain may be mainly used for processing various cooperation services, derivative services, and exploratory services. It is to be understood that, the application contract chain has the highest openness, and may run smart contracts deployed by a management chain authorization participant on the application contract chain and run an exploratory derivative service. It is to be understood that, in the embodiments of this application, considering that the application contract chain has relatively high openness and service change flexibility, during execution of the smart contracts deployed on the application contract chain, more contract safety limitations may be provided. For example, a contract execution step may be limited (for example, for the derivative service contract shown in FIG. 2B, a contract method that is in the derivative service contract and that can be accessed by a current service object (that is, the second service object) may be limited), and storage resource data that needs to be consumed for accessing the derivative service contract may be limited (that is, a specific amount of storage resource data needs to be consumed for invoking the smart contracts on the application contract chain).

It may be understood that, the consensus node in the three-chain system involved in the embodiments of this application may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In the embodiments of this application, when a consensus node obtains data such as an on-chain asset (for example, the bill asset, and specifically, an electronic bill) of a service object (for example, the individual object or the enterprise object) in a cross-chain manner, a prompt interface or window may be displayed, where the prompt interface or window window is used for prompting that the service object is currently collecting the data such as the bill asset. A step related to data obtaining is started only after obtaining that the service object performs a confirm operation on the prompt interface or window; otherwise, the step is ended.

In addition, it may be understood that, in specific implementations of this application, service data of a service object such as a user, an enterprise, or an agency (for example, invoice issuing information, credit information, and tax rebate information of the user, or information such as import and export or enterprise qualification of the enterprise) may be involved. When a specific product or technology is used in the embodiments of this application, an approval or agreement of the service object such as the user, the enterprise, or the agency needs to be obtained, and collection, use, and processing of related data need to comply with related laws, regulations, and standards of related countries and regions.

For a specific process of executing the bill service on the bill chain and a specific process of executing the derivative service associated with the bill service on the application contract chain, reference may be made to the embodiments shown in FIG. 3 to FIG. 11. In addition, for ease of description, the following is described by using an example in which the embodiments of this application are applied to a blockchain electronic bill system, and in the following, the mentioned bill chain is a first chain, the mentioned application contract chain is a second chain, the mentioned management chain is a target chain, the mentioned electronic bill network is a first chain network, the mentioned application contract chain network is a second chain network, the mentioned management chain network is a target chain network, and the mentioned management consensus node is a target consensus node.

FIG. 3 is a flowchart of an asset transferring method based on multiple blockchains according to an embodiment of this application. The method may be performed by a first consensus node in a first chain network (for example, an electronic bill network) corresponding to the first chain (for example, a bill chain) mentioned above. For example, the first consensus node may be any consensus node in the consensus network 200a shown in FIG. 1. The method may include the following step S301 to step S303:

S301. Obtain a first cross-chain asset transfer-out request transmitted by a service object for a first cross-chain transfer-out transaction.

In some embodiments, the first cross-chain asset transfer-out request carries service data information configured by a target consensus node (for example, a management consensus node) in a target chain network (for example, a management chain network) for the service object. The service data information is configured by the target consensus node for the service object and is information used for performing permission verification. In some embodiments, the service data information is used for performing cross-chain permission verification.

In a possible implementation, the target consensus node stores source configuration data information configured for each service object, and the source configuration data information is also used for performing permission verification. After the target consensus node transmits the source configuration data information to each service object, the service object stores the source configuration data information as the service data information. In a subsequent process, the source configuration data information at the target consensus node and the service data information at the service object may cooperate with each other to complete permission verification on the service object.

The service object may perform on-chain interaction through a service node in which the service object is located and any blockchain in the multiple blockchains, and invoke a related on-chain service contract. For example, the service object may apply, to a management consensus node corresponding to a management chain, for the service data information used for performing cross-chain permission verification in advance. In a case of generating the first cross-chain asset transfer-out request through the service node, the service object may obtain the service data information from the management chain, and generate the first cross-chain asset transfer-out request for the first cross-chain transfer-out transaction based on the obtained service data information. Alternatively, the service object may store the service data information locally in advance through the service node, and obtain the service data information, when generating the first cross-chain asset transfer-out request, to generate the first cross-chain asset transfer-out request.

In addition, a cross-chain authorization management contract may be deployed on the management chain. Therefore, the service node in which the service object is located may transmit a cross-chain permission application to a related bill department through a bill management entry, and the related bill department invokes, after verification on the service object based on the cross-chain permission application succeeds, a cross-chain permission application method in the cross-chain authorization management contract on the management chain, to apply for a cross-chain permission for the service object and configure the service data information used for cross-chain permission verification for the service object, and returns the service data information to the service object after the application succeeds. In addition, the management consensus node may store the service data information of the service object, for example, store the service data information in the management chain. In this case, the service data information stored on the management consensus node side may be referred to as the source configuration data information of the service object. The service data information may be, for example, a dedicated authorization code configured for the service object, or identity information of the service object.

In some embodiments, the first cross-chain transfer-out transaction in the first cross-chain asset transfer-out request is used for indicating the first consensus node to transfer a specified first asset (for example, a bill asset) belonging to the service object from a bill chain to a second chain (for example, an application contract chain) associated with a second consensus node through a cross-chain relay. The second consensus node is a consensus node in a second chain network (for example, an application contract chain network) corresponding to an application contract chain. When the service object needs to execute a derivative service on the specified bill asset, the first cross-chain asset transfer-out request may be generated to transfer the specified bill asset from the bill chain to the application contract chain. For example, the first cross-chain transfer-out transaction in the first cross-chain asset transfer-out request is used for indicating the service object to transfer electronic bills within three months from the bill chain to the application contract chain. The application contract chain network corresponding to the application contract chain is independent of the management chain network corresponding to the management chain and the electronic bill network corresponding to the bill chain.

In some embodiments, when generating the first cross-chain asset transfer-out request through the service node, the service object may further specify an asset use permission for the to-be-transferred bill asset, and write the specified asset use permission into the first cross-chain transfer-out transaction. For example, the asset use permission may be merely used for a bill adjust service or a bill transfer service.

S302. Write transaction data of the first cross-chain transfer-out transaction into a first cross-chain bridge contract on the first chain.

The first consensus node may write the transaction data of the first cross-chain transfer-out transaction obtained from the first cross-chain asset transfer-out request into the first cross-chain bridge contract (for example, a first bill cross-chain bridge contract). The first bill cross-chain bridge contract may be used for performing permission verification on the first cross-chain transfer-out transaction and performing a transfer process of the bill asset after the permission verification succeeds.

In addition, when the first cross-chain transfer-out transaction of the first cross-chain asset transfer-out request carries the asset use permission, when the transaction data of the first cross-chain transfer-out transaction is written into the first bill cross-chain bridge contract, the asset use permission of the bill asset corresponding to the first cross-chain transfer-out transaction may be specified. For example, the bill asset is specified to be merely used for a bill adjust service after being transferred.

S303. Invoke, when determining that the service object has a cross-chain asset transfer-out permission based on the first cross-chain bridge contract and the service data information, a first asset contract on the first chain to lock the first asset, and generate a first cross-chain event corresponding to the first cross-chain transfer-out transaction.

The first bill cross-chain bridge contract may be used for performing permission verification on the first cross-chain transfer-out transaction, and execute the transfer process of the bill asset after the verification succeeds and determining that the service object has the cross-chain asset transfer-out permission.

The cross-chain asset transfer-out permission is determined by the target consensus node in the target chain network, or is determined jointly by the target consensus node and the first consensus node. In some embodiments, the cross-chain asset transfer-out permission is determined based on the source configuration data information and the service data information obtained by the target consensus node through querying.

In a possible implementation, the performing permission verification based on the first bill cross-chain bridge contract to determine whether the service object has a cross-chain asset transfer-out permission may be: invoking a cross-chain permission query method in the first bill cross-chain bridge contract, to generate a transfer-out permission verification request, where the transfer-out permission verification request is used for indicating the management consensus node to invoke a cross-chain permission management contract on the management chain to query the source configuration data information of the service object, for example, invoke the cross-chain permission query method in the cross-chain permission management contract to query whether the service object has the source configuration data information; and the management consensus node may further set a validity period for the source configuration data information, and when the service object has the source configuration data information and the source configuration data information is within the validity period, it indicates that the source configuration data information is queried, and the source configuration data information may be returned; and receiving, by the first consensus node, the source configuration data information returned by the management consensus node based on the transfer-out permission verification request, performing information comparison on the source configuration data information and the service data information carried in the first cross-chain asset transfer-out request to obtain an information comparison result, and determining whether the service object has the cross-chain asset transfer-out permission based on the information comparison result. For example, information comparison may be performed on the service data information and the source configuration data information through an information comparison method in the first bill cross-chain bridge contract.

Alternatively, in another possible implementation, the performing permission verification based on the first bill cross-chain bridge contract to determine whether the service object has a cross-chain asset transfer-out permission may be: invoking the first bill cross-chain bridge contract to generate a transfer-out permission verification request carrying the service data information, where the transfer-out permission verification request is used for indicating the management consensus node to invoke a cross-chain authorization management contract on the management chain to query the source configuration data information of the service object, and performing information comparison on the source configuration data information and the service data information in the transfer-out permission verification request to obtain an information comparison result; and for example, the management consensus node invokes a cross-chain permission query method in a cross-chain permission management contract on the management chain to query whether the service object has the source configuration data information, and invokes an information comparison method in the cross-chain permission management contract to perform information comparison on the service data information and the source configuration data information; and receiving, by the first consensus node, the information comparison result returned by the management consensus node based on the transfer-out permission verification request, and determining whether the service object has the cross-chain asset transfer-out permission based on the information comparison result.

It may be understood that, the determining whether the service object has the cross-chain asset transfer-out permission may be that: when the information comparison result indicates that the comparison succeeds, it indicates that the service data information is the same as the source configuration data information, and it is determined that the service object has the cross-chain asset transfer-out permission, that is, it is determined that transferring of the bill asset is valid in this case; and when the information comparison result indicates that the comparison fails, it indicates that the service data information is different from the source configuration data information, and it is determined that the service object does not have the cross-chain asset transfer-out permission.

It is to be understood that, when determining that the service object has the cross-chain asset transfer-out permission, the specified bill asset needs to be locked based on the first cross-chain transfer-out transaction, to ensure the consistency of the bill asset transferred to the application contract chain and the bill asset on the bill chain, and ensure that the transferred bill asset is not affected by another service on the bill chain, thereby ensuring the service stability of the transfer service corresponding to the first cross-chain transfer-out transaction.

In some embodiments, a manner of locking the bill asset may be: invoking the first asset contract (for example, a bill asset contract) to switch an asset state of the bill asset from a first state to a second state. The bill asset contract is used for managing a full life cycle and each bill attribute (for example, the asset state or an asset attribute state of the bill asset) of an on-chain bill asset. For example, the bill asset contract may be used for locking a bill asset that is transferred out and unlocking a bill asset that is transferred back.

The invoking the bill asset contract to perform asset state switching may be: invoking, through an asset contract invocation method in the first bill cross-chain bridge contract, the bill asset contract to perform asset state switching of the bill asset on the bill chain. The first state may be a normal state, that is, a state indicating that the bill asset is not locked; and the second state may be a locked state, that is, a state indicating that the bill asset has been locked. In this case, the locked bill asset on the bill chain cannot be operated and modified. Based on this, a contract (for example, the first bill cross-chain bridge contract) deployed on the bill chain has a capability of invoking a contract (for example, the bill asset contract) in a cross-chain manner.

Therefore, the first consensus node may invoke, when detecting that the asset state of the bill asset is the second state, the first bill cross-chain bridge contract to generate the first cross-chain event corresponding to the first cross-chain transfer-out transaction. In this case, this indicates that the first cross-chain transfer-out transaction has been executed on the first consensus node. For example, the first consensus node may invoke an event generation method in the first bill cross-chain bridge contract to generate the first cross-chain event based on the first cross-chain transfer-out transaction.

For example, the first consensus node may invoke the event generation method in the first bill cross-chain bridge contract to sign, by using private key information on the bill chain, information such as the bill asset, the asset attribute state of the bill asset, and the first cross-chain transfer-out transaction, to obtain first event signature information, and generate the first cross-chain event based on the first event signature information and the foregoing information.

In addition, when the first consensus node specifies the asset use permission of the bill asset corresponding to the first cross-chain transfer-out transaction, the first consensus node invokes the first bill cross-chain bridge contract to determine a permission parameter corresponding to the asset use permission, signs, when generating the first event signature information, the permission parameter together, and constructs the first cross-chain event based on the obtained first event signature information and the permission parameter. That is, the generated first cross-chain event carries the permission parameter corresponding to the transferred bill asset. The permission parameter is used for representing a specified asset use of the bill asset after being transferred.

It is to be understood that, the first cross-chain event is used for indicating the cross-chain relay to transmit, when obtaining a first cross-chain transfer-in transaction corresponding to the first cross-chain transfer-out transaction through construction, the first cross-chain transfer-in transaction to the second consensus node. The first cross-chain transfer-in transaction is used for indicating the second consensus node to transfer the bill asset to the application contract chain. That is, the second consensus node may invoke, when writing transaction data of the first cross-chain transfer-in transaction into a second cross-chain bridge contract (for example, a second bill cross-chain bridge contract) on the application contract chain, a bill asset mapping contract indicated by the second bill cross-chain bridge contract, to cast a second asset (for example, a bill mapping asset) having same asset content as the bill asset on the application contract chain. Therefore, the first cross-chain transfer-in transaction and the first cross-chain transfer-out transaction are used for indicating to transfer the bill asset from the bill chain to the application contract chain. For a process that the second consensus node executes the first cross-chain transfer-in transaction, reference may be made to related description of the embodiment shown in FIG. 7 below.

In addition, the cross-chain relay may be configured to isolate the application contract chain network and the electronic bill network. The cross-chain relay may be operated by a related bill department and may be configured to continuously capture a cross-chain event between the bill chain and the application contract chain, to generate a corresponding cross-chain transaction and submit the cross-chain transaction to another chain. Therefore, the cross-chain relay may detect an event generated by the first bill cross-chain bridge contract of the bill chain, obtain, when detecting the first cross-chain event, the first cross-chain event from the bill chain of the first consensus node, and generate the corresponding first cross-chain transfer-in transaction based on the information such as the first cross-chain transfer-out transaction, the bill asset, the asset attribute state, and the permission parameter in the first cross-chain event, to transfer the bill asset. The first cross-chain transfer-in transaction includes the bill asset and a transaction parameter (for example, the information such as the asset attribute state or the permission parameter).

It is to be understood that, when reading the first cross-chain event, the cross-chain relay needs to perform event verification on the first cross-chain event, and generates the corresponding first cross-chain transfer-in transaction after the event verification succeeds. For example, the first cross-chain event includes the first event signature information and a carried first event parameter (for example, the information such as the first cross-chain transfer-out transaction, the bill asset, the asset attribute state, and the permission parameter). The foregoing involved event verification process may be that: the cross-chain relay performs signature verification on the first event signature information in the first cross-chain event through public key information corresponding to the private key information of the bill chain, obtains a to-be-verified first event parameter corresponding to the first event signature information after the signature verification succeeds, and performs event comparison on the carried first event parameter and the to-be-verified first event parameter to obtain an event comparison result, so as to determine an event verification result.

It may be understood that, when the carried first event parameter is the same as the to-be-verified first event parameter, the event comparison result indicates that the event verification succeeds; and when the carried first event parameter is different from the to-be-verified first event parameter, the event comparison result indicates that the event verification fails.

Therefore, when a service is executed, the bill asset is transferred through cooperation of the three blockchains, so that the process of executing an on-chain transfer service becomes more brief and clearer, and the transferring efficiency of the on-chain transfer service may be higher when other on-chain services may be normally executed. In this way, the service stability of the transfer service may be improved, and the safety and reliability of transferring a bill asset in a cross-chain manner on the blockchain may be improved.

For example, FIG. 4 is a schematic diagram of a cross-chain asset transfer-out scenario according to an embodiment of this application. A service object A applies for a cross-chain permission to a management consensus node in advance through a service node, and the management consensus node configures service data information X for the service object A by invoking a cross-chain authorization management contract on a management chain and stores the configured service data information. In this case, the service data information stored by the management consensus node is source configuration data information X'.

The service object A transmits a first cross-chain asset transfer-out request for a first cross-chain transfer-out transaction to a first consensus node. The first cross-chain asset transfer-out request carries the service data information X, and the first cross-chain asset transfer-out request is used for indicating to transfer a bill asset P belonging to the service object A. In addition, the service object A may further specify an asset use permission (for example, merely used for adjustment) of P after being transferred. For example, the service object A may configure the first cross-chain transfer-out transaction and specify the asset use permission through a transaction configuration interface displayed by the service node, and the service node generates the corresponding first cross-chain asset transfer-out request based on an operation of the service object A on the transaction configuration interface.

The first consensus node writes transaction data of the first cross-chain transfer-out transaction into a first bill cross-chain bridge contract, specifies the asset use permission of the bill asset, and performs verification on a cross-chain asset transfer-out permission of the service object based on the first bill cross-chain bridge contract and the service data information X. The performing verification on a cross-chain asset transfer-out permission may be as follows: the first consensus node generates a transfer-out permission verification request through the first bill cross-chain bridge contract and transmits the transfer-out permission verification request to the management consensus node; the management consensus node queries, through the transfer-out permission verification request and a cross-chain permission management contract, the stored source configuration data information X' of the service object A; and the first consensus node performs information comparison on the service data information X and the source configuration data information X', to determine whether the service object has the cross-chain asset transfer-out permission (when X is consistent with X', it is considered that the service object has the permission). In a case of determining that the service object has the cross-chain asset transfer-out permission, the first consensus node invokes a bill asset contract through the first bill cross-chain bridge contract to lock the bill asset P and generates a corresponding first cross-chain event. The cross-chain relay may detect and read the first cross-chain event, perform event verification on the first cross-chain event, and generate a corresponding cross-chain transfer-in transaction when the event verification succeeds, where the first cross-chain transfer-in transaction carries P and a transaction parameter (for example, a permission parameter determined based on the asset use permission). The cross-chain relay transmits a second cross-chain transaction request carrying the first cross-chain transfer-in transaction to a second consensus node, and the second consensus node performs a transfer process of P based on the first cross-chain transfer-in transaction and a second bill cross-chain bridge contract and a bill asset mapping contract on the second consensus node.

It may be learned that, the embodiments of this application provide an asset transferring mechanism based on multiple blockchains, and the asset transferring mechanism based on multiple blockchains is intended to highlight that cross-chain transferring of the bill asset may be implemented through cooperation of the three chains. For example, when the management chain is configured with the service data information under authorization of a user (namely, the service object), the user may be allowed to initiate a transfer service for transferring the bill asset from the bill chain to the application contract chain, where the transfer service is the first cross-chain transfer-out transaction. It is to be understood that, the bill chain, the management chain, and the application contract chain involved in the embodiments of this application are independent of each other. Therefore, the three chains may be respectively used for executing different services (for example, a bill service related to the bill asset may be executed on the bill chain, and a derivative service associated with the bill service may be executed on the application contract chain), thereby reducing a mixture degree of data stored on each chain. In addition, through cooperation of the multiple blockchains, when other services are normally executed on the chains, the transfer service may be executed simultaneously and in a cross-chain manner without affecting requests of the other services, thereby further improving the transferring efficiency of transferring the bill asset in a cross-chain manner. It is to be understood that, in the embodiments of this application, in an asset transferring process based on multiple blockchains, the transfer service for the bill asset is executed cooperatively through contracts deployed on the chains (for example, the first bill cross-chain bridge contract and the bill asset contract on the bill chain), so that the service executed on the chain (that is, the transfer service of transferring the bill asset in a cross-chain manner) may be prevented from being affected by other services, thereby ensuring the service stability of the transfer service.

In a possible implementation, after use of the bill asset is completed, the bill asset needs to be re-transferred from the application contract chain back to the bill chain. The following describes a process that the first consensus node receives the returned asset.

FIG. 5 is a flowchart of an asset transferring method based on multiple blockchains according to an embodiment of this application. The method may be performed by a first consensus node in a first chain network (for example, an electronic bill network) corresponding to the first chain (for example, a bill chain) mentioned above. For example, the first consensus node may be any consensus node in the consensus network 200a shown in FIG. 1. The method may include the following step S501 to step S503 (which may be performed after step S303).

Step S501. Receive a second cross-chain transfer-in transaction transmitted by a cross-chain relay for a second asset.

It may be understood that, the second cross-chain transfer-in transaction may be constructed when the cross-chain relay reads a second cross-chain event corresponding to a second cross-chain transfer-out transaction from a second consensus node. The second cross-chain event may be generated when the second consensus node obtains the second cross-chain transfer-out transaction submitted by a service object for the second asset (for example, a bill mapping asset). The cross-chain relay may detect a cross-chain event on a second cross-chain bridge contract (for example, a second bill cross-chain bridge contract) of the second consensus node, and obtain the second cross-chain event from the second consensus node when detecting the second cross-chain event. The cross-chain relay may construct the second cross-chain transfer-in transaction corresponding to the second cross-chain transfer-out transaction based on the second cross-chain event. The second cross-chain transfer-in transaction and the second cross-chain transfer-out transaction are used for indicating to transfer the bill mapping asset from an application contract chain to a bill chain, that is, transfer the bill asset from the application contract chain back to the bill chain. For a manner in which the second consensus node obtains the second cross-chain transfer-out transaction and generates the corresponding second cross-chain event, reference may be made to related description of the embodiment shown in FIG. 9, and details are not described herein.

It may be understood that, the cross-chain relay needs to perform event verification on the second cross-chain event when reading the second cross-chain event, and generates the corresponding second cross-chain transfer-out transaction when the event verification succeeds. A principle of the event verification performed on the second cross-chain event is the same as the principle of the event verification performed on the first cross-chain event. For example, the second cross-chain event includes second event signature information and a second event parameter (for example, including information such as the second cross-chain transfer-out transaction, the bill mapping asset, and a mapping asset attribute state), where the second event signature information is obtained by the second consensus node by signing the second event parameter through private key information on the application contract chain. The cross-chain relay may use public key information corresponding to the private key information of the application contract chain to perform signature verification on the second event signature information, obtain a to-be-verified event parameter corresponding to the second event signature information after the signature verification succeeds, and perform event comparison on the to-be-verified event parameter and the second event parameter in the second cross-chain event. When the to-be-verified event parameter is the same as the second event parameter, it indicates that the event verification succeeds.

Step S502. Write transaction data of the second cross-chain transfer-in transaction into a first cross-chain bridge contract, and perform transaction verification on the second cross-chain transfer-in transaction based on the first cross-chain bridge contract to obtain a first transaction verification result.

In some embodiments, when writing the transaction data of the second cross-chain transfer-in transaction into a first cross-chain bridge contract (for example, a first bill cross-chain bridge contract), the first consensus node may perform transaction verification on the second cross-chain transfer-in transaction, to verify the correctness of a transaction source. The first bill cross-chain bridge contract may be used for performing transaction verification on the second cross-chain transfer-in transaction, and transferring a first asset (for example, a bill asset) after the transaction verification succeeds. The second cross-chain transfer-in transaction may be a transaction in a first cross-chain transaction request transmitted by the cross-chain relay. That is, the cross-chain relay generates the first cross-chain transaction request for the second cross-chain transfer-in transaction when transmitting the second cross-chain transfer-in transaction to the first consensus node, and transmits the first cross-chain transaction request to the first consensus node, to implement the second cross-chain transfer-in transaction. The first cross-chain transaction request carries first transaction signature information obtained by the cross-chain relay by signing the second cross-chain transfer-in transaction. For example, the first transaction signature information may be obtained by the cross-chain relay by signing the second cross-chain transfer-in transaction through the private key information.

In some embodiments, a manner in which the first consensus node writes the transaction data of the second cross-chain transfer-in transaction into the first bill cross-chain bridge contract and performs transaction verification on the second cross-chain transfer-in transaction based on the first bill cross-chain bridge contract may be: using the second cross-chain transfer-in transaction obtained from the first cross-chain transaction request as a to-be-processed transaction, writing transaction data of the to-be-processed transaction into the first bill cross-chain bridge contract, and invoking the first bill cross-chain bridge contract to obtain the public key information corresponding to the private key information of the cross-chain relay, where the public key information may be obtained by invoking a signature verification method in the first bill cross-chain bridge contract, or the public key information pre-stored on the bill chain may be obtained, or the public key information may be obtained from the cross-chain relay; and performing signature verification on the first transaction signature information based on the public key information, using the second cross-chain transfer-in transaction corresponding to the first transaction signature information as a to-be-verified transaction when the signature verification succeeds, performing transaction comparison on the to-be-processed transaction and the to-be-verified transaction through the first bill cross-chain bridge contract to obtain a first transaction comparison result, and using the first transaction comparison result as the first transaction verification result. For example, transaction comparison may be performed on the to-be-processed transaction and the to-be-verified transaction through a transaction comparison method in the first bill cross-chain bridge contract.

It may be understood that, the first transaction signature information is obtained by encrypting the second cross-chain transfer-in transaction through the private key information of the cross-chain relay, and signature verification is performed on the first transaction signature information through the public key information corresponding to the private key information of the cross-chain relay. That is, decryption is performed on the first transaction signature information through the public key information, and when the decryption succeeds, it indicates that the signature verification succeeds. The to-be-verified transaction is the corresponding second cross-chain transfer-in transaction obtained by performing decryption on the first transaction signature information through the public key information.

Step S503. Invoke, when the first transaction verification result indicates that the transaction verification succeeds and by using an asset contract invocation method in the first cross-chain bridge contract, a first asset contract to unlock a locked first asset on a bill chain.

It is to be understood that, when determining that the to-be-verified transaction is the same as the to-be-processed transaction based on the transaction comparison, the obtained first transaction verification result indicates that the transaction verification succeeds, that is, the transaction source is correct. In a case of determining that the to-be-verified transaction is different from the to-be-processed transaction based on the transaction comparison, the obtained first transaction verification result indicates that the transaction verification fails, that is, the transaction source is incorrect. In this case, a verification failure notification message of the second cross-chain transfer-in transaction may be returned to the cross-chain relay, to cause the cross-chain relay to retransmit the first cross-chain transaction request.

In a case of determining that the transaction verification succeeds, the first asset contract (for example, a bill asset contract) may be invoked through the first bill cross-chain bridge contract to unlock the locked bill asset on the bill chain. The bill asset may be unlocked by directly invoking the bill asset contract through the first bill cross-chain bridge contract. Alternatively, the bill chain may further include a bill asset mapping contract, an asset mapping contract (for example, the bill asset mapping contract) on the bill chain may be invoked through the first bill cross-chain bridge contract, and the bill asset mapping contract invokes the bill asset contract to unlock the bill asset.

Correspondingly, a manner for unlocking the locked bill asset may be: invoking the bill asset contract to switch an asset state of the bill asset from a second state to a first state. In this case, the bill mapping asset on the application contract chain is in the second state. The first state is used for indicating that the bill asset is in a normal state in this case and that the bill asset may be modified and operated on the bill chain. For example, specified standard service logic may be performed on the bill asset.

In addition, a service execution request of the service object for the bill asset may be obtained, to allow, when determining that the service object has a permission of invoking the bill service contract on the bill chain based on the service execution request, the service object to invoke the bill service contract to execute a specified service corresponding to the bill asset. The service execution request mentioned above is used for indicating to execute a specified service on a specified bill asset. When the bill asset is an electronic invoice, the specified service may be, for example, an electronic bill adjust service or an electronic bill archive service.

Correspondingly, a bill service processing contract on the bill chain at least includes: an electronic bill adjust contract used for executing the electronic bill adjust service and an electronic bill archive contract used for executing the electronic bill archive service. Using the electronic bill adjust service as an example, the electronic bill adjust service is used for indicating the first consensus node to invoke the electronic bill adjust contract on the bill chain, to issue a red invoice corresponding to the electronic invoice, where the red invoice is used for correcting related bill information in the electronic invoice.

In some embodiments, the case of determining that the service object has a permission of invoking the bill service contract may be as follows: the asset state of the bill asset indicated by the service execution request is detected, and when detecting that the asset state is the first state, it indicates that the service object has the permission of invoking the bill service contract; and when the asset state is the second state, it indicates that the service object does not have the permission of invoking the bill service contract.

In some embodiments, the first cross-chain transaction request carries an event identifier of the second cross-chain event. In a case of unlocking the locked bill asset, an event generation method in the first bill cross-chain bridge contract may be invoked. Therefore, the cross-chain relay obtains the event identifier of the second cross-chain event from the first cross-chain transaction request transmitted based on the second cross-chain transfer-in transaction, and generates a cross-chain transaction completion event associated with the event identifier. The cross-chain transaction completion event is used for representing that the bill asset is successfully transferred from the application contract chain back to the bill chain.

In addition, the service object may determine whether the bill mapping asset is transferred based on the cross-chain transaction completion event on the bill chain. In a possible implementation, the service object may generate an event query request for the second cross-chain event through a service node, where the event query request carries the event identifier of the second cross-chain event, and the event identifier of the second cross-chain event may be obtained by the service object from the second bill cross-chain bridge contract on the application contract chain; and when receiving the event query event and querying the cross-chain transaction completion event associated with the event identifier of the second cross-chain event through an event query method in the first bill cross-chain bridge contract, the first consensus node returns an event completion notification message for the second cross-chain event to the service object. It may be understood that, when the service object receives the event completion notification message, it indicates that the service object determines that the cross-chain transaction for the bill mapping asset is completed, and the service execution request for the corresponding bill asset may be transmitted to the first consensus node.

It may be understood that, an asset attribute state of the bill asset on the bill chain is a first attribute state, and a mapping asset attribute state of the bill mapping asset cast on the application contract chain is the same as the asset attribute state of the bill asset. In a case of determining that the mapping asset attribute state of the bill mapping asset is changed from the first attribute state to a second attribute state, for example, when determining that the asset attribute state of the bill mapping asset is changed after a derivative service is executed on the bill mapping asset on the application contract chain, the first consensus node may further perform the following step: changing, when invoking the bill asset contract to unlock the locked bill asset on the bill chain, the asset attribute state of the bill asset from the first attribute state to the second attribute state.

The second event parameter of the second cross-chain event may carry the asset attribute state of the bill mapping asset, so that a transaction parameter carried in the second cross-chain transfer-in transaction generated based on the second cross-chain event includes the asset attribute state of the bill mapping asset. The first consensus node may determine, when receiving the second cross-chain transfer-in transaction, whether the asset attribute state of the bill mapping asset is changed based on the carried asset attribute state, and further determine whether the asset attribute state needs to be changed based on the bill asset corresponding to the bill mapping asset. When the asset attribute state needs to be changed, the asset attribute state of the bill asset is changed to the mapping asset attribute state same as that of the bill mapping asset when the bill asset is unlocked.

In addition, the asset attribute state may be a state representing an object to which the bill asset belongs. For example, the first attribute state may be a state indicating that the object to which the bill asset belongs is a current service object. The second attribute state may be a state indicating that the object to which the bill asset belongs is a derivative service object. For example, the current service object of the bill asset may be an enterprise object, and the derivative service object may be an individual object belonging to the enterprise object. For example, when the bill asset is an invoice asset and the service object of the invoice asset is an enterprise A, the derivative service executed on an invoice mapping asset on the application contract chain may be an abnormality return service for the invoice asset, and when determining that the bill asset is abnormal based on the service and the invoice mapping asset, a return process may be executed on the abnormal bill asset. That is, the object to which the abnormal bill asset belongs may be returned from the enterprise A to an individual object A issuing the bill asset, that is, it is determined to change the mapping asset attribute state of the corresponding bill mapping asset from the first attribute state to the second attribute state. That is, the first attribute state is a state indicating that the object to which the bill asset belongs is the enterprise A, and the second attribute state is a state indicating that the object to which the bill asset belongs is the individual object A. In this case, the asset attribute state of the invoice asset on the bill chain may also be correspondingly changed, that is, the object to which the invoice asset belongs is changed.

Alternatively, the asset attribute state may be a bill state of the bill asset. For example, when the bill asset is an invoice asset, the first attribute state may refer to that a current invoice state of the invoice asset is a correct state, and the second attribute state may refer to that the invoice state of the invoice asset is an adjust state. For example, when the bill asset is an invoice asset and the current invoice state of the invoice asset is the correct state, the derivative service executed on the invoice mapping asset on the application contract chain may be an adjust service executed on the bill asset. In a case of determining that an incorrect bill asset exists based on the adjust service and the invoice mapping asset, adjust processing needs to be performed on the incorrect bill asset, that is, the invoice state of the bill asset needs to be changed from the correct state to the adjust state, and namely, it is determined to change the mapping asset attribute state of the corresponding bill mapping asset from the first attribute state to the second attribute state. In this case, the asset attribute state of the invoice asset on the bill chain may also be correspondingly changed, that is, the bill state is changed.

For example, FIG. 6 is a schematic diagram of a cross-chain asset transfer-in scenario according to an embodiment of this application. A cross-chain relay detects and reads a second cross-chain event from a second consensus node, and generates a corresponding second cross-chain transfer-in transaction when event verification on the second cross-chain event succeeds. The second cross-chain transfer-in transaction carries a bill mapping asset WP and a transaction parameter. The cross-chain relay generates a first cross-chain transaction request carrying first transaction signature information and the second cross-chain transfer-in transaction, and transmits the first cross-chain transaction request to a first consensus node. The first consensus node receives the first cross-chain transaction request, and performs a process of transferring a bill asset back to a bill chain. The first consensus node writes transaction data of the second cross-chain transfer-in transaction into a first bill cross-chain bridge contract, performs transaction verification on the second cross-chain transfer-in transaction based on the first transaction signature information, and invokes, through the first bill cross-chain bridge contract, a bill asset contract to unlock a locked bill asset P when the transaction verification succeeds. The first consensus node determines, based on the transaction parameter carried in the second cross-chain transfer-in transaction, whether a mapping asset attribute state of WP is changed; and correspondingly changes an asset attribute state corresponding to P when the mapping asset attribute state of WP is changed. The first consensus node may obtain an event identifier of the second cross-chain event from the first cross-chain transaction request, and generate a cross-chain transaction completion event associated with the event identifier. A service object may determine that WP is transferred based on the cross-chain transaction completion event. Subsequently, the service object may transmit a service execution request to execute a specified service on P on the bill chain.

FIG. 7 is a flowchart of an asset transferring method based on multiple blockchains according to an embodiment of this application. The method may be performed by a second consensus node in a second chain network (for example, an application contract chain network) corresponding to the second chain (for example, an application contract chain) mentioned above. For example, the second consensus node may be any consensus node in the consensus network 300a shown in FIG. 1. The method may include the following step S701 to step S703.

Step S701. Obtain a first cross-chain transfer-in transaction transmitted by a cross-chain relay for a first asset.

The first cross-chain transfer-in transaction is constructed when the cross-chain relay reads a first cross-chain event corresponding to a first cross-chain transfer-out transaction from a first consensus node and successfully performs event verification on the first cross-chain event. The first cross-chain event is generated, when determining that a service object has a cross-chain asset transfer-out permission based on a first cross-chain bridge contract (for example, a first bill cross-chain bridge contract) into which the first cross-chain transfer-out transaction is written and service data information, by the first consensus node by invoking a first asset contract (for example, a bill asset contract) on the bill chain to lock the first asset (for example, a bill asset). The service data information is configured by a management consensus node in a management chain network for the service object. The first consensus node is a consensus node in an electronic bill network corresponding to the bill chain.

It is to be understood that, the first consensus node may generate the corresponding first cross-chain event when receiving a first cross-chain asset transfer-out request transmitted by the service object for the first cross-chain transfer-out transaction and determining that the service object has the cross-chain asset transfer-out permission based on the first bill cross-chain bridge contract and the service data information. For a specific manner of the foregoing process, reference may be made to related description of the embodiment shown in FIG. 3.

In addition, the cross-chain relay may detect a bill event on the first bill cross-chain bridge contract on the bill chain, obtain the first cross-chain event from the first consensus node when detecting the first cross-chain event, and further generate the first cross-chain transfer-in transaction corresponding to the first cross-chain event; and the cross-chain relay may transmit the first cross-chain transfer-in transaction to the second consensus node. The cross-chain relay is configured to isolate the electronic bill network corresponding to the bill chain and the application contract chain network, and the electronic bill network is independent of the management chain network and the application contract chain network.

Step S702. Write transaction data of the first cross-chain transfer-in transaction into a second cross-chain bridge contract on the second chain.

The first cross-chain transfer-in transaction may be a transaction in a second cross-chain transaction request transmitted by the cross-chain relay. That is, the cross-chain relay generates a second cross-chain asset transfer-out request for the first cross-chain transfer-in transaction when transmitting the first cross-chain transfer-in transaction to the second consensus node, and transmits the second cross-chain asset transfer-out request to the second consensus node, to implement the first cross-chain transfer-in transaction. The second consensus node may write the transaction data of the first cross-chain transfer-in transaction obtained from the second cross-chain asset transfer-out request into the second bill cross-chain bridge contract.

Step S703. Invoke a second asset contract indicated by the second cross-chain bridge contract, to cast a second asset having same asset content as the first asset on the second chain.

The asset casting process herein is to create a block used for storing asset content on the second chain, where the asset content stored in the block is the same as the asset content of the first asset. That is, casting the second asset on the second chain may also be represented as creating the second asset on the second chain.

The process of invoking the second asset contract (for example, a bill asset mapping contract) to cast the second asset (for example, a bill mapping asset) may be: performing, when invoking the second cross-chain bridge contract (for example, a second bill cross-chain bridge contract) to execute the first cross-chain transfer-in transaction, transaction verification on the first cross-chain transfer-in transaction to obtain a second transaction verification result; and invoking, when the second transaction verification result indicates that the transaction verification succeeds, the bill asset mapping contract indicated by the second bill cross-chain bridge contract, to cast a bill mapping asset having the same asset content as the bill asset on the application contract chain. For example, the bill mapping asset may be cast by invoking the bill asset mapping contract through an asset mapping contract invocation method in the second bill cross-chain bridge contract. The invoking the second bill cross-chain bridge contract to execute the first cross-chain transfer-in transaction may be: writing the transaction data of the first cross-chain transfer-in transaction into the second bill cross-chain bridge contract.

Therefore, the second bill cross-chain bridge contract may be used for performing, when the first cross-chain transfer-in transaction is written, transaction verification on the first cross-chain transfer-in transaction, and transferring the bill asset after the transaction verification succeeds. The bill asset mapping contract may be used for casting the bill mapping asset corresponding to the bill asset. The cast bill mapping asset is the same as the bill asset and may be operated on the application contract chain. Based on this, a contract (for example, the second bill cross-chain bridge contract) deployed on the application contract chain has a capability of invoking a contract (for example, the bill asset mapping contract) in a cross-chain manner.

It is to be understood that, the second cross-chain transaction request may carry second transaction signature information obtained by signing the first cross-chain transfer-in transaction. For example, the second transaction signature information may be obtained by the cross-chain relay by encrypting the first cross-chain transfer-in transaction through private key information. The process of performing transaction verification on the first cross-chain transfer-in transaction may be: using the first cross-chain transfer-in transaction obtained from the second cross-chain transaction request as a reference transaction, and invoking a signature verification method in the second bill cross-chain bridge contract to obtain public key information corresponding to the private key information of the cross-chain relay, where the public key information may be obtained by invoking the signature verification method in the second bill cross-chain bridge contract; and performing signature verification on the second transaction signature information based on the public key information, using the first cross-chain transfer-in transaction corresponding to the second transaction signature information as a to-be-matched transaction when the signature verification succeeds, performing transaction comparison on the reference transaction and the to-be-matched transaction through the second bill cross-chain bridge contract to obtain a second transaction comparison result, and using the second transaction comparison result as the second transaction verification result. For example, transaction comparison may be performed on the reference transaction and the to-be-matched transaction through a transaction comparison method in the second bill cross-chain bridge contract.

Signature verification is performed on the second transaction signature information through the public key information. That is, decryption is performed on the second transaction signature information through the public key information, and it indicates that the signature verification succeeds when the decryption succeeds. The to-be-matched transaction is a corresponding second cross-chain transfer-in transaction obtained by performing decryption on the second transaction signature information through the public key information.

Therefore, when determining that the reference transaction is the same as the to-be-matched transaction based on the transaction comparison, the obtained second transaction verification result indicates that the transaction verification succeeds, that is, the transaction source is correct. In a case of determining that the reference transaction is different from the to-be-matched transaction based on the transaction comparison, the obtained second transaction verification result indicates that the transaction verification fails, that is, the transaction source is incorrect. In this case, a verification failure notification message of the first cross-chain transfer-in transaction may be returned to the cross-chain relay, to cause the cross-chain relay to retransmit the second cross-chain transaction request.

It is to be understood that, when determining that the transaction verification succeeds, the bill asset mapping contract may be invoked through the second bill cross-chain bridge contract to cast the bill mapping asset corresponding to the bill asset. In a case of casting the bill mapping asset, a state of the bill mapping asset is configured based on the first cross-chain transfer-in transaction. For example, an asset state of the bill mapping asset is configured as a first state, indicating that the bill mapping asset is currently in a normal state. In another example, based on an asset attribute state carried by the first cross-chain transfer-in transaction, a same mapping asset attribute state may be configured for the bill mapping asset. In this case, derivative service logic such as credit identification or adjustment may be executed on the cast bill mapping asset on the application contract chain.

In addition, the second cross-chain transaction request carries an event identifier of the first cross-chain event. In a case of casting the bill mapping asset having the same asset content as the bill asset on the application contract chain, the second consensus node may invoke an event generation method in the second bill cross-chain bridge contract, to obtain the event identifier of the first cross-chain event from the second cross-chain transaction request transmitted by the cross-chain relay based on the first cross-chain transfer-in transaction, and generate a cross-chain transaction completion event associated with the event identifier when the bill mapping asset is cast. The cross-chain transaction completion event is used for representing that the bill asset is successfully transferred from the bill chain to the application contract chain.

It may be understood that, the service object may determine whether the bill asset is transferred based on the cross-chain transaction completion event. In a possible implementation, an event query request transmitted by the service object for the first cross-chain event through the service node is obtained, where the event query request carries the event identifier of the first cross-chain event, and the event identifier of the first cross-chain event may be obtained by the service object from the first bill cross-chain bridge contract on the application contract chain; and an event completion notification message for the first cross-chain event is returned to the service object when the cross-chain transaction completion event associated with the event identifier is queried by using an event query method in the second bill cross-chain bridge contract. Therefore, when the service object receives the event completion notification message, it indicates that a cross-chain transaction for the bill asset is completed, and a service execution request for the bill mapping asset may be subsequently transmitted to the second consensus node.

In addition, when the first consensus node specifies an asset use permission for the bill asset, the first cross-chain transfer-in transaction generated by the cross-chain relay carries a permission parameter determined based on the asset use permission of the corresponding bill asset. The permission parameter is used for limiting a corresponding asset use permission of the bill mapping asset, that is, a same asset use permission is specified for the bill mapping asset based on the permission parameter. The bill mapping asset on the application contract chain can merely execute an asset use indicated by the permission parameter. For example, when a derivative service that is determined to be executed based on the permission parameter is a belonged object change service of the bill mapping asset, merely the derivative service can be executed on the bill mapping asset on the application contract chain.

Therefore, the second consensus node may obtain a derivative service execution request transmitted by the service object based on the event completion notification message, and invoke, based on a derivative service in the derivative service execution request, the second bill cross-chain bridge contract to obtain a transaction parameter in the first cross-chain transfer-in transaction; and allow, when determining that the service object has a permission of invoking a derivative service contract on the application contract chain based on the transaction parameter, the service object to invoke the derivative service contract to execute a derivative service corresponding to the bill mapping asset. The transaction parameter in the first cross-chain transfer-in transaction may include the permission parameter or an asset mapping state. The determining whether the service object has a permission of invoking a derivative service contract based on the transaction parameter may be: determining whether the service object has the permission of invoking the derivative service contract based on the permission parameter in the transaction parameter.

The determining that the service object has a permission of invoking a derivative service contract on the application contract chain may be: detecting whether the derivative service indicated by the derivative service execution request is a derivative service indicated by the permission parameter. When the derivative service indicated by the derivative service execution request is the derivative service indicated by the permission parameter, it indicates that the service object has the permission of invoking the derivative service contract.

For example, the permission parameter in the transaction parameter may include an asset transfer parameter. The asset transfer parameter is used for indicating to transfer the bill mapping asset from the service object to a derivative service object corresponding to a derivative service associated with the service object. In a case of determining that the service object has the permission of invoking the derivative service contract on the application contract chain, the derivative service contract may be invoked to execute the derivative service corresponding to the bill mapping asset; and during execution of the derivative service, when determining to transfer the bill mapping asset from the service object to the derivative service object based on the asset transfer parameter, the mapping asset attribute state of the bill mapping asset is changed from a first attribute state to a second attribute state on the application contract chain. The mapping asset attribute state may be a state indicating an object to which the bill mapping asset belongs. For example, the first attribute state may be a state representing that the object to which the bill asset belongs is the current service object, and the second attribute state may be a state representing that the object to which the bill asset belongs is the derivative service object.

Therefore, the derivative service may be executed on the bill mapping asset, and whether to transfer the bill asset from the service object to the derivative service object may be determined based on the asset transfer parameter. That is, the asset transfer parameter indicates the belonged object change service for the bill mapping asset. In a case of determining to perform object transferring, the mapping asset attribute state of the bill mapping asset is changed. The second attribute state is determined based on the derivative service object indicated by the asset transfer parameter. For example, the bill asset is an invoice asset, the derivative service is an abnormality return service for the invoice asset, and the asset transfer parameter is used for indicating the derivative service and indicating that the derivative service may be used for changing the service object to which the bill mapping asset belongs to the derivative service object corresponding to the derivative service, for example, indicating to change from an enterprise object to an individual object.

For example, the permission parameter in the transaction parameter may include a bill state transfer parameter. The bill state transfer parameter is used for indicating to change a bill state of the bill mapping asset from a correct state to an adjust state corresponding to the derivative service (for example, an adjust service). In a case of determining that the service object has the permission of invoking the derivative service contract on the application contract chain, the derivative service contract may be invoked to execute the derivative service corresponding to the bill mapping asset; and during execution of the derivative service, when determining to change the bill state of the bill mapping asset to the adjust state based on the bill state transfer parameter, the mapping asset attribute state of the bill mapping asset is changed from a first attribute state to a second attribute state on the application contract chain. The mapping asset attribute state may be the bill state of the bill mapping asset, the first attribute state may refer to that the bill state is in the correct state, and the second attribute state may refer to that the bill asset is in the adjust state.

Therefore, the derivative service may be executed on the bill mapping asset, whether to change the bill state of the bill asset may be determined based on the bill state transfer parameter, and the mapping asset attribute state of the bill mapping asset may be changed when determining to change the bill state. The second attribute state is determined based on the adjust state indicated by the bill state transfer parameter. For example, the bill asset is an invoice asset, the derivative service is an adjust service for the invoice asset, and the bill state transfer parameter is used for indicating the derivative service and indicating that the derivative service may be used for changing the bill state of the bill mapping asset to the corresponding adjust state.

Figure 8:
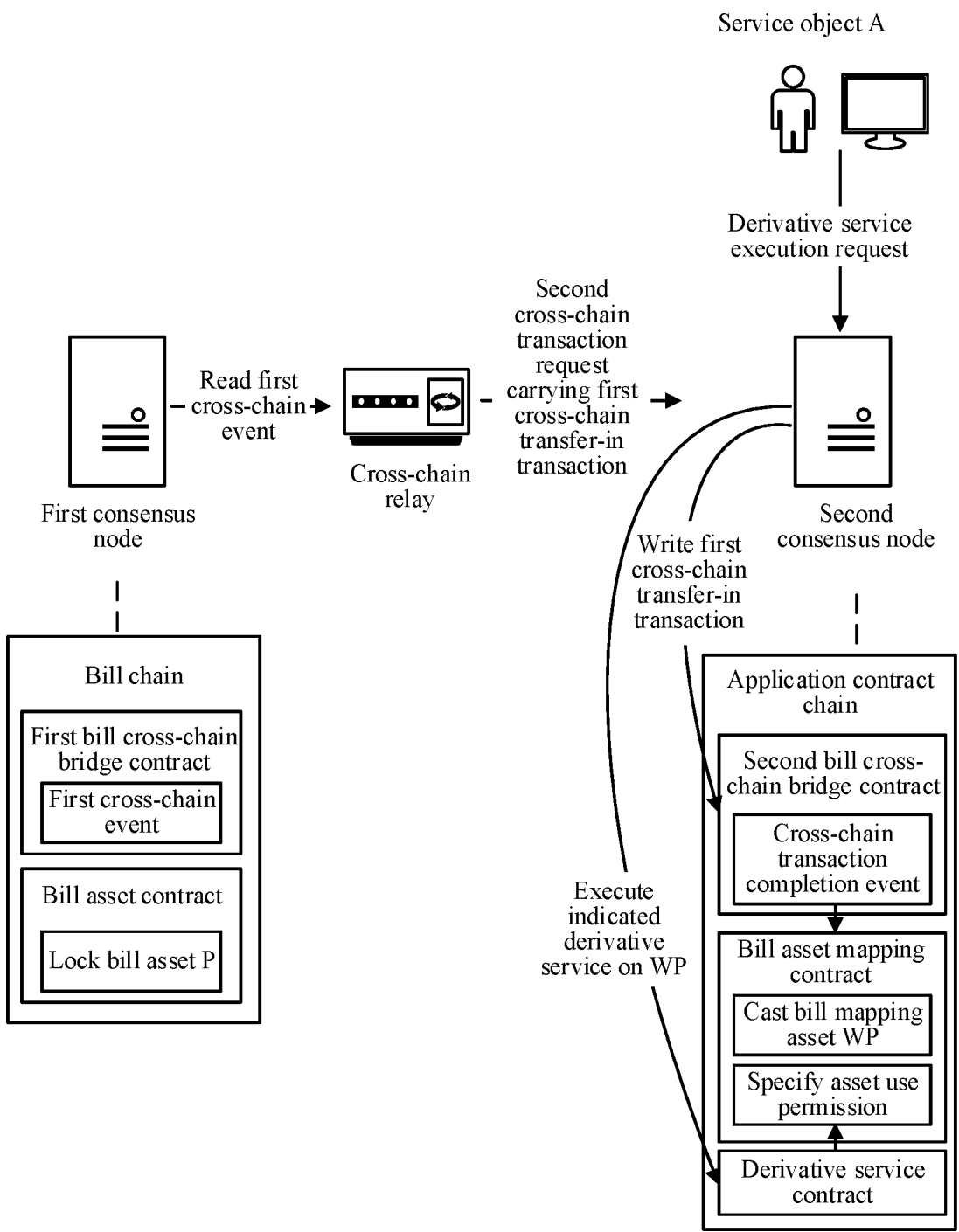
FIG. 8 is a schematic diagram of a cross-chain asset transfer-in scenario according to an embodiment of this application.

For example, FIG. 8 is a schematic diagram of a cross-chain asset transfer-in scenario according to an embodiment of this application. A cross-chain relay detects and reads a first cross-chain event from a first consensus node, and generates a corresponding first cross-chain transfer-in transaction when event verification on the first cross-chain event succeeds. The first cross-chain transfer-in transaction carries a bill asset P and a transaction parameter. The cross-chain relay generates a second cross-chain transaction request carrying second transaction signature information and the first cross-chain transfer-in transaction, and transmits the second cross-chain transaction request to a second consensus node. The second consensus node writes transaction data of the first cross-chain transfer-in transaction into a second bill cross-chain bridge contract, and performs transaction verification on the first cross-chain transfer-in transaction based on the second transaction signature information. When the transaction verification succeeds, a bill asset mapping contract is invoked through the second bill cross-chain bridge contract to cast a bill mapping asset WP same as P for P on an application contract chain, and a transaction parameter in the first cross-chain transfer-in transaction is obtained, to assign an asset use permission indicated by the transaction parameter to the bill mapping asset, that is, specify an asset use permission of WP. For example, a permission parameter in the transaction parameter is written into the bill asset mapping contract, or an asset use permission corresponding to the permission parameter is written into the bill asset mapping contract. The second consensus node may obtain an event identifier of the first cross-chain event from the second cross-chain transaction request, and generate a cross-chain transaction completion event associated with the event identifier. A service object may determine that P is transferred based on the cross-chain transaction completion event. The service object may execute a specified derivative service on WP on the application contract chain. For example, the service object may generate a derivative service execution request for WP through a service node and transmit the derivative service execution request to the second consensus node; and the second consensus node determines whether the service object has a permission of invoking a derivative service contract on the application contract chain based on a derivative service indicated by the derivative service execution request and the transaction parameter, and executes the specified derivative service on WP when determining that the service object has the permission. For example, the derivative service indicated by the derivative service execution request is an adjust service, and when determining that the asset use permission of WP is the adjust service based on the transaction parameter, it indicates that the service object has a permission of invoking a derivative service contract associated with the adjust service; and when determining that the asset use permission of WP does not include the adjust service based on the transaction parameter, it indicates that the service object does not have the permission of invoking the derivative service contract associated with the adjust service.

In a possible implementation, after use of the bill asset is completed, the bill asset needs to be re-transferred from the application contract chain back to the bill chain. The following describes a process that the second consensus node receives the returned asset.

FIG. 9 is a flowchart of an asset transferring method based on multiple blockchains according to an embodiment of this application. As shown in FIG. 9, the method may be performed by a second consensus node in a second chain network (for example, an application contract chain network) corresponding to the second chain (for example, an application contract chain) mentioned above. For example, the second consensus node may be any consensus node in the consensus network 300a shown in FIG. 1. The method may include the following step S901 to step S903.

Step S901. Obtain a second cross-chain asset transfer-out request transmitted by a service object for a second cross-chain transfer-out transaction.

The second cross-chain asset transfer-out request carries service data information. The service data information is used for performing permission verification on a cross-chain asset transfer-back permission of the service object, to ensure the transferring validity of a second asset (for example, a bill mapping asset) of the service object. The second cross-chain asset transfer-out request is used for indicating the second consensus node to transfer the bill mapping asset from the application contract chain back to a bill chain through a cross-chain relay. It may be understood that, after the service object executes a derivative service on the bill mapping asset, the second cross-chain asset transfer-out request may be generated to transfer the specified bill mapping asset from the application contract chain to the bill chain.

It is to be understood that, when generating the second cross-chain asset transfer-out request through the service node, the service object may obtain the service data information from a management chain, and generate the second cross-chain asset transfer-out request for the second cross-chain transfer-out transaction based on the obtained service data information. Alternatively, the service object may store the service data information locally in advance through the service node, and obtain the service data information, when generating the second cross-chain asset transfer-out request, to generate the second cross-chain asset transfer-out request.

Step S902. Write transaction data of the second cross-chain transfer-out transaction carried in the second cross-chain asset transfer-out request into a second cross-chain bridge contract on the application contract chain.

Step S903. Invoke, when determining that the service object has a cross-chain asset transfer-back permission based on the second cross-chain bridge contract and the service data information, a second asset contract to lock a second asset, and generate a second cross-chain event corresponding to the second cross-chain transfer-out transaction.

The second cross-chain bridge contract may be used for performing permission verification on the cross-chain asset transfer-back permission of the service object in the second cross-chain asset transfer-out request, and a transfer-back process of the bill mapping asset is continued when determining that the service object has the cross-chain asset transfer-back permission after the permission verification succeeds.

The cross-chain asset transfer-back permission is determined by a target consensus node in a target chain network, or is determined jointly by the target consensus node and the second consensus node. In some embodiments, the cross-chain asset transfer-out permission is determined based on source configuration data information and the service data information (carried in the second cross-chain asset transfer-out request) obtained by the target consensus node through querying.

Therefore, the performing permission verification on the cross-chain asset transfer-back permission based on the second cross-chain bridge contract (for example, a second bill cross-chain bridge contract) may be: invoking a cross-chain permission query method in the second bill cross-chain bridge contract, to generate a transfer-back permission verification request, where the transfer-back permission verification request is used for indicating a management consensus node to invoke a cross-chain permission management contract on the management chain to query the source configuration data information of the service object, for example, invoke a cross-chain permission query method in the cross-chain permission management contract to query whether the service object has the source configuration data information; and receiving the source configuration data information returned by the management consensus node based on the transfer-back permission verification request, performing information comparison on the source configuration data information and the service data information carried in the second cross-chain asset transfer-out request to obtain an information comparison result, and determining whether the service object has the cross-chain asset transfer-back permission based on the information comparison result. For example, information comparison may be performed on the service data information and the source configuration data information through an information comparison method in the second bill cross-chain bridge contract.

Alternatively, permission verification is performed based on the second bill cross-chain bridge contract to determine whether the service object has the cross-chain asset transfer-back permission. For example, the second bill cross-chain bridge contract is invoked to generate a transfer-back permission verification request carrying the service data information, where the transfer-back permission verification request is used for indicating the management consensus node to invoke a cross-chain authorization management contract on the management chain to query the source configuration data information of the service object, and performing information comparison on the source configuration data information and the service data information in the transfer-back permission verification request to obtain an information comparison result. For example, the cross-chain permission query method in the cross-chain permission management contract may be invoked to query whether the service object has the source configuration data information. The management consensus node invokes an information comparison method in the cross-chain permission management contract to perform information comparison on the service data information and the source configuration data information. The second consensus node may receive an information comparison result returned by the management consensus node based on the transfer-back permission verification request, and determine whether the service object has the cross-chain asset transfer-back permission based on the information comparison result.

It is to be understood that, the determining whether the service object has the cross-chain asset transfer-back permission may be that: when the information comparison result indicates that the comparison succeeds, it indicates that the service data information is the same as the source configuration data information, and it is determined that the service object has the cross-chain asset transfer-back permission. That is, it is determined that transferring of the bill mapping asset is valid in this case. When the information comparison result indicates that the comparison fails, it indicates that the service data information is different from the source configuration data information, and it is determined that the service object does not have the cross-chain asset transfer-back permission.

In some embodiments, when determining that the service object has the cross-chain asset transfer-back permission, the bill mapping asset needs to be locked based on the second cross-chain transfer-out transaction, to ensure the consistency of the bill mapping asset transferred to the bill chain and the bill mapping asset on the application contract chain. A specific manner of locking the bill mapping asset may be: invoking a bill asset mapping contract to switch an asset state of the bill mapping asset from a first state to a second state. The bill asset mapping contract is used for managing an asset state of a bill asset on the management chain. For example, the bill asset mapping contract may be used for locking the transferred-out bill mapping asset.

The invoking the second asset contract (for example, the bill asset mapping contract) to perform asset state switching may be: invoking, through an asset contract invocation method in the second bill cross-chain bridge contract, the bill asset mapping contract to perform asset state switching of the bill mapping asset on the application contract chain. The first state may be a normal state, that is, indicate that the bill mapping asset is not locked; and the second state may be a locked state, that is, indicate that bill mapping asset has been locked. In this case, the locked bill mapping asset on the application contract chain cannot be operated and modified.

Therefore, the second consensus node may invoke, when detecting that the asset state of the bill mapping asset is the second state, the second bill cross-chain bridge to generate the second cross-chain event corresponding to the second cross-chain transfer-out transaction. In this case, this indicates that the second cross-chain transfer-out transaction has been executed on the second consensus node. For example, an event generation method in the second bill cross-chain bridge contract may be invoked to generate the second cross-chain event. The second cross-chain event may carry information such as the bill mapping asset and a current asset attribute state of the bill mapping asset.

The second cross-chain event is used for indicating the cross-chain relay to transmit, when obtaining a second cross-chain transfer-in transaction corresponding to the second cross-chain transfer-out transaction through construction, the second cross-chain transfer-in transaction to a first consensus node. The second cross-chain transfer-in transaction is used for indicating the first consensus node to transfer the bill mapping asset to the bill chain. That is, the first consensus node may be configured to invoke, when writing transaction data of the second cross-chain transfer-in transaction into a first bill cross-chain bridge contract on the bill chain, a bill asset contract indicated by the first bill cross-chain bridge contract to unlock the locked bill mapping asset on the bill chain. That is, the asset state of the bill mapping asset is changed from the second state to the first state. Therefore, the second cross-chain transfer-in transaction and the second cross-chain transfer-out transaction are used for indicating to transfer the bill mapping asset from the application contract chain to the bill chain. For a process that the first consensus node executes the second cross-chain transfer-in transaction, reference may be made to related description of the embodiment shown in FIG. 5 above.

In addition, the cross-chain relay may detect a bill event generated by the second bill cross-chain bridge contract on the application contract chain, and obtain the second cross-chain event from the application contract chain of the second consensus node when detecting the second cross-chain event. In a case of event verification performed on the second cross-chain event succeeds, the cross-chain relay generates the second cross-chain transfer-in transaction based on the information such as the bill mapping asset and the asset attribute state in the second cross-chain event, to transfer the bill mapping asset.

Therefore, the second consensus node may invoke, when detecting that the second cross-chain event is generated, the bill asset mapping contract to destroy the locked bill mapping asset. Alternatively, the cross-chain relay may transmit a cross-chain completion notification message to the second consensus node when detecting a cross-chain transaction completion event associated with the second cross-chain event on the first bill cross-chain bridge contract of the first consensus node. The second consensus node invokes, when receiving the cross-chain completion notification message, the bill asset mapping contract to destroy the locked bill mapping asset. For example, the locked bill mapping asset is destroyed through an asset mapping contract invocation method in the second bill cross-chain bridge contract.

Figure 10:
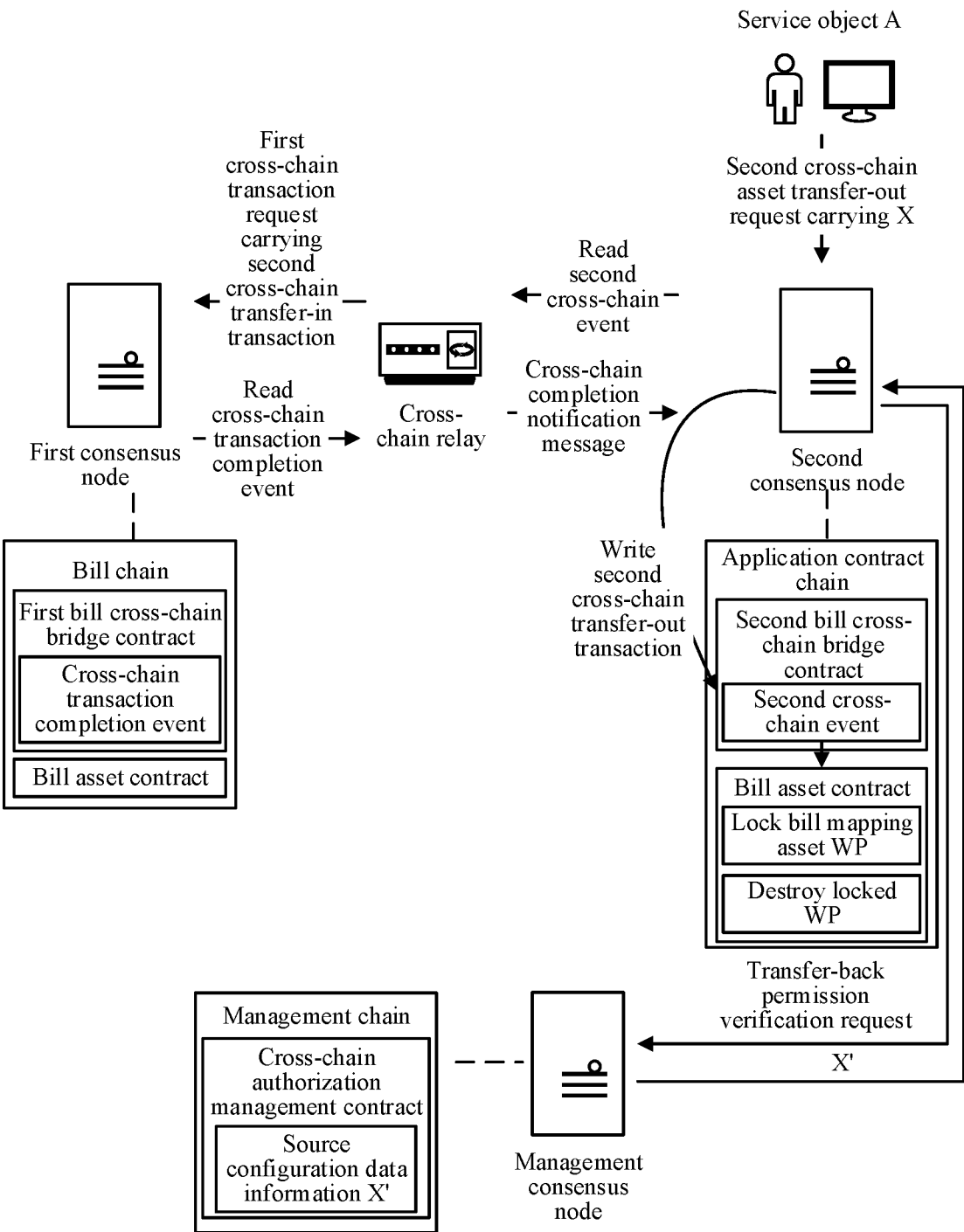
FIG. 10 is a schematic diagram of a cross-chain asset transfer-out scenario according to an embodiment of this application.

For example, FIG. 10 is a schematic diagram of a cross-chain asset transfer-out scenario according to an embodiment of this application. A service object A transmits a second cross-chain asset transfer-out request for a second cross-chain transfer-out transaction to a second consensus node, where the second cross-chain asset transfer-out request carries service data information X. The second consensus node performs verification on a cross-chain asset transfer-in permission of the service object based on a second bill cross-chain bridge contract and X. A specific process thereof may be that: the second consensus node generates a transfer-back permission verification request through the second bill cross-chain bridge contract and transmits the transfer-back permission verification request to a management consensus node, and the management consensus node queries source configuration data information X' stored by the service object A based on the transfer-back permission verification request and a cross-chain permission management contract. The second consensus node performs information comparison on X and X', to determine that the service object has a cross-chain asset transfer-back permission. The second consensus node invokes a bill asset mapping contract through the second bill cross-chain bridge contract to lock a bill mapping asset WP and generates a corresponding second cross-chain event. A cross-chain relay may detect and read the second cross-chain event and generate a corresponding second cross-chain transfer-in transaction, where the second cross-chain transfer-in transaction carries WP and a transaction parameter (for example, a mapping asset attribute state). The cross-chain relay transmits a first cross-chain transaction request carrying the second cross-chain transfer-in transaction to a first consensus node, and the first consensus node performs a transfer process of WP based on the second cross-chain transfer-in transaction and a first bill cross-chain bridge contract and a bill asset contract on a bill chain. Subsequently, the cross-chain relay may detect and read a cross-chain transaction completion event associated with an event identifier of the second cross-chain event from the first bill cross-chain bridge contract on the bill chain of the first consensus node, and return a cross-chain completion notification message to the second consensus node, for the second consensus node to destroy the locked WP.

Figure 11:
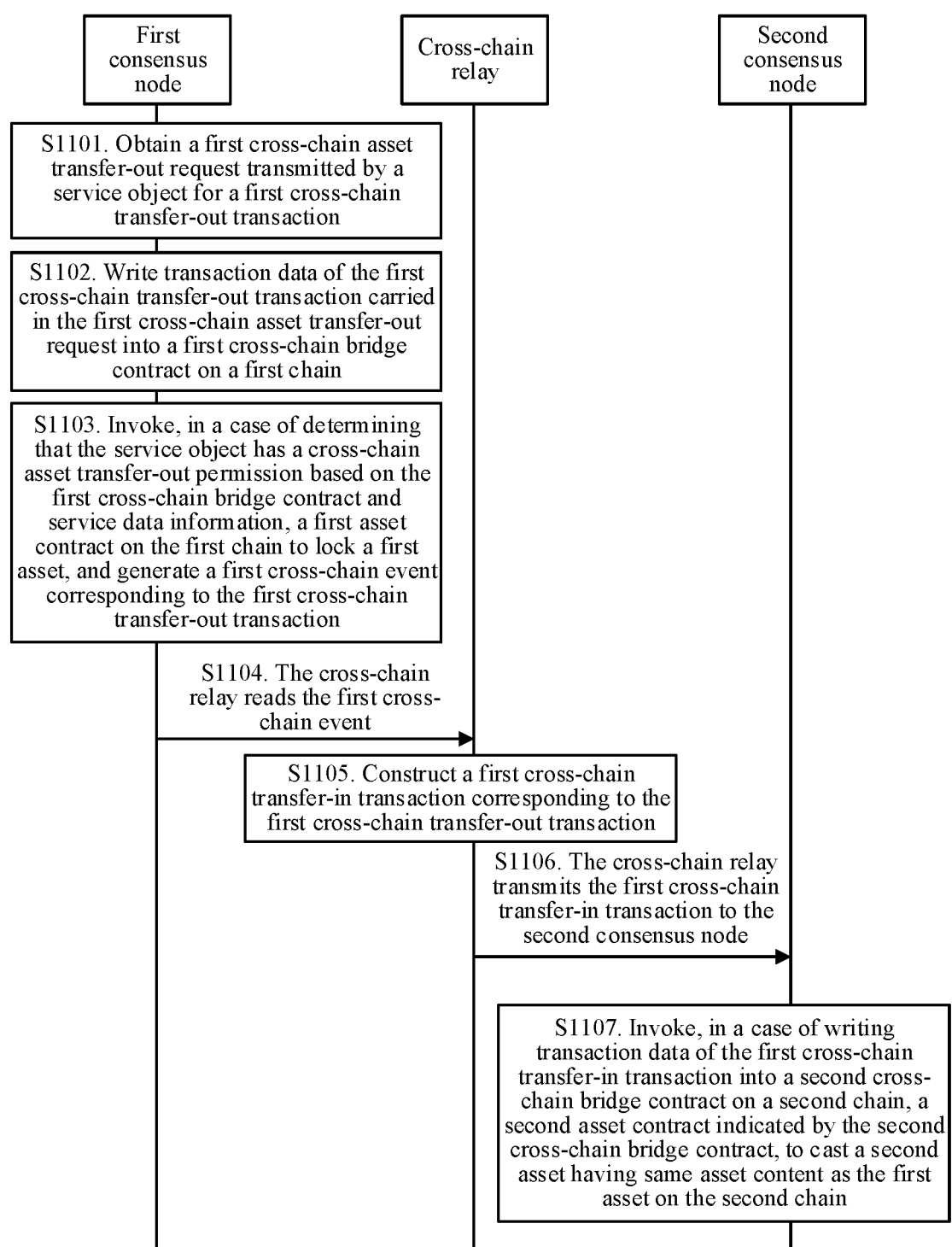
FIG. 11 is a flowchart of an asset transferring method based on multiple blockchains according to an embodiment of this application.

FIG. 11 is a flowchart of an asset transferring method based on multiple blockchains according to an embodiment of this application. As shown in FIG. 11, the method may be performed by a first consensus node in a first chain network, a second consensus node in a second chain network, and a cross-chain relay. For example, the first consensus node herein may be any consensus node in the consensus network 200a shown in FIG. 1, and the second consensus node may be any consensus node in the consensus network 300a shown in FIG. 1. It is to be understood that, the first chain network, the second chain network, and a target chain network are independent of each other, and the cross-chain relay is configured to isolate the first chain network and the second chain network. In this case, the method may include the following step S1101 to step S1107.

S1101. The first consensus node obtains a first cross-chain asset transfer-out request transmitted by a service object for a first cross-chain transfer-out transaction.

The service object may apply to a management consensus node in a management chain network in advance for service data information used for permission verification. For example, the management consensus node invokes a cross-chain permission management contract on a management chain to configure a dedicated authorization code for the service object as the service data information. In addition, the service object may generate the first cross-chain asset transfer-out request carrying the service data information. The first cross-chain asset transfer-out request is used for indicating to transfer a bill asset of the service object from a bill chain to an application contract chain.

Step S1102. The first consensus node writes transaction data of the first cross-chain transfer-out transaction carried in the first cross-chain asset transfer-out request into a first cross-chain bridge contract on a first chain.

Step S1103. The first consensus node invokes, when determining that the service object has a cross-chain asset transfer-out permission based on the first cross-chain bridge contract and service data information, a first asset contract on the first chain to lock a first asset, and generates a first cross-chain event corresponding to the first cross-chain transfer-out transaction.

The first consensus node may determine, when writing the first cross-chain transfer-out transaction, whether the service object has the cross-chain asset transfer-out permission based on the first cross-chain bridge contract (for example, a first bill cross-chain bridge contract) and the service data information. For example, the first bill cross-chain bridge contract may be invoked to generate a transfer-out permission verification request for the service object, and the transfer-out permission verification request may be transmitted to the management consensus node, for the management consensus node to invoke a cross-chain authorization management contract on the management chain to query source configuration data information of the service object. The first consensus node receives the source configuration data information returned by the management consensus node, performs information comparison on the source configuration data information and the service data information in the first cross-chain asset transfer-out request, and determines that the service object has the cross-chain asset transfer-out permission when an information comparison result indicates that the comparison succeeds.

Therefore, the first asset contract (for example, a bill asset contract) on the bill chain may be invoked through the first bill cross-chain bridge contract to lock the first asset (for example, a bill asset), and the first bill cross-chain bridge contract is invoked to generate the first cross-chain event corresponding to the first cross-chain transfer-out transaction. An event parameter carried in the first cross-chain event may include, for example, information such as the locked bill asset, an asset attribute state, and a permission parameter determined based on a specified asset use permission.

Step S1104. The cross-chain relay obtains the first cross-chain event.

Step S1105. The cross-chain relay constructs a first cross-chain transfer-in transaction corresponding to the first cross-chain transfer-out transaction based on the first cross-chain event.

The cross-chain relay may detect and obtain the first cross-chain event on the first bill cross-chain bridge contract on the first consensus node, and construct the first cross-chain transfer-in transaction based on the information carried in the first cross-chain event. The first cross-chain transfer-in transaction carries the locked bill asset and a transaction parameter. The transaction parameter may include information such as the asset attribute state and the permission parameter.

Step S1106. The cross-chain relay transmits the first cross-chain transfer-in transaction to the second consensus node.

The cross-chain relay may generate a second cross-chain transaction request carrying the first cross-chain transfer-in transaction, and transmit the second cross-chain transaction request to the second consensus node, to transmit the first cross-chain transfer-in transaction to the second consensus node. The second cross-chain transaction request may carry second transaction signature information obtained by the cross-chain relay by signing the first cross-chain transfer-in transaction through private key information.

Step S1107. The second consensus node invokes, when writing transaction data of the first cross-chain transfer-in transaction into a second cross-chain bridge contract on a second chain, a second asset contract indicated by the second cross-chain bridge contract, to cast a second asset having same asset content as the first asset on the second chain.

In a case of obtaining the first cross-chain transfer-in transaction from the second cross-chain transaction request and writing the first cross-chain transfer-in transaction into the second cross-chain bridge contract (for example, a second bill cross-chain bridge contract) on the application contract chain, the second consensus node may perform transaction verification on the first cross-chain transfer-in transaction based on the second transaction signature information, and invoke the second asset contract (for example, a bill asset mapping contract) to cast the second asset (for example, a bill mapping asset) when the transaction verification succeeds. In addition, a corresponding asset mapping state, a corresponding mapping asset attribute state, and a corresponding asset use permission may be further set for the bill mapping asset based on the transaction parameter in the first cross-chain transfer-in transaction. For a specific manner of the transaction verification, reference may be made to related description of the foregoing embodiments.

In addition, the second cross-chain transaction request further carries an event identifier of the first cross-chain event, and when the bill mapping asset is cast, the second bill cross-chain bridge contract may be invoked to generate a cross-chain transaction completion event associated with the event identifier, to represent that the bill asset is successfully transferred from the bill chain to the application contract chain. The service object may determine whether the bill asset is transferred through the cross-chain transaction completion event, and transmit a derivative service execution request for the bill mapping asset after determining that the bill asset is transferred, to execute a specified derivative service on the bill mapping asset on the application contract chain.

Figure 12:
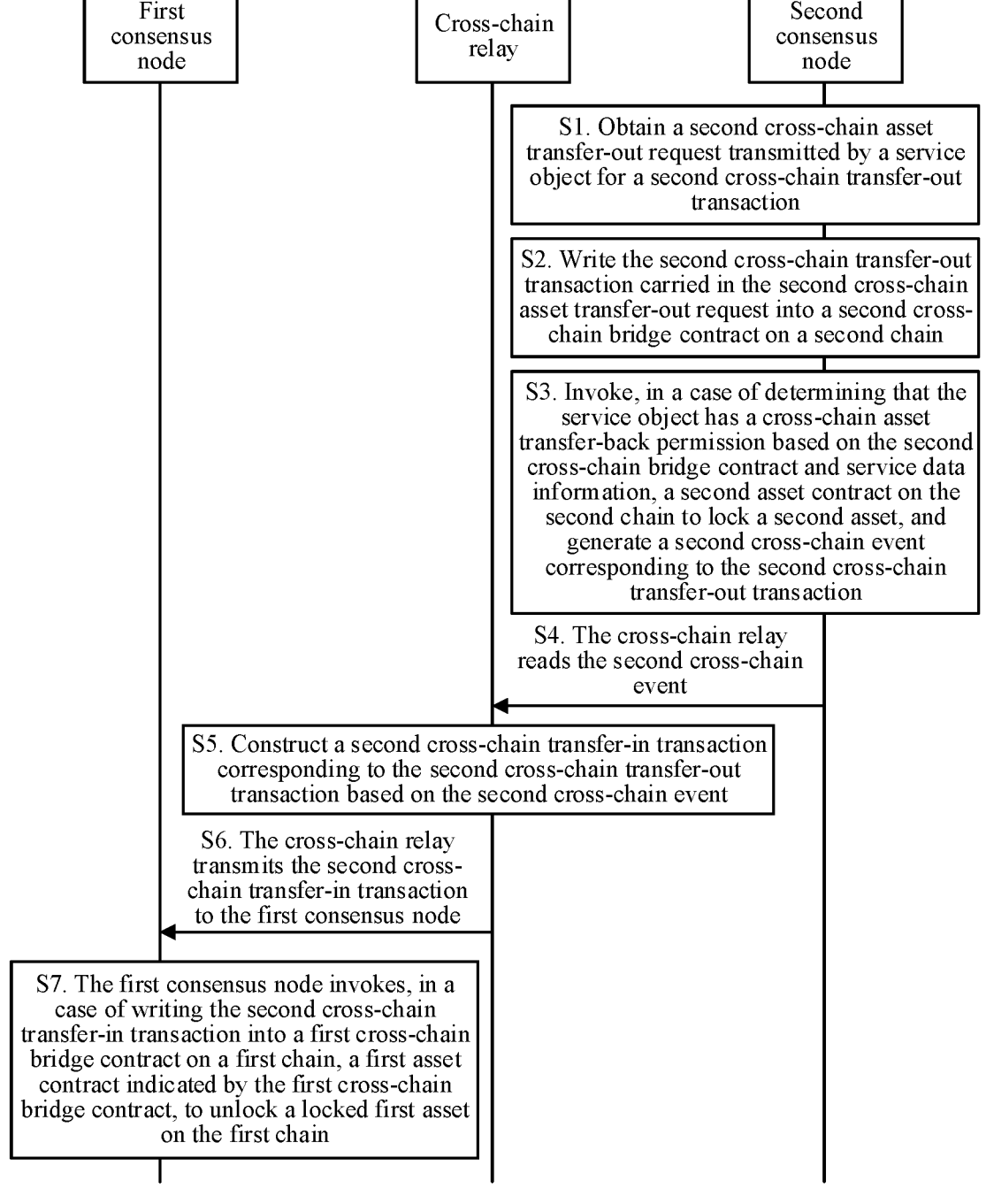
FIG. 12 is a flowchart of an asset transferring method based on multiple blockchains according to an embodiment of this application.

For example, FIG. 12 is a flowchart of an asset transferring method based on multiple blockchains according to an embodiment of this application. FIG. 12 may represent an execution process that a second asset is transferred from a second chain to a first chain. The process may be: S1. A second consensus node obtains a second cross-chain asset transfer-out request transmitted by a service object for a second cross-chain transfer-out transaction, where the second cross-chain asset transfer-out request carries service data information. S2. The second consensus node writes transaction data of the second cross-chain transfer-out transaction carried in the second cross-chain asset transfer-out request into a second cross-chain bridge contract on the second chain. S3. The second consensus node invokes, when determining that the service object has a cross-chain asset transfer-back permission based on the second cross-chain bridge contract and the service data information, a second asset contract on the second chain to lock the second asset, and generates a second cross-chain event corresponding to the second cross-chain transfer-out transaction. A specific principle that the second consensus node determines the cross-chain asset transfer-back permission of the service object may be the same as the principle that the first consensus node determines the cross-chain asset transfer-out permission of the service object. S4. A cross-chain relay obtains the second cross-chain event. S5. The cross-chain relay constructs a second cross-chain transfer-in transaction corresponding to the second cross-chain transfer-out transaction based on the second cross-chain event, where the second cross-chain transfer-in transaction may carry the locked second asset and a transaction parameter, and the transaction parameter may include information such as an asset attribute state. S6. The cross-chain relay transmits the second cross-chain transfer-in transaction to a first consensus node. For example, the cross-chain relay may generate a first cross-chain transaction request carrying the second cross-chain transfer-in transaction, and transmit the first cross-chain transaction request to the first consensus node, to transmit the second cross-chain transfer-in transaction to the first consensus node. The first cross-chain transaction request may carry first transaction signature information obtained by the cross-chain relay by signing the second cross-chain transfer-in transaction through private key information. S7. The first consensus node invokes, when writing transaction data of the second cross-chain transfer-in transaction into a first cross-chain bridge contract on the first chain, a first asset contract indicated by the first cross-chain bridge contract to unlock a locked first asset on the first chain. The first consensus node may perform transaction verification on the second cross-chain transfer-in transaction based on the first transaction signature information, and unlock the locked first asset when the transaction verification succeeds. In addition, whether a mapping asset attribute state of the second asset needs to be changed may be further determined based on the transaction parameter in the second cross-chain transfer-in transaction, for example, it is determined that the second asset is changed based on the mapping asset attribute state in the transaction parameter, and an asset attribute state of the unlocked first asset is correspondingly changed. In addition, the first cross-chain transaction request further carries an event identifier of the second cross-chain event, and when the first asset is unlocked, the first cross-chain bridge contract may be invoked to generate a cross-chain transaction completion event associated with the event identifier, to represent that the second asset is successfully transferred from the second chain to the first chain. The second consensus node may destroy the locked second asset when receiving a cross-chain completion notification message generated by the cross-chain relay based on the cross-chain transaction completion event. Subsequently, the service object may determine whether the second asset is transferred through the cross-chain transaction completion event, and transmit a service execution request for the first asset to the first consensus node when determining that the second asset is transferred, to execute a specified service on the first asset on the first chain.

For a specific implementation of the embodiment shown in FIG. 11, reference may be made to specific description in the embodiments corresponding to FIG. 3, FIG. 5, FIG. 7, and FIG. 9, and details are not described herein again.

Based on the foregoing description, the electronic bill blockchain system is improved into three consensus networks, and the three consensus networks respectively maintain the management chain, the bill chain, and the application contract chain. The three chains have different function features and are combined with each other, to form a blockchain system having simpler management on on-chain data, a clearer and more efficient process, and better service extensibility. According to an on-chain asset cross-chain protocol proposed in the technical solutions of this application, the bill asset may be better transferred and used among the three chains, and more service values may be created. The bill asset cross-chain protocol locks the transferred bill asset (or bill mapping asset), to implement the consistency of the bill asset during inter-chain transferring, thereby ensuring the correctness of data content and a data state of the on-chain data. In addition, when a derivative service is executed on the bill asset on the application contract chain through a derivative service contract, the service stability on the bill chain is not affected, and on-chain data irrelevant to the derivative service on the bill chain cannot be accessed when the derivative service is executed, thereby achieving good data isolation and service safety.

Figure 13:
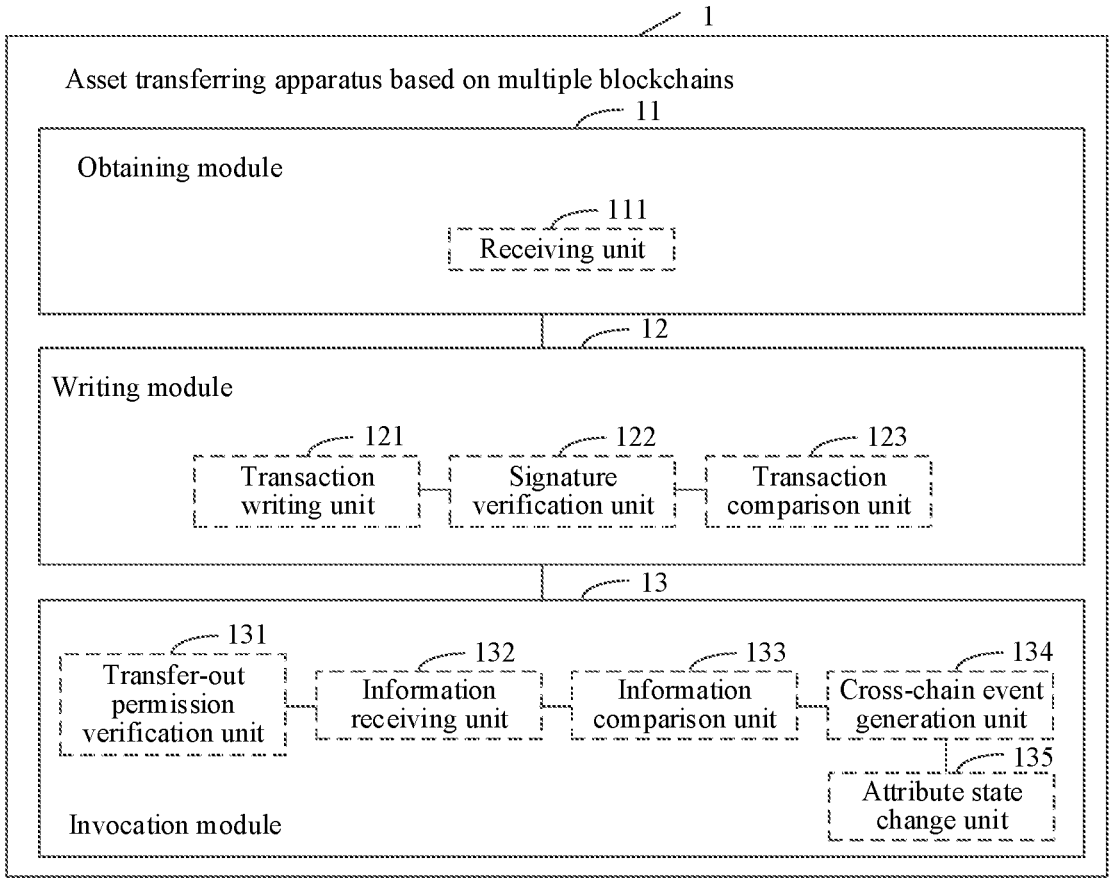
FIG. 13 is a schematic structural diagram of an asset transferring apparatus based on multiple blockchains according to an embodiment of this application.

FIG. 13 is a schematic structural diagram of an asset transferring apparatus based on multiple blockchains according to an embodiment of this application. As shown in FIG. 13, the asset transferring apparatus 1 based on multiple blockchains may be applied to a first consensus node, and the first consensus node may be any blockchain node in a first chain network (for example, the consensus network 300a). For example, the first consensus node may be the consensus node 11c in the embodiment corresponding to FIG. 1. It is to be understood that, the asset transferring apparatus 1 based on multiple blockchains may be a computer program (including program code) running on a blockchain node (for example, the consensus node 10c), and for example, the asset transferring apparatus 1 based on multiple blockchains may be application software. It may be understood that, the asset transferring apparatus 1 based on multiple blockchains may be configured to perform corresponding steps in the methods provided in the embodiments of this application. As shown in FIG. 13, the asset transferring apparatus 1 based on multiple blockchains may include: an obtaining module 11, a writing module 12, and an invocation module 13.

The obtaining module 11 is configured to obtain a first cross-chain asset transfer-out request transmitted by a service object for a first cross-chain transfer-out transaction, where the first cross-chain asset transfer-out request carries service data information configured for the service object, and the service data information is configured by a target consensus node in a target chain network; the first cross-chain asset transfer-out request is used for indicating the first consensus node to transfer, through a cross-chain relay, a first asset belonging to the service object from a first chain to a second chain associated with a second consensus node; the second consensus node is a consensus node in a second chain network corresponding to the second chain; and the cross-chain relay is configured to isolate the second chain network and the first chain network, and the second chain network is independent of the target chain network and the first chain network.

The writing module 12 is configured to write transaction data of the first cross-chain transfer-out transaction into a first cross-chain bridge contract on the first chain.

The invocation module 13 is configured to: invoke, when determining that the service object has a cross-chain asset transfer-out permission based on the first cross-chain bridge contract and the service data information, a first asset contract on the first chain to lock the first asset, and generate a first cross-chain event corresponding to the first cross-chain transfer-out transaction, where the first cross-chain event is used for indicating the cross-chain relay to transmit, when obtaining a first cross-chain transfer-in transaction corresponding to the first cross-chain transfer-out transaction through construction, the first cross-chain transfer-in transaction to the second consensus node; and the second consensus node is configured to invoke, when writing transaction data of the first cross-chain transfer-in transaction into a second cross-chain bridge contract on the second chain, a second asset contract indicated by the second cross-chain bridge contract, to cast a second asset having same asset content as the first asset on the second chain.

The invocation module 13 includes:
a transfer-out permission verification unit 131, configured to invoke a cross-chain permission query method in the first cross-chain bridge contract, to generate a transfer-out permission verification request, where the transfer-out permission verification request is used for indicating a management consensus node to invoke a cross-chain authorization management contract on a target chain to query source configuration data information of the service object;
an information receiving unit 132, configured to receive the source configuration data information returned by the management consensus node, and perform information comparison on the source configuration data information and the service data information to obtain an information comparison result;
an information comparison unit 133, configured to determine that the service object has the cross-chain asset transfer-out permission when the information comparison result indicates that the comparison succeeds; and
a cross-chain event generation unit 134, configured to invoke the first asset contract to switch an asset state of the first asset from a first state to a second state, and generate the first cross-chain event corresponding to the first cross-chain transfer-out transaction when the asset state of the first asset is the second state.

The obtaining module 11 includes:
a receiving unit 111, configured to receive a second cross-chain transfer-in transaction transmitted by the cross-chain relay for the second asset, where the second cross-chain transfer-in transaction is constructed when the cross-chain relay reads a second cross-chain event corresponding to a second cross-chain transfer-out transaction from the second consensus node, and the second cross-chain event is generated by the second consensus node based on the second cross-chain transfer-out transaction submitted by the service object for the second asset;
the writing module 12 being further configured to write transaction data of the second cross-chain transfer-in transaction into the first cross-chain bridge contract, and perform transaction verification on the second cross-chain transfer-in transaction based on the first cross-chain bridge contract to obtain a first transaction verification result; and
the invocation module 13 being further configured to invoke, when the first transaction verification result indicates that the transaction verification succeeds and by using an asset contract invocation method in the first cross-chain bridge contract, the first asset contract to unlock the locked first asset on the first chain.

The second cross-chain transfer-in transaction is a transaction in a first cross-chain transaction request transmitted by the cross-chain relay; and the first cross-chain transaction request carries first transaction signature information obtained by the cross-chain relay by signing the second cross-chain transfer-in transaction through private key information.

The writing module 12 includes:
a transaction data writing unit 121, configured to use the second cross-chain transfer-in transaction obtained from the first cross-chain transaction request as a to-be-processed transaction, and write transaction data of the to-be-processed transaction into the first cross-chain bridge contract;
a signature verification unit 122, configured to invoke a signature verification method in the first cross-chain bridge contract to obtain public key information corresponding to the private key information of the cross-chain relay, and perform signature verification on the first transaction signature information based on the public key information; and use the second cross-chain transfer-in transaction corresponding to the first transaction signature information as a to-be-verified transaction when the signature verification succeeds; and
a transaction comparison unit 123, configured to perform transaction comparison on the to-be-processed transaction and the to-be-verified transaction by using a transaction comparison method in the first cross-chain bridge contract, to obtain a first transaction comparison result, and use the first transaction comparison result as the first transaction verification result.

An asset attribute state of the first asset is a first attribute state; and when a mapping asset attribute state of the second asset is changed from the first attribute state to a second attribute state, the invocation module 13 includes:
an attribute state change unit 135, configured to change, when invoking the first asset contract to unlock the locked first asset on the first chain, the asset attribute state of the first asset from the first attribute state to the second attribute state.

The writing module 12 is further configured to specify an asset use permission of the first asset corresponding to the first cross-chain transfer-out transaction when writing the transaction data of the first cross-chain transfer-out transaction into the first cross-chain bridge contract.

For specific implementations of the obtaining module 11, the writing module 12, and the invocation module 13, reference may be made to the description of the foregoing embodiments, and details are not described herein again. It is to be understood that, beneficial effects achieved by using the same method are also not described herein again.

Figure 14:
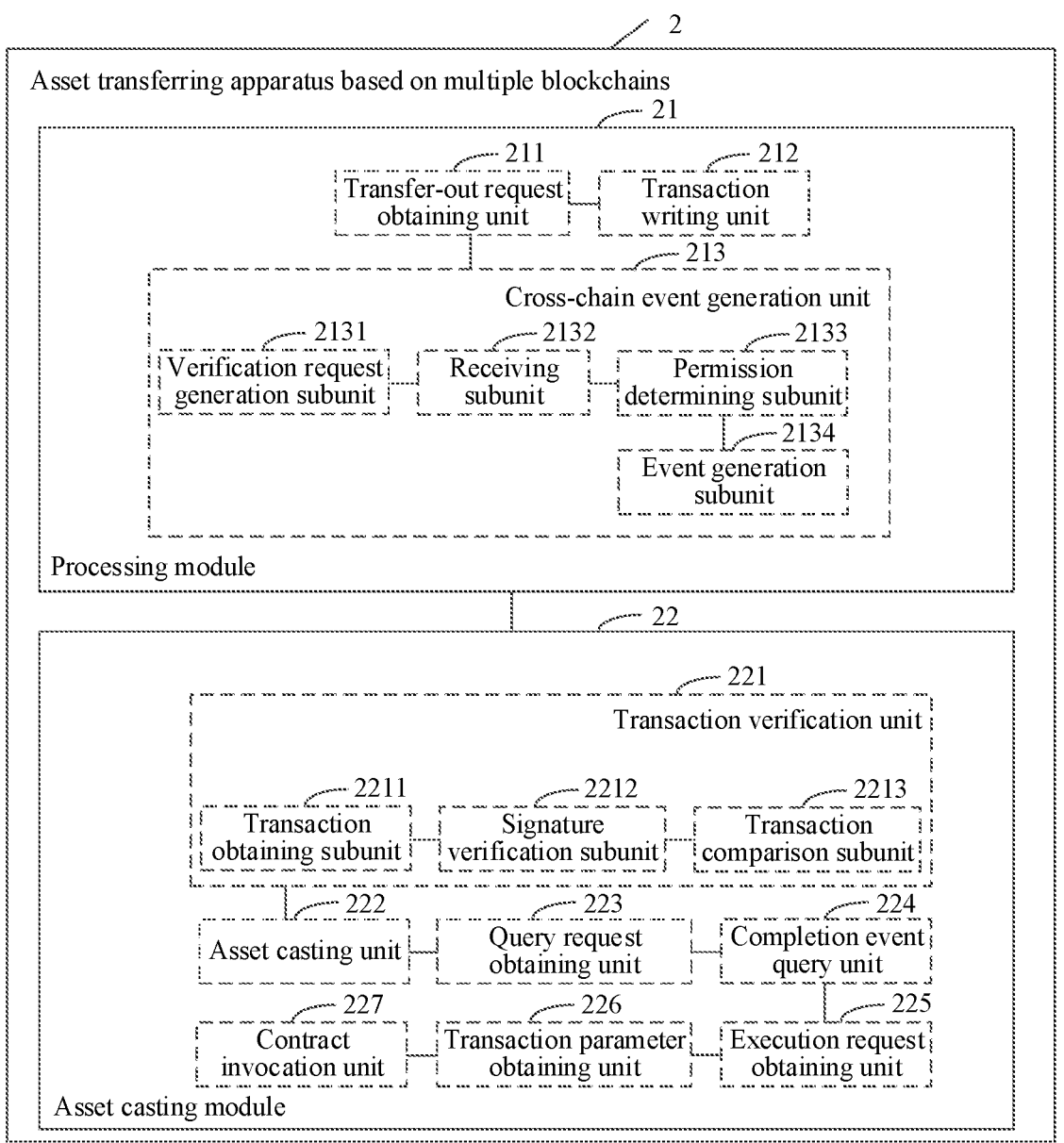
FIG. 14 is a schematic structural diagram of an asset transferring apparatus based on multiple blockchains according to an embodiment of this application.

FIG. 14 is a schematic structural diagram of an asset transferring apparatus based on multiple blockchains according to an embodiment of this application. As shown in FIG. 14, the asset transferring apparatus 2 based on multiple blockchains may be applied to a second consensus node, and the second consensus node may be any blockchain node in a second chain network (for example, the consensus network 300a). For example, the second consensus node may be the consensus node 12c in the embodiment corresponding to FIG. 1. It is to be understood that, the asset transferring apparatus 2 based on multiple blockchains may be a computer program (including program code) running on a blockchain node (for example, the consensus node 12c), and for example, the asset transferring apparatus 2 based on multiple blockchains may be application software. It may be understood that, the asset transferring apparatus 2 based on multiple blockchains may be configured to perform corresponding steps in the methods provided in the embodiments of this application. As shown in FIG. 14, the asset transferring apparatus 2 based on multiple blockchains may include: a processing module 21 and an asset casting module 22.

The processing module 21 is configured to obtain a first cross-chain transfer-in transaction transmitted by a cross-chain relay for a first asset, where the first cross-chain transfer-in transaction is constructed when the cross-chain relay reads a first cross-chain event corresponding to a first cross-chain transfer-out transaction from a first consensus node; the first cross-chain event is generated, when determining that a service object has a cross-chain asset transfer-out permission based on a first cross-chain bridge contract into which the first cross-chain transfer-out transaction is written and service data information, by the first consensus node by invoking a first asset contract on a first chain to lock the first asset; the service data information is configured by a target consensus node in a target chain network for the service object; the first consensus node is a consensus node in a first chain network corresponding to the first chain; and the cross-chain relay is configured to isolate the first chain network and the second chain network, and the first chain network is independent of the target chain network and the second chain network.

The processing module 21 is further configured to write transaction data of the first cross-chain transfer-in transaction into a second cross-chain bridge contract on a second chain.

The asset casting module 22 is configured to invoke a second asset contract indicated by the second cross-chain bridge contract, to cast a second asset having same asset content as the first asset on the second chain.

The asset casting module 22 includes:
a transaction verification unit 221, configured to perform, when invoking the second cross-chain bridge contract to execute the first cross-chain transfer-in transaction, transaction verification on the first cross-chain transfer-in transaction to obtain a second transaction verification result; and an asset casting unit 222, configured to invoke, when the second transaction verification result indicates that the transaction verification succeeds, the second asset contract indicated by the second cross-chain bridge contract, to cast the second asset having the same asset content as the first asset on the second chain.

The first cross-chain transfer-in transaction is a transaction in a second cross-chain transaction request transmitted by the cross-chain relay; and the second cross-chain transaction request carries second transaction signature information obtained by the cross-chain relay by signing the first cross-chain transfer-in transaction through private key information.

The transaction verification unit 221 includes:
a transaction obtaining subunit 2211, configured to use the first cross-chain transfer-in transaction obtained from the second cross-chain transaction request as a reference transaction;
a signature verification subunit 2212, configured to invoke a signature verification method in the second cross-chain bridge contract to obtain public key information corresponding to the private key information of the cross-chain relay, and perform signature verification on the second transaction signature information based on the public key information; and use the first cross-chain transfer-in transaction corresponding to the second transaction signature information as a to-be-matched transaction when the signature verification succeeds; and
a transaction comparison subunit 2213, configured to perform transaction comparison on the reference transaction and the to-be-matched transaction by using a transaction comparison method in the second cross-chain bridge contract, to obtain a second transaction comparison result, and use the second transaction comparison result as the second transaction verification result.

The asset casting module 22 is further configured to invoke, when casting the second asset having the same asset content as the first asset on the second chain, an event generation method in the second cross-chain bridge contract, to obtain an event identifier of the first cross-chain event from the second cross-chain transaction request transmitted by the cross-chain relay based on the first cross-chain transfer-in transaction, and generate a cross-chain transaction completion event associated with the event identifier, where the cross-chain transaction completion event is used for representing that the first asset is successfully transferred from the first chain to the second chain.

The asset casting module 22 includes:
a query request obtaining unit 223, configured to obtain an event query request transmitted by the service object for the first cross-chain event, where the event query request carries the event identifier of the first cross-chain event; and
a completion event query unit 224, configured to return an event completion notification message for the first cross-chain event to the service object when the cross-chain transaction completion event associated with the event identifier is queried by using an event query method in the second bill cross-chain bridge contract.

The asset casting module 22 includes:
an execution request obtaining unit 225, configured to obtain a derivative service execution request transmitted by the service object based on the event completion notification message;

a transaction parameter obtaining unit 226, configured to invoke, based on a derivative service in the derivative service execution request, the second cross-chain bridge contract to obtain a transaction parameter in the first cross-chain transfer-in transaction, where the transaction parameter is determined based on an asset use permission of the first asset corresponding to the first cross-chain transfer-in transaction; and a contract invocation unit 227, configured to allow, when determining that the service object has a permission of invoking a derivative service contract on the second chain based on the transaction parameter, the service object to invoke the derivative service contract to execute a derivative service corresponding to the second asset.

The transaction parameter includes an asset transfer parameter; the asset transfer parameter is used for indicating to transfer the second asset from the service object to a derivative service object corresponding to a derivative service associated with the service object; and the contract invocation unit is further configured to change, when invoking the derivative service contract to execute the derivative service corresponding to the second asset, a mapping asset attribute state of the second asset from a first attribute state to a second attribute state on the second chain when determining to transfer the second asset from the service object to the derivative service object based on the asset transfer parameter.

The processing module 21 includes:

a transfer-out request obtaining unit 211, configured to obtain a second cross-chain asset transfer-out request transmitted by the service object for a second cross-chain transfer-out transaction, where the second cross-chain asset transfer-out request carries service data information; and the second cross-chain asset transfer-out request is used for indicating the second consensus node to transfer the second asset from the second chain back to the first chain through the cross-chain relay;

a transaction data writing unit 212, configured to write transaction data of the second cross-chain transfer-out transaction carried in the second cross-chain asset transfer-out request into the second cross-chain bridge contract on the second chain; and a cross-chain event generation unit 213, configured to invoke, when determining that the service object has a cross-chain asset transfer-back permission based on the second cross-chain bridge contract and the service data information, the second asset contract to lock the second asset, and generate a second cross-chain event corresponding to the second cross-chain transfer-out transaction, where the second cross-chain event is used for indicating the cross-chain relay to transmit, when obtaining a second cross-chain transfer-in transaction corresponding to the second cross-chain transfer-out transaction through construction, the second cross-chain transfer-in transaction to the first consensus node; and the first consensus node is configured to invoke, when writing transaction data of the second cross-chain transfer-in transaction into the first cross-chain bridge contract on the first chain, the first asset contract indicated by the first cross-chain bridge contract to unlock the locked first asset on the first chain.

The cross-chain event generation unit 213 includes:

a verification request generation subunit 2131, configured to invoke a cross-chain permission query method in the second cross-chain bridge contract, to generate a transfer-back permission verification request, where the transfer-out permission verification request is used for indicating the management consensus node to invoke a cross-chain authorization management contract on the target chain to query source configuration data information of the service object;

a receiving subunit 2132, configured to receive the source configuration data information returned by the management consensus node based on the transfer-back permission verification request, and perform information comparison on the source configuration data information and the service data information to obtain an information comparison result;

a permission determining subunit 2133, configured to determine that the service object has the cross-chain asset transfer-back permission when the information comparison result indicates that the comparison succeeds; and an event generation subunit 2134, configured to invoke the second asset contract to switch an asset state of the second asset from a first state to a second state, and generate the second cross-chain event corresponding to the second cross-chain transfer-out transaction when the asset state of the second asset is the second state.

For specific implementations of the processing module 21 and the asset casting module 22, reference may be made to the description of the foregoing embodiments, and details are not described herein again. In addition, beneficial effects achieved by using the same method are also not described herein again. In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

Figure 15:
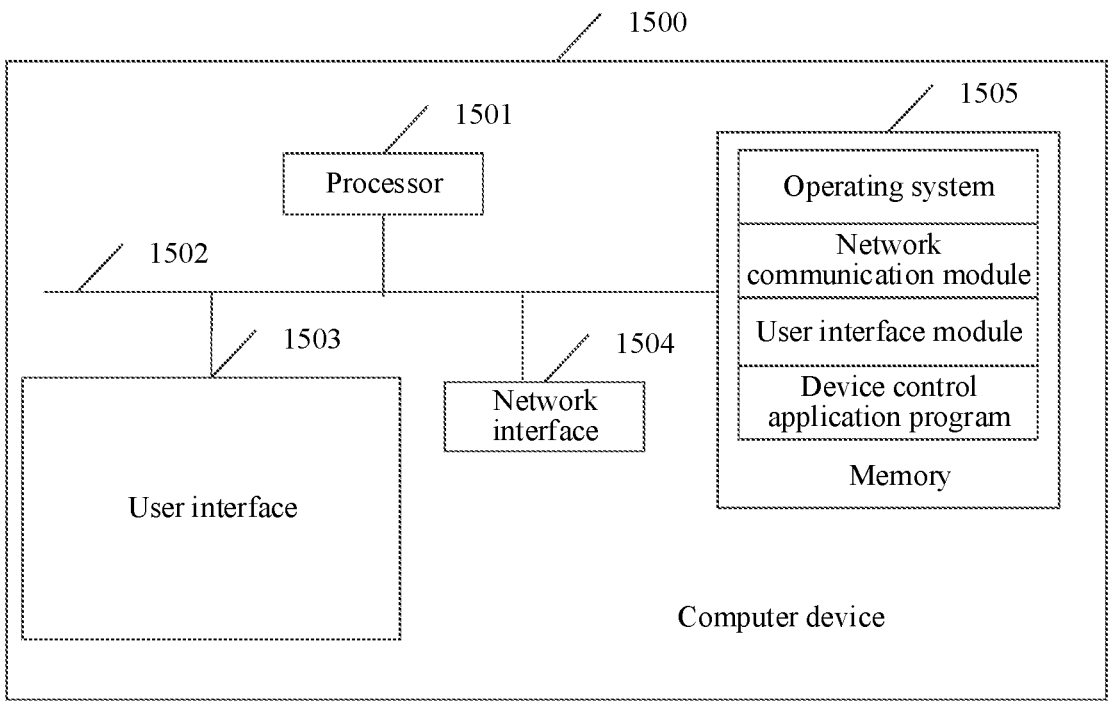
FIG. 15 is a schematic structural diagram of a computer device according to an embodiment of this application.

FIG. 15 is a schematic structural diagram of a computer device according to an embodiment of this application. As shown in FIG. 15, the computer device 1500 may be a user terminal, or may be a server, which is not limited herein. It may be understood that, the computer device may be the first consensus node and the second consensus node. For ease of understanding, this application is described by using an example in which the computer device is a server. The computer device 1500 may include: a processor 1501, a network interface 1504, and a memory 1505. In addition, the computer device 1500 may further include a user interface 1503 and at least one communication bus 1502. The communication bus 1502 is configured to implement connection and communication between these components. The user interface 1503 may further include a standard wired interface and a standard wireless interface. In some embodiments, the network interface 1504 may include a standard wired interface and a standard wireless interface (such as a Wi-Fi interface). The memory 1505 may be a high-speed RAM, or may be a non-volatile memory, for example, at least one magnetic disk memory. In some embodiments, the memory 1505 may be at least one storage apparatus that is located far away from the foregoing processor 1501. As shown in FIG. 15, the memory 1505 used as a computer-readable storage medium may include an operating system, a network communication module, a user interface module, and a device control application program.

The network interface 1504 in the computer device 1500 may further provide a network communication function. In the computer device 1500 shown in FIG. 15, the network interface 1504 may provide a network communication function, the user interface 1503 is mainly configured to provide an input interface for a user, and the processor 1501 may be configured to invoke the device control application program stored in the memory 1505, to perform the description of the asset transferring method based on multiple blockchains in the embodiment corresponding to FIG. 3, FIG. 5, FIG. 7, FIG. 9, or FIG. 11, and further perform the description of the asset transferring apparatus based on multiple blockchains (that is, the asset transferring apparatus 1 based on multiple blockchains or the asset transferring apparatus 2 based on multiple blockchains) in the embodiment corresponding to FIG. 13 or FIG. 14, which are not described herein again. In addition, beneficial effects achieved by using the same method are also not described herein again.

In addition, an embodiment of this application further provides a computer-readable storage medium. The computer-readable storage medium stores a computer program executed by the asset transferring apparatus 1 based on multiple blockchains or the asset transferring apparatus 2 based on multiple blockchains that is mentioned above, and the computer program includes computer instructions, where when a processor executes the computer instructions, the description of the asset transferring method based on multiple blockchains in the embodiment corresponding to FIG. 3, FIG. 5, FIG. 7, FIG. 9, or FIG. 11 can be performed. Therefore, details are not described herein again. In addition, beneficial effects achieved by using the same method are also not described herein again. For technical details that are not disclosed in the embodiment of the computer-readable storage medium of this application, reference may be made to the method embodiments of this application. In an example, the computer instructions may be deployed to be executed on a computing device, or deployed to be executed on a plurality of computing devices at the same location, or deployed to be executed on a plurality of computing devices that are distributed in a plurality of locations and interconnected by using a communication network. The plurality of computing devices that are distributed in a plurality of locations and interconnected by using a communication network may form a blockchain system.

In addition, an embodiment of this application further provides a computer program product or a computer program. The computer program product or the computer program includes computer instructions, and the computer instructions may be stored in a computer-readable storage medium. A processor of a computer device reads the computer instructions from the computer-readable storage medium, and executes the computer instructions, to cause the computer device to perform the descriptions of the asset transferring method based on multiple blockchains in the embodiment corresponding to FIG. 3, FIG. 5, FIG. 7, FIG. 9, or FIG. 11. Therefore, details are not described herein again. In addition, beneficial effects achieved by using the same method are also not described herein again. For technical details that are not disclosed in the embodiment of the computer program product or the computer program of this application, reference may be made to the description of the method embodiments of this application.

Figure 16:
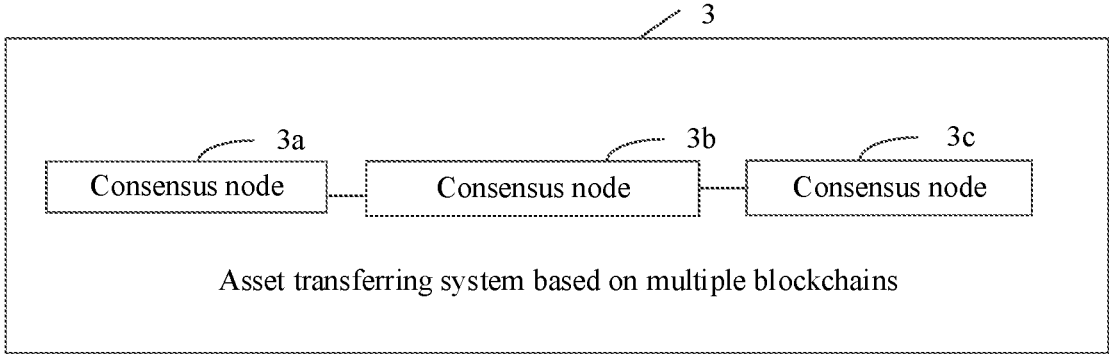
FIG. 16 is a schematic diagram of an asset transferring system based on multiple blockchains according to an embodiment of this application.

FIG. 16 is a schematic diagram of an asset transferring system based on multiple blockchains according to an embodiment of this application. The asset transferring system 3 based on multiple blockchains may include a consensus node 3a, a consensus node 3b, and a consensus node 3c. The consensus node 3a may be the management consensus node in the target chain network described in the embodiment corresponding to FIG. 3, the management consensus node may be any blockchain node in the consensus network 100a shown in FIG. 1, and details are not described herein again. The consensus node 3b may be the first consensus node in the first chain network described in the embodiment corresponding to FIG. 3, the first consensus node may be any blockchain node in the consensus network 300a shown in FIG. 1, and details are not described herein again. The consensus node 3c may be the second consensus node in the second chain network described in the embodiment corresponding to FIG. 3, the second consensus node may be any blockchain node in the consensus network 300a shown in FIG. 1, and details are not described herein again. In addition, beneficial effects achieved by using the same method are also not described herein again.

The foregoing disclosure is merely exemplary embodiments of this application, and certainly is not intended to limit the protection scope of this application. Therefore, equivalent variations made in accordance with the claims of this application shall fall within the scope of this application.

What is claimed is:

1. An asset transferring method based on multiple blockchains, the multiple blockchains comprising a first chain, a second chain, and a target chain, the method being performed by a first consensus node in a first chain network corresponding to the first chain and a second consensus node in a second chain network corresponding to the second chain, and the method comprising:

obtaining, by the first consensus node, a first cross-chain asset transfer-out request transmitted by a service object for a first cross-chain transfer-out transaction, the first cross-chain asset transfer-out request carrying service data information configured for the service object;

writing, by the first consensus node, transaction data of the first cross-chain transfer-out transaction into a first cross-chain bridge contract on the first chain; and in response to determining, by the first consensus node, that the service object has a cross-chain asset transfer-out permission based on the first cross-chain bridge contract and the service data information:

invoking, by the first consensus node, a first asset contract on the first chain to lock a first asset;

generating, by the first consensus node, a first cross-chain event corresponding to the first cross-chain transfer-out transaction, wherein the first cross-chain event is used for instructing a cross-chain relay to transmit, in response to obtaining a first cross-chain transfer-in transaction corresponding to the first cross-chain transfer-out transaction through construction, the first cross-chain transfer-in transaction to a second consensus node in the second chain network corresponding to the second chain;

receiving, by the first consensus node, a second cross-chain transfer-in transaction transmitted by the cross-chain relay for a second asset, wherein the second cross-chain transfer-in transaction is constructed in response to the cross-chain relay reading a second cross-chain event corresponding to a second cross-chain transfer-out transaction from the second consensus node, and the second cross-chain event is generated by the second consensus node based on the second cross-chain transfer-out transaction submitted by the service object for the second asset;

writing, by the first consensus node, transaction data of the second cross-chain transfer-in transaction into the first cross-chain bridge contract, and performing transaction verification on the second cross-chain transfer-in transaction based on the first cross-chain bridge contract to obtain a first transaction verification result; and invoking, by the first consensus node, in response to the first transaction verification result indicating that the transaction verification succeeds and by using an asset contract invocation method in the first cross-chain bridge contract, the first asset contract to unlock the locked first asset on the first chain.

2. The method according to claim 1, wherein the invoking a first asset contract on the first chain to lock the first asset, and generating a first cross-chain event corresponding to the first cross-chain transfer-out transaction comprises:

invoking, by the first consensus node, a cross-chain permission query method in the first cross-chain bridge contract, to generate a transfer-out permission verification request, wherein the transfer-out permission verification request is used for causing a target consensus node to invoke a cross-chain authorization management contract on the target chain to query source configuration data information of the service object;

receiving, by the first consensus node, the source configuration data information returned by the target consensus node, and performing information comparison on the source configuration data information and the service data information to obtain an information comparison result;

determining, by the first consensus node, that the service object has the cross-chain asset transfer-out permission in response to the information comparison result indicating that the comparison succeeds;

invoking, by the first consensus node, the first asset contract to switch an asset state of the first asset from a first state to a second state; and generating, by the first consensus node, the first cross-chain event corresponding to the first cross-chain transfer-out transaction in response to the asset state of the first asset being the second state.

3. The method according to claim 1, wherein the second cross-chain transfer-in transaction is a transaction in a first cross-chain transaction request transmitted by the cross-chain relay; the first cross-chain transaction request carries first transaction signature information obtained by the cross-chain relay by signing the second cross-chain transfer-in transaction through private key information; and the writing transaction data of the second cross-chain transfer-in transaction into the first cross-chain bridge contract, and performing transaction verification on the second cross-chain transfer-in transaction based on the first cross-chain bridge contract to obtain a first transaction verification result comprises:

using, by the first consensus node, the second cross-chain transfer-in transaction obtained from the first cross-chain transaction request as a to-be-processed transaction, and writing transaction data of the to-be-processed transaction into the first cross-chain bridge contract;

invoking, by the first consensus node, a signature verification method in the first cross-chain bridge contract to obtain public key information corresponding to the private key information of the cross-chain relay, and performing signature verification on the first transaction signature information based on the public key information; using the second cross-chain transfer-in transaction corresponding to the first transaction signature information as a to-be-verified transaction in response to that the signature verification succeeds; and performing, by the first consensus node, transaction comparison on the to-be-processed transaction and the to-be-verified transaction by using a transaction comparison method in the first cross-chain bridge contract, to obtain a first transaction comparison result, and using the first transaction comparison result as the first transaction verification result.

4. The method according to claim 1, wherein an asset attribute state of the first asset is a first attribute state; and in response to a mapping asset attribute state of the second asset being changed from the first attribute state to a second attribute state, the method further comprises:

changing, by the first consensus node, in response to invoking the first asset contract to unlock the locked first asset on the first chain, the asset attribute state of the first asset from the first attribute state to the second attribute state.

5. The method according to claim 1, wherein the method further comprises:

specifying, by the first consensus node, an asset use permission of the first asset corresponding to the first cross-chain transfer-out transaction in response to writing the transaction data of the first cross-chain transfer-out transaction into the first cross-chain bridge contract.

6. The method according to claim 1, wherein the method further comprises:

obtaining, by the second consensus node, the first cross-chain transfer-in transaction transmitted by the cross-chain relay for the first asset after the cross-chain relay reads the first cross-chain event corresponding to the first cross-chain transfer-out transaction from the first consensus node;

writing, by the second consensus node, transaction data of the first cross-chain transfer-in transaction into a second cross-chain bridge contract on the second chain; and invoking, by the second consensus node, a second asset contract indicated by the second cross-chain bridge contract, to cast a second asset having same asset content as the first asset on the second chain.

7. The method according to claim 6, wherein the invoking a second asset contract indicated by the second cross-chain bridge contract, to cast a second asset having same asset content as the first asset on the second chain comprises:

performing, by the second consensus node, in response to invoking the second cross-chain bridge contract to execute the first cross-chain transfer-in transaction, transaction verification on the first cross-chain transfer-in transaction to obtain a second transaction verification result; and invoking, by the second consensus node, in response to the second transaction verification result indicating that the transaction verification succeeds, the second asset contract indicated by the second cross-chain bridge contract, to cast the second asset having the same asset content as the first asset on the second chain.

8. The method according to claim 7, wherein the first cross-chain transfer-in transaction is a transaction in a second cross-chain transaction request transmitted by the cross-chain relay; the second cross-chain transaction request carries second transaction signature information obtained by the cross-chain relay by signing the first cross-chain transfer-in transaction through private key information; and the performing, by the second consensus node, transaction verification on the first cross-chain transfer-in transaction to obtain a second transaction verification result comprises:

using, by the second consensus node, the first cross-chain transfer-in transaction obtained from the second cross-chain transaction request as a reference transaction;

invoking, by the second consensus node, a signature verification method in the second cross-chain bridge contract to obtain public key information corresponding to the private key information of the cross-chain relay, and performing signature verification on the second transaction signature information based on the public key information; using the first cross-chain transfer-in transaction corresponding to the second transaction signature information as a to-be-matched transaction in response to that the signature verification succeeds; and performing, by the second consensus node, transaction comparison on the reference transaction and the to-be-matched transaction by using a transaction comparison method in the second cross-chain bridge contract, to obtain a second transaction comparison result, and using the second transaction comparison result as the second transaction verification result.

9. The method according to claim 6, wherein the method further comprises:

invoking, by the second consensus node, in response to casting the second asset having the same asset content as the first asset on the second chain, an event generation method in the second cross-chain bridge contract, to obtain an event identifier of the first cross-chain event from the second cross-chain transaction request transmitted by the cross-chain relay based on the first cross-chain transfer-in transaction, and generating a cross-chain transaction completion event associated with the event identifier, wherein the cross-chain transaction completion event is used for representing that the first asset is successfully transferred from the first chain to the second chain.

10. The method according to claim 9, wherein the method further comprises:

obtaining, by the second consensus node, an event query request transmitted by the service object for the first cross-chain event, wherein the event query request carries the event identifier of the first cross-chain event; and returning, by the second consensus node, an event completion notification message for the first cross-chain event to the service object in response to the cross-chain transaction completion event associated with the event identifier is-being queried by using an event query method in the second cross-chain bridge contract.

11. The method according to claim 10, wherein the method further comprises:

obtaining, by the second consensus node, a derivative service execution request transmitted by the service object based on the event completion notification message;

invoking, by the second consensus node, based on a derivative service in the derivative service execution request, the second cross-chain bridge contract to obtain a transaction parameter in the first cross-chain transfer-in transaction, wherein the transaction parameter is determined based on an asset use permission of the first asset corresponding to the first cross-chain transfer-in transaction; and allowing, by the second consensus node, in response to determining that the service object has a permission of invoking a derivative service contract on the second chain based on the transaction parameter, the service object to invoke the derivative service contract to execute a derivative service corresponding to the second asset.

12. The method according to claim 11, wherein the transaction parameter comprises an asset transfer parameter; the asset transfer parameter is used for indicating to transfer the second asset from the service object to a derivative service object corresponding to a derivative service associated with the service object; and the method further comprises:

changing, by the second consensus node, in response to invoking the derivative service contract to execute the derivative service corresponding to the second asset, a mapping asset attribute state of the second asset from a first attribute state to a second attribute state on the second chain in response to determining to transfer the second asset from the service object to the derivative service object based on the asset transfer parameter.

13. The method according to claim 6, wherein the method further comprises:

obtaining, by the second consensus node, a second cross-chain asset transfer-out request transmitted by the service object for a second cross-chain transfer-out transaction, wherein the second cross-chain asset transfer-out request carries the service data information; and the second cross-chain asset transfer-out request is used for indicating the second consensus node to transfer the second asset from the second chain back to the first chain through the cross-chain relay;

writing, by the second consensus node, transaction data of the second cross-chain transfer-out transaction carried in the second cross-chain asset transfer-out request into the second cross-chain bridge contract on the second chain; and invoking, by the second consensus node, in response to determining that the service object has a cross-chain asset transfer-back permission based on the second cross-chain bridge contract and the service data information, the second asset contract to lock the second asset, and generating a second cross-chain event corresponding to the second cross-chain transfer-out transaction, wherein the second cross-chain event is used for indicating the cross-chain relay to transmit, in response to obtaining a second cross-chain transfer-in transaction corresponding to the second cross-chain transfer-out transaction through construction, the second cross-chain transfer-in transaction to the first consensus node; and the first consensus node is configured to invoke, in response to writing transaction data of the second cross-chain transfer-in transaction into the first cross-chain bridge contract on the first chain, the first asset contract indicated by the first cross-chain bridge contract to unlock the locked first asset on the first chain.

14. The method according to claim 13, wherein the invoking, in response to determining that the service object has a cross-chain asset transfer-back permission based on the second cross-chain bridge contract and the service data information, the second asset contract to lock the second asset, and generating a second cross-chain event correspond-
ing to the second cross-chain transfer-out transaction com-
prises:

invoking, by the second consensus node, a cross-chain
permission query method in the second cross-chain
bridge contract, to generate a transfer-back permission
verification request, wherein the transfer-back permis-
sion verification request is used for indicating a target
consensus node to invoke a cross-chain authorization
management contract on the target chain to query
source configuration data information of the service
object;

receiving, by the second consensus node, the source
configuration data information returned by the target
consensus node based on the transfer-back permission
verification request, and performing information com-
parison on the source configuration data information
and the service data information to obtain an informa-
tion comparison result;

determining, by the second consensus node, that the
service object has the cross-chain asset transfer-back
permission in response to the information comparison
result indicating that the comparison succeeds; and invoking, by the second consensus node, the second asset
contract to switch an asset state of the second asset
from a first state to a second state, and generating the
second cross-chain event corresponding to the second
cross-chain transfer-out transaction in response to the
asset state of the second asset being the second state.

15. A computer device, comprising a memory and a
processor, wherein the memory is connected to the processor, the memory is
configured to store a computer program, and the pro-
cessor is configured to execute the computer program
to perform operations associated with the first consen-
sus node according to claim 1.

16. A computer device, comprising a memory and a
processor, wherein the memory is connected to the processor, the memory is
configured to store a computer program, and the pro-
cessor is configured to execute the computer program
to perform operations associated with the second con-
sensus node according to claim 6.

* * * * *